United States Patent
Huang et al.

(10) Patent No.: US 9,200,207 B2
(45) Date of Patent: Dec. 1, 2015

(54) METHODS OF PRODUCING LIQUID HYDROCARBON FUELS FROM SOLID PLASTIC WASTES

(75) Inventors: Cunping Huang, Cocoa, FL (US); Amit Gujar, Orlando, FL (US); Marianne Rodgers, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 854 days.

(21) Appl. No.: 13/484,359

(22) Filed: May 31, 2012

(65) Prior Publication Data

US 2012/0310023 A1    Dec. 6, 2012

Related U.S. Application Data

(60) Provisional application No. 61/491,368, filed on May 31, 2011.

(51) Int. Cl.
  C10B 57/04  (2006.01)
  *C10G 1/10*  (2006.01)
  *C10G 1/00*  (2006.01)
  C10B 53/07  (2006.01)
  C10L 5/40  (2006.01)

(52) U.S. Cl.
  CPC ...... *C10G 1/10* (2013.01); *C10G 1/002* (2013.01); C10B 53/07 (2013.01); C10G 2300/1003 (2013.01); C10G 2400/02 (2013.01); C10G 2400/04 (2013.01); C10L 5/406 (2013.01)

(58) Field of Classification Search
  CPC .. C10G 1/10; C10G 45/00; C10G 2300/1003; Y02E 50/14; C10L 5/405; C10L 9/10; C10B 53/07
  USPC ............... 585/242, 14; 201/2.05, 25
  See application file for complete search history.

(56) References Cited

U.S. PATENT DOCUMENTS

| | | | |
|---|---|---|---|
| 5,632,863 A * | 5/1997 | Meador | 201/25 |
| 6,011,187 A * | 1/2000 | Horizoe et al. | 585/241 |
| 2007/0179326 A1* | 8/2007 | Baker | 585/241 |
| 2012/0215043 A1* | 8/2012 | Gaffney | 585/241 |

* cited by examiner

*Primary Examiner* — Nina Bhat
(74) *Attorney, Agent, or Firm* — Locke Lord LLP; Daniel J. Fiorello

(57) ABSTRACT

A method of producing liquid hydrocarbon fuels for solid waste plastic by reacting the waste plastic with a metal hydride and a supported catalyst which is mixed and then gasified to produce liquid hydrocarbons is described.

20 Claims, 28 Drawing Sheets

Chemical structures of polyolefins: a) polyethylene, b) polypropylene, c) polyvinylchloride, d) polystyrene, e) polyethylene terephthalate (A). Isomerization:

Paraffin isomerization:

Naphthene isomerization:

(B). Dehydrogenation:

(C). Dehydrocyclization:

(D). Hydrocracking:

$C_{10}H_{22} + H_2 \longrightarrow C_4H_{10} + C_6H_{14}$ (E). Dealkylation:

(F). Aromatization:

In the thermal case:

In the presence of Co-AC:

$\sim\sim\sim^* + H^* \longrightarrow \sim\sim\sim$ (Hydrogen quenching)

METHODS OF PRODUCING LIQUID HYDROCARBON FUELS FROM SOLID PLASTIC WASTES

CROSS-REFERENCE TO RELATED APPLICATION

This application claims priority to U.S. provisional application entitled "METHODS OF PRODUCING LIQUID HYDROCARBON FUELS FROM SOLID PLASTIC WASTES," having Ser. No. 61/491,368, filed on May 31, 2012, which is entirely incorporated herein by reference.

BACKGROUND

Plastics are indispensable components in everyday life. The production of plastics has increased according to demand from society, and consequently, the amount of waste plastics has also increased. Most plastic items sold become waste either within a year or a single life cycle. The average municipal solid waste (MSW) discard rate based on 11 statewide characterization studies in 2007 was 28.5+/−6.5% plastics. Waste management involves waste collection and sorting followed by one or more of the following options: resource recovery through recycling, biological treatment of biomass, i.e. production of marketable compost; thermal treatment, i.e. incineration to recover energy in the form of heat and electricity; and landfilling. As most plastics are not biodegradable, their deposition in landfills is not a desirable solution from an environmental standpoint. Over the years, incineration has become the most common method of dealing with combustible waste efficiently as it decreases the volume and mass of MSW. However, there is a lot of controversies about the incineration of these wastes, due to the release of toxic and greenhouse gases. Another disadvantage of the traditional incineration of these wastes is that it completely destroys all its organic matter which could be otherwise useful for different applications. Therefore there is an increasing need to recycle waste plastics. Toward this end, various technologies have been developed that can recover energy from waste plastics and use such energy as feedstock for the production of liquid fuels such as gasoline, diesel or fuel oil.

SUMMARY

Embodiments of the present disclosure provide methods of producing high quality liquid fuels from solid plastic waste, high quality liquid fuels, and the like. An exemplary embodiment of the present disclosure includes a method of producing high quality liquid fuels that includes mixing a solid plastic waste with a metal hydride and a supported metal catalyst; gasifying the mixture; and producing the high quality liquid fuels.

An exemplary embodiment of the present disclosure includes a method of producing high quality liquid fuels that includes melting a solid plastic waste; adding a metal hydride and a supported metal catalyst; and producing the high quality liquid fuel.

An exemplary embodiment of the present disclosure includes a high quality fuel prepared by a process that includes mixing a solid plastic waste with a metal hydride and a supported metal catalyst; gasifying the mixture; and producing the high quality liquid fuel.

An exemplary embodiment of the present disclosure includes a high quality fuel prepared by a process that includes melting a solid plastic waste; adding a metal hydride and a supported metal catalyst; and producing the high quality liquid fuel.

BRIEF DESCRIPTION OF THE DRAWINGS

Further aspects of the present disclosure will be more readily appreciated upon review of the detailed description of its various embodiments, described below, when taken in conjunction with the accompanying drawings.

DISCUSSION

Figure 1:
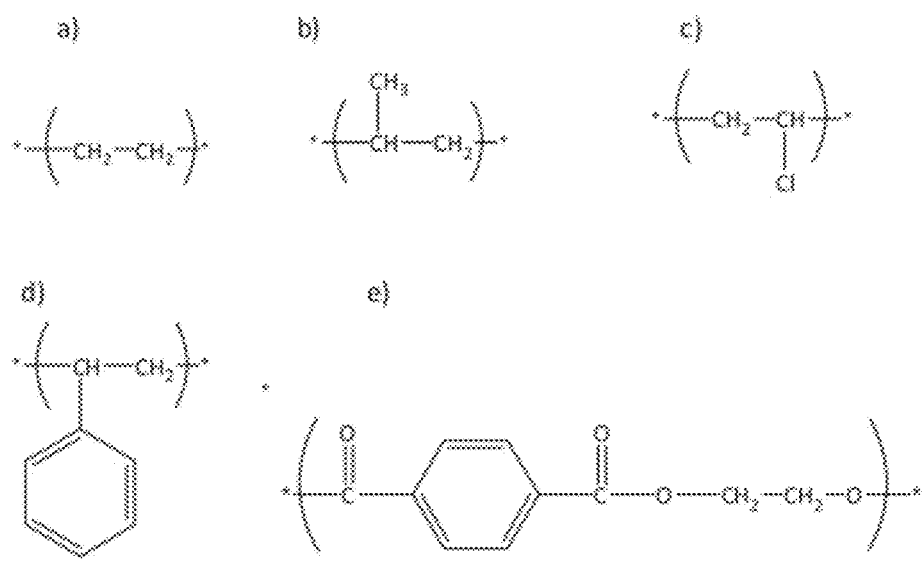
FIG. 1 illustrates chemical structures of polyolefins: a) polyethylene, b) polypropylene, c) polyvinylchloride, d) polystyrene, e) polyethylene terephthalate.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, organometallic chemistry, physics, petroleum chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

In this specification and in the claims that follow, reference will be made to a number of terms that shall be defined to have the following meanings unless a contrary intention is apparent.

"Solid plastic waste" refers to thermoplastic materials that can include a composition, composite, mixture, or the like of one or more of polyethylene (PE), polypropylene (PP), polystyrene (PS), polyvinyl chloride (PVC), and polyethylene terephthalate (PET), as well as other thermoplastic and thermosetting plastic materials.

"Pyrolysis" is the thermal conversion of a base material, solid plastic wastes, in the absence of oxygen at elevated temperatures generally of about 200 to 800° C., or in some cases above about 800° C. In embodiments of the present disclosure, when treated at these temperatures, the base materials are converted into liquid fuels.

"Liquid fuel" refers to one or more of the following: liquefied petroleum gas, gasoline, jet fuel, kerosene, diesel, and combinations thereof. The components of liquid fuel can be separated from one another so they can be used as a fuel for particular applications.

A "high quality liquid fuel" refers to a liquid fuel having a lower percentage of olefins (unsaturated hydrocarbons) relative to a "low quality liquid fuel" that has higher percentages of and olefins. High quality gasoline liquid fuels have high Research Octane Number (RON) with about 20% aromatic hydrocarbons and high percentage of branched paraffins. High quality diesel fuel has high Cetane number with high percentage of n-paraffins relative to low quality diesel fuels.

General Discussion:

Embodiments of the present disclosure provide methods of producing high quality liquid fuels from solid plastic waste, high quality liquid fuels, and the like. Embodiments of the present disclosure include the use of a metal hydride and supported metal catalysts to produce higher quality liquid fuels relative to similar processes with other catalysts and without the addition of hydrogen. The produced high quality liquid fuel has lower concentrations of n-paraffins and olefins and higher concentrations of aromatic hydrocarbons and branched paraffins relative to similar processes using other catalysts. The components, such as gasoline or diesel, of the high quality liquid fuel once separated can have a higher research octane number for gasoline or cetane number for diesel fuels, respectively. Additional details are provided in the Examples.

Embodiments of the present disclosure are advantageous over typical two step processes (e.g., 1) pyrolysis and 2) fuel upgrading reactions) for producing liquid fuels since embodiments of the present disclosure only use a single step to produce high quality liquid fuels without the addition of hydrogen.

Embodiments of the present disclosure provide for methods of producing high quality liquid fuels. In general, solid plastic waste is mixed with a metal hydride and a supported metal catalyst. The mixture can be gasified by heating the mixture to about 300 to 800° C. at a pressure of about 1 atm to 20 atm for a time frame of seconds to minutes or longer for large scale production. In an embodiment, the solid plastic waste can be gasified and/or melted prior to addition of the metal hydride and/or supported metal catalyst. In an embodiment, one of the metal hydride and supported metal catalyst can be added to the solid plastic waste prior to melting and the other of the metal hydride and supported metal catalyst is added after the solid plastic waste is melted. The mixture decomposes over a dual functional catalyst system to form a high quality liquid fuel. In particular, the solid plastic waste undergoes pyrolysis and fuel upgrading in a single step. Additional details are described in Examples 1 and 2.

In an embodiment, the metal hydride can function as a catalyst to decompose larger hydrocarbon molecules and as a source of hydrogen to convert alkenes to desirable alkanes and aromatic components of fuels. In an embodiment, the metal hydride is selected from the group consisting of: magnesium hydride (MgH2), calcium hydride (CaH2), palladium hydride, berllium hydride (BeH2), aluminum hydride (AlH3), Indium hydride (InH3), lithium aluminum hydride (LiAlH4), sodium aluminum hydride (NaAlH4), sodium borohydride (NaBH4) and a combination thereof. The amount of metal hydride used in the method can be about 1 wt % to 30 wt % of solid plastic waste.

The supported metal catalyst functions to decompose long chain hydrocarbons to shorter chain hydrocarbons as well as aromatic hydrocarbons. The supported metal catalyst includes a support and one or more types of metals disposited on the support. The support can include: $Al_2O_3$, $SiO_2$, zeolite, zirconia, MgO, $TiO_2$, activated carbon, clay, and a combination thereof. The metal disposited on the support can include Pt, Pd, Ir, Ru, Rh, Ni, Co, Fe, Mn, Mg, Ca, Mo, Ti, Zn, Al, metal alloy of Pt—Pd, metal alloy of Pt—Ru, metal alloy of Pt—Pd—Ru, metal alloy of Pt—Co, metal alloy of Co—Ni, metal alloy of Co—Fe, metal alloy of Ni—Fe, metal alloy of Co—Ni—Fe, and a combination thereof. The amount of the metal disposited on the support can be about 0.1 wt % to 30.0 wt % of supporting materials. The amount of supported metal catalyst used in the method can be about 0.1 wt % to 20 wt % of solid plastic waste. The metal hydrides and/or supported catalysts can be reused.

In an embodiment, the amount of each component of the high quality liquid fuel can be adjusted by the selection of the catalyst, metal hydride, the temperature, the temperature profile, the pressure, the pressure profile, recycling ratio of heavy oils, and a combination thereof. In this regard, the content of the components in the high quality liquid fuel can be adjusted as desired by modifying one or more variables of the method.

Once the high quality liquid fuel is produced, the components of the high quality liquid fuel can be separated from one another so they can be used as a fuel (e.g., gasoline, diesel, jet fuel, etc) for particular applications. The individual components can be a higher quality (e.g., octane or cetane number) relative to other processes using different types of catalysts.

Additional details are provided in the Examples.

EXAMPLE

Now having described the embodiments of the present disclosure, in general, the Examples describe some additional embodiments of the present disclosure. While embodiments of present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Brief Introduction

Production of liquid fuels from waste plastics could simultaneously reduce the quantity of waste plastics and provide an alternative fuel source. Methods of plastic decomposition include thermal pyrolysis, catalytic cracking, and hydrocracking of plastics to produce short chain components in compliance with the fuel requirements. In this work we explain the importance of pyrolysis of plastics to create fuel, describe the chemistry of plastics and fuels, illustrate the mechanisms of thermal pyrolysis, and describe catalytic pyrolysis, using specific examples from the literature. Based on the findings of the literature review of plastics pyrolysis, we performed a model study of the pyrolysis of polyethylene, looking at the effects of temperature, catalyst, support and bifunctional catalysts. Based on these results, we made several observations and recommendations for future investigations.

Introduction:

Plastics are indispensable components in everyday life. The production of plastics has increased according to demand from society, and consequently, the amount of waste plastics has also increased (1). Most plastic items sold become waste either within a year or a single life cycle (2). The average municipal solid waste (MSW) discard rate based on 11 state-wide characterization studies in 2007 was 28.5±6.5% plastics (3). Waste management involves waste collection and sorting followed by one or more of the following options: resource recovery through recycling (4), biological treatment of biomass (5), i.e. production of marketable compost; thermal treatment, i.e. incineration to recover energy in the form of heat and electricity; and landfilling. As most plastics are not biodegradable, their deposition in landfills is not a desirable solution from an environmental standpoint. Over the years, incineration has become the most common method of dealing with combustible waste efficiently as it decreases the volume and mass of MSW (6). However, there is a lot of controversy about the incineration of these wastes, due to the release of toxic and greenhouse gases. Another disadvantage of the traditional incineration of these wastes is that it completely destroys all its organic matter which could be otherwise useful for different applications (7). Therefore there is an increasing need to recycle waste plastics. Toward this end, various technologies have been developed that can recover energy from waste plastics and use such energy as petrochemical feedstock or fuel oil.

Recycling Options:

Plastic solid waste (PSW) treatment and recycling processes can be divided into four major categories, re-extrusion (primary), mechanical (secondary), chemical (tertiary), and energy recovery (quaternary). Each method provides a unique set of advantages that make it particularly beneficial for specific locations, applications, or requirements. Mechanical recycling involves physical treatment; chemical recycling and treatment produces feedstock chemicals for the chemical industry; and energy recovery involves complete or partial oxidation of the material, producing heat, power, and/or gaseous fuels, oils, and chars as well as by-products that must be disposed of, such as salts (8).

Primary recycling, better known as re-extrusion, is the reintroduction of scrap, industrial or single polymer plastic edges and parts to the extrusion cycle in order to produce products of the similar material. This process utilizes scrap plastics that have similar features to the original products. Reusing plastic is always preferable to recycling as it uses less energy and fewer resources, conserves fossil fuels, and reduces carbon dioxide, nitrogen oxides, and sulfur dioxide emissions (2).

Mechanical recycling is the process in which PSW is used in the manufacturing of plastic products via mechanical means, using recyclates, fillers and/or virgin polymers. Mechanical recycling of PSW can only be performed on single-polymer plastic (2).

Chemical recycling is a term used to refer to processes that convert plastic materials into smaller molecules, usually liquids or gases, which are suitable for use as a feedstock for the production of new petrochemicals and plastics. The term "chemical" is used because the chemical structure of the polymer is altered. Some of the products of chemical recycling have proven to be useful as fuel. The technology behind chemical recycling is a depolymerization processes that can result in a very profitable and sustainable industrial scheme, providing a high product yield and minimum waste. The main advantage of chemical recycling is the possibility of treating heterogeneous and contaminated polymers with limited use of pre-treatment. Under the category of chemical recycling, processes appear such as: pyrolysis, gasification, hydrogenation, viscosity breaking, steam or catalytic cracking, hydrolysis, fractionation, hydroglycolysis, aminolysis, methanolysis, acid cleavage, and the use of PSW as a reducing agent in blast furnaces (8).

Chemistry of Polymeric Materials:

Examples of Plastics:

Plastic waste is composed of ~80% thermoplastics and ~20% thermosets (9). Thermoplastics are polyolefins such as polyethylene, polypropylene, polystyrene, and polyvinyl-chloride (shown in FIG. 1)), which can be recycled (10). Thermosets mainly include epoxy resins and polyurethanes and cannot be recycled. Plastic waste is produced from both municipal and industrial sources.

Sources of municipal plastic waste include domestic items (food and beverage containers, packaging foam, electronic equipment cases, flooring, thermal insulation foams), agricultural items (mulch films, feed bags, fertilizer bags, etc.), and automobile wrecking. These items are composed of plastics such as polyethylene (PE), polypropylene (PP), polystyrene (PS), polyvinyl chloride (PVC), and polyethylene terephthalate (PET) (11).

Sources of industrial plastic waste include construction and demolition companies (polyvinyl chloride pipes and fittings, tiles, and sheets), electrical and electronic industries (switch boxes, cable sheaths, cassette boxes, TV screens), and the automotive industries (spare parts for cars: fan blades, seat coverings, battery containers, front grills) (11).

Polyethylene:

Polyethylene (PE, FIG. 1a) is the most widely used plastic, with an annual production of approximately 80 million metric tons (12). It is formed by the reaction of ethane molecules and is primarily used for packaging (e.g. plastic bags). Straight sections of polyethylene have the same structure as the straight chain hydrocarbons (e.g. propane, decane). As with any polymer that has chains that are cross branched, the PE structure cannot be defined molecularly due to the cross branched chains.

Polyethylene can be produced through many types of polymerization, each producing a different type of PE, including radical polymerization (polymer is formed through successive addition of free radical building blocks), anionic addition polymerization (unsaturated molecules add onto a growing polymer chain through a carbanion species), ion coordination polymerization (unsaturated molecules add onto a growing polymer chain through an organometallic center) or cationic addition polymerization (unsaturated molecules add onto a growing polymer chain through a cation species) (13).

Polyethylene is classified into several different categories based mostly on its density and branching. The mechanical properties of PE depend significantly on variables such as the extent and type of branching, the crystal structure and the molecular weight. With regard to sold volumes, the most important polyethylene grades are high density polyethylene (HDPE), linear low density polyethylene (LLDPE), and low density polyethylene (LDPE) (13).

Polypropylene

Polypropylene (PP, see FIG. 1b)b) is made from the monomer propylene by Ziegler-Natta polymerization and by metallocene catalysis polymerization (13). Most polypropylene is highly crystalline and geometrically regular. PP is used in a wide variety of applications including packaging, textiles, stationery, laboratory equipment, and automotive components.

Polypropylene has many properties that make it desirable for many applications. For example, PP has excellent resistance to stress and high resistant to cracking; can withstand high operational temperatures with a melting point of 160° C.; and is highly stable to most alkalis and acid, organic solvents, degreasing agents and electrolytic attack. On the other hand, PP is less resistant to aromatic, aliphatic and chlorinated solvents, and UV (13).

In order to improve some properties, additives such as pigments, carbon black, rubbers, antioxidants, and UV stabilizer may be included in PP formulas. PP is available as molding powder, extruded sheet, cast film, textile staple, and continuous filament yarn (13).

Polyvinyl Chloride:

Polyvinyl chloride (PVC, FIG. 1 is composed of repeating vinyl groups having one of their hydrogens replaced with a chloride group and is produced by suspension polymerization of the vinyl chloride monomer. PVC is the third most widely produced plastic, after polyethylene and polypropylene (13). PVC can be made softer and more flexible by the addition of plasticizers such as phthalates. In this form, it is used in clothing, upholstery, tubing, flooring, and electrical cable insulation. It is also commonly used in figurines and in inflatable products such as waterbeds, pool toys, and inflatable structures (13).

Polystyrene:

Polystyrene (PS, see FIG. 1$d$) is an aromatic polymer made from the aromatic monomer styrene, a liquid hydrocarbon that is commercially manufactured from petroleum by the chemical industry. Polystyrene is one of the most widely used kinds of plastic and is produced via free radical polymerization.

There are several different forms of polystyrene produced, including extruded, extruded foam, and expanded foam. Extruded polystyrene has as much tensile strength as unalloyed aluminum, but is lighter and more elastic and is used to make a variety of molded products including plastic tableware, CD cases, and model cars. It is also used to produce medical and pharmaceutical supplies. Extruded polystyrene foam, commonly known as Styrofoam™, is a type of insulation with versatile applications, such as the manufacture of surfboards. This type of polystyrene is used in building materials and in roadway construction. Expanded polystyrene foam is actually composed of expanded polystyrene beads. This type of material is used to make "peanuts" for packaging, disposable coffee cups, and foam picnic coolers (13).

Polyethylene Terephthalate:

Polyethylene terephthalate (PET, FIG. 1$e$) is a resin of the polyester family and is used in synthetic fibers; beverage, food and other liquid containers; and engineering resins often in combination with glass fiber. Its monomer (bis-β-hydroxy-terephthalate) can be synthesized by the esterification reaction between terephthalic acid and ethylene glycol with water as a byproduct, or by transesterification reaction between ethylene glycol and dimethyl terephthalate with methanol as a byproduct. Polymerization is through a polycondensation reaction (13).

Depending on its processing and thermal history, polyethylene terephthalate may exist both as an amorphous (transparent) and as a semi-crystalline polymer. The semicrystalline material might appear transparent (particle size <500 nm) or opaque and white (particle size up to a few microns).

Fuel Chemistry:

Fuel from petroleum consists of various fractions that are segregated depending on their boiling ranges. These consist of liquefied petroleum gas (LPG), consisting of mainly of $C_2$-$C_4$ fraction; gasoline ($C_5$-$C_{10}$); jet fuel/kerosene ($C_{11}$-$C_{14}$); diesel ($C_{14}$-$C_{18}$); and heavy fuel oil (>$C_{18}$). Each of these fuels can be converted to heat or mechanical energy in various combustors or engines. These petroleum fractions have varying chemical compositions and the presence of a particular type of hydrocarbon that may be considered desirable in one fraction would be undesirable in others. The following paragraphs describe chemical composition and physical and chemical characteristics of various fractions.

Liquefied Petroleum Gas:

Liquefied petroleum gas (LPG) primarily contains propane and butane. LPG is popular fuel for cooking, especially in south-east Asia. LPG can be used as a fuel for internal combustion engines. Although LPG has lower energy density than gasoline, it has a higher octane number and burns more cleanly with lower particulate matter.

Gasoline:

Gasoline mainly has compounds from $C_5$-$C_{10}$ range. They have boiling range from 38° C. to 204° C. Gasoline is used in spark-ignition (SI) engines, also called gasoline or petrol engines. Here, the fuel-air mixture is compressed and ignited by a spark which initiates the combustion cycle. This requires the fuel to be such that it does not detonate (auto-ignite) during the compression cycle. Detonation leads to engine knock and severe damage. Octane number is a measure of the anti-knocking capacity of the fuel. It is a measure of the fuel's capacity to burn in a controlled manner rather than exploding in an uncontrolled fashion. 2,2,4-trimethylpentane (Iso-octane) has been designated an octane number of 100 and n-heptane has been assigned an octane number of 0. The octane number of any fuel is the volume percentage of isooctane that must be mixed with n-heptane so as to obtain the same anti-knock characteristic. Research octane number (RON) and Motor octane number (MON) are the two widely used octane numbers. RON is determined by running a test engine under controlled conditions and comparing the results to a mixture of iso-octane and n-heptane. MON is a better measure of fuel's anti-knock behavior under actual driving conditions. Anti-knock index is defined as (RON+MON)/2 and usually octane rating shown on the pumps.

Table 1 shows the RON for various hydrocarbons.

TABLE 1

Research octane number (RON) for various hydrocarbons

| Compound | Octane Number |
| --- | --- |
| n-heptane ($C_7$) | 0 |
| 1-heptene ($C_7$) | 60 |
| 2-methylhexane ($C_7$) | 44 |
| Iso-octane ($C_8$) | 100 |
| n-octane ($C_8$) | −10 |
| 2-methylheptane ($C_8$) | 23 |
| Benzene ($C_6$) | 101 |
| Toluene ($C_7$) | 111 |
| n-Hexadecane ($C_{16}$) | −30 |
| Methanol ($C_1$) | 108.7 |

We see from Table 1 that straight-chain alkanes have very low octane numbers and thus have poor anti-knock behavior. Branched alkanes, aromatics and lower alcohols have good octane numbers resulting in superior anti-knock characteristics. Octane boosters are generally added to gasoline so as to increase its octane rating. Historically, Tetraethyl lead was commonly used as an octane booster but this has been phased out. Other chemicals used as octane boosters include methyl tert-butyl ether (MTBE), methanol, ethanol, tert-amyl methyl ether (TAME). MTBE has been banned in many states due to groundwater contamination.

Another important physical property of gasoline is its volatility. Reid Vapor pressure (RVP) is generally used to measure the volatility of gasoline. In the summertime, the RVP is lowered by adding heavier components (or by removing lower boiling components) to the gasoline. This helps to prevent vapor lock in gasoline engines. In winter, RVP is increased by adding lower boiling components to the fuel so that it makes gasoline engines easier to start.

Aviation gasoline is used in aircrafts that are powered by piston engines. They generally have higher octane rating than automotive gasoline and use tetraethyl lead (TEL) to boost its octane number.

Jet Fuel/Kerosene:

The Jet fuel/kerosene cut of petroleum has a boiling range from 175° C. to 325° C. The carbon number ranges from $C_{10}$ to $C_{16}$. Jet fuel is used in engines powered by gas turbine engines. Jet A, Jet A-1 and Jet B are generally specifications for jet fuels. Jet B is used in cold weather conditions and contains more volatiles components. Other uses of kerosene include heating, lighting and cooking. It is also used as solvent for many chemicals.

Diesel:

Diesel is generally considered to be the oil fraction in the boiling range between 177° C. and 343° C. This is the fuel that is generally used in compression-ignition (CI) engines, also called diesel engines. These engines have very high thermal efficiency because of their high compression ratio. These engines work on the principle that the heat of compression initiates the ignition of the fuel. The fuel is injected into the combustion chamber at the end of the compression cycle. Due to this characteristic, the fuel needs to have a low auto-ignition temperature. Cetane number is a measure of this ignition quality and is related to the amount of time needed for the fuel to ignite injection into a CI engine. A high cetane number means that the fuel auto-ignites easily and thus has a short ignition delay. Cetane (n-hexadecane) is assigned a cetane number of 100 and 1-methylnaphthalene is assigned a value of 0. Cetane number for any fuel is defined as the volume percentage of cetane that must be mixed with 1-Methylnaphthalene so as to obtain the same ignition characteristic as the fuel. Cetane numbers of some of the hydrocarbons are given in Table 2. (14).

TABLE 2

Cetane number of various hydrocarbons

| Compound | Cetane Number |
| --- | --- |
| n-Octane ($C_8$) | 65 |
| 1-Octene ($C_8$) | 41 |
| n-Decane ($C_{10}$) | 76 |
| 1-Decene ($C_{10}$) | 59 |
| n-Dodecane ($C_{12}$) | 80 |
| 1-Dodocene ($C_{12}$) | 71 |
| n-Tetradecane ($C_{14}$) | 95 |
| 1-Tetradecene ($C_{14}$) | 79 |
| n-Hexadecane ($C_{16}$) | 100 |
| 1-Hexadecene ($C_{16}$) | 88 |
| n-Octadecane ($C_{18}$) | 103 |
| 1-Octadecene ($C_{18}$) | 90 |
| Eicosane ($C_{20}$) | 110 |
| Benzene ($C_6$) | −10 |
| t-butylbenzene ($C_{10}$) | −1 |
| n-hexylbenzene ($C_{12}$) | 26 |
| n-octylxylene ($C_{16}$) | 20 |
| 2,2,4,4,6,8,8-heptamethylnonane ($C_{16}$) | 15 |

Table 2 shows that straight chain alkanes have higher cetane numbers while aromatics and branched chain alkanes have low cetane numbers. $C_{12}$-$C_{18}$ straight chain alkanes would be the ideal CI engine fuel. Anything higher than $C_{1-8}$ alkanes would have melting points too high so as to be an amenable liquid fuel. Generally, cetane numbers in diesel fuels range from 40 to 55.

CI engines are used not only for automotive applications but also for marine, railroad and stationary power applications. The fuel requirements for these differ considerably. Diesel fuel is categorized as No. 1-D, No. 2-D and No. 4-D diesel. These differ in their physical properties like viscosity, pour point and distillation ranges. Automotive diesel engines which are high speed diesel engines and have frequent load and speed variations generally use 1-D and 2-D diesel. 1-D diesel fuel has low boiling point and are used as blending stock for 2-D diesel in cold weather regions. No. 4-D diesel is generally a higher boiling range fraction used in low- and medium-speed engine applications like marine propulsion and electric power generation.

Since diesel fuel has a higher boiling range than gasoline and kerosene, low temperature characteristics are an important consideration. At low temperatures wax crystals from long chain paraffinic compounds from the fuel start precipitating out. This wax can cause major problems in the engine system such as blocking the fuel lines and filters and lead to engine stalling. Cloud point and pour point are the two important ASTM tests that can define the low-temperature characteristics of the fuel. Cloud point is the temperature at which wax crystals starts precipitating out of the fuel making it look cloudy when the fuel is cooled at a specific rate. Cloud point mainly depends on the n-alkane content of the fuel. The cetane number of the fuel is increased with the presence of n-alkanes, but very high content of these lead to undesirable increases in the cloud point. The cloud point for commercial diesel ranges from 10 to −20° C. (15). Pour point is the temperature at which the diesel fuel ceases to flow. It is the point at which the wax precipitated becomes sufficient enough to gel the fuel. Pour points for most diesel fuel range from −15 to −35° C.

The major classes of chemical compounds found in diesel are saturated alkanes, saturated cyclic compounds (naphthene) and aromatic hydrocarbons.

Saturated alkanes generally range from C10 to C20 and have high cetane numbers. However, higher cloud points and poor cold-flow characteristics result when the content of n-alkanes is too high.

Saturated cycloalkanes (naphthenes) are generally 1 to 3-ring cycloalkanes. Their content in the fuel depends upon the type of crude as well as blend stock used to make the fuel. Hydrotreated light cycle oil has high naphthenic content.

Aromatic compounds have low cetane number but give good cold-flow properties to the fuel. These aromatics can be monoaromatics, diaromatics or polyaromatics. Diaromatics with naphthalene-type compounds is the most abundant class of aromatic compound in diesel.

Heteroatom compounds: The sulfur compounds found in diesel are heavier than that found in gasoline. Alkylated benzothiophene and dibenzothiophene-type compounds are the most common classes of sulfur compounds found in diesel. Nitrogen containing compounds found in diesel include indoles, carbazoles and quinolones. Oxygen compounds in diesel include alkylated phenols and dibenzofurans. Both nitrogen and oxygen compounds are in trace quantities in diesel.

Heavy fuel oils are the heavier fractions of petroleum with carbon numbers greater than $C_{20}$. These are highly viscous and may require preheating before use. These are used in home heating as well as bunker fuel on ships. These fuels are usually composed of saturated alkanes, aromatics and cycloalkanes. The sulfur content is these fuels are also generally higher than that in gasoline or diesel.

Figure 2:
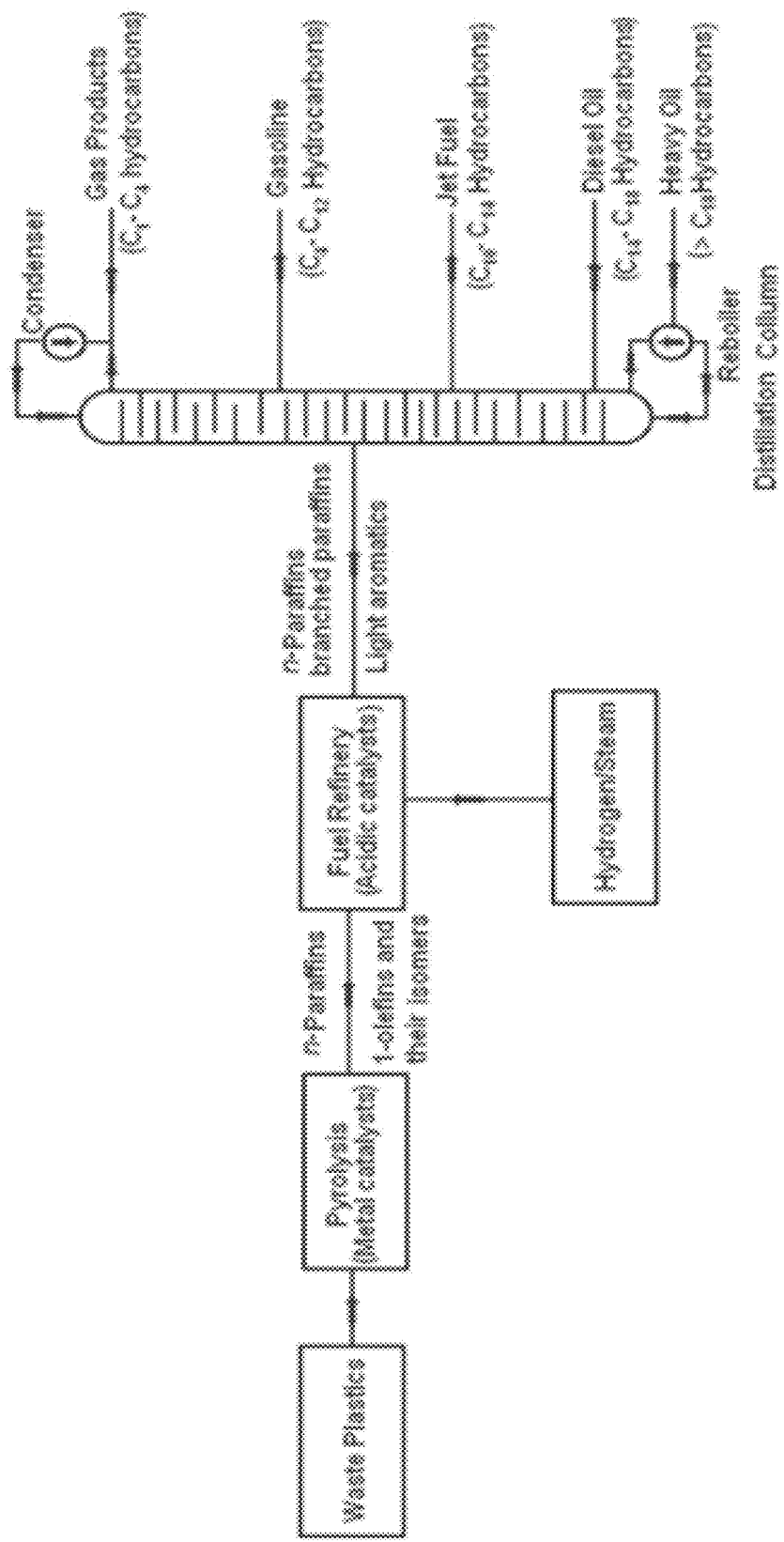
FIG. 2 illustrates a schematic flow diagram of liquid fuel production from waste plastics.

Processes for Liquid Fuel Production from Waste Plastics:

Liquid fuel production is an important option for waste plastics management, not only because most waste plastics are clean (low nitrogen, sulfur and heavy metal components) and energy-rich materials that are derived from crude oils, but also because the consumption of fuels could alleviate the continuing increase in waste plastics and, at the same time, reduce landfill. The economy of liquid fuel production from waste plastics depends on processes that mainly consist of feedstock handling and transportation; reactor and catalyst designs; and product separation. Although plastic materials are polymerized hydrocarbons with chemical compositions similar to those of liquid fuels (gasoline, jet fuel and diesel fuel), the conversion of polymeric materials to liquid fuels involves complex chemical processes. Chemically, the fundamental process of liquid fuel production via plastics feedstock is first to decompose the high molecular weight plastics into shorter chain hydrocarbons with the chemical constitutions of liquid fuels. The first step includes thermal pyrolysis, catalytic cracking and hydrocracking of plastics to produce short chain components. Based on fuel chemistry, the pyrolytic products, mainly n-paraffins and olefins (unsaturated hydrocarbons), are low quality fuels that require further processing in order to be upgraded to the structures and components of useable liquid fuels. Therefore, after decomposition, low molecular weight hydrocarbons derived from plastics pyrolysis require a second process to increase fuel values (measured by research octane number (RON)) for comparison to fuels produced from petroleum based processes. This process is referred to as fuel refinery. The goal of refinery is to meet the structural characteristics of liquid fuels. This step consists primarily of the reduction of unsaturated olefins and the isomerization and aromatization of paraffins to produce branched paraffins and aromatics, which have higher RONs. When both the chemical compositions and the structures of fuels are met, the product fuels are separated according to their molecular weight ranges. Based on chemistries of both plastics and liquid fuels, the conventional processes of liquid fuel production from waste plastics consist of basically three steps: (1) plastics pyrolysis, (2) fuel refinery (or upgrading) and (3) fuel separation (FIG. 2).

The pyrolysis of waste plastics includes thermal pyrolysis and thermal catalytic pyrolysis over metal based catalysts. The major products of the pyrolysis process normally consist of (1) 4-5% gas products, mainly $C_1$-$C_4$ hydrocarbons. (2) 90% oil, consisting mainly of n-paraffins, 1-olefins and their isomers. (3) 5-6% residue—fillers, stabilizer residues, pigments (16).

Chemistry of Liquid Fuel Production Via Thermal Pyrolysis of Waste Plastics:

Pyrolysis is a thermochemical decomposition (or thermal cracking) process for organic materials at elevated temperatures in the absence of oxygen. The main objective of cracking processes is to break down large hydrocarbon molecules into smaller ones. Under thermal decomposition processes, polymeric plastics produce lower molecular paraffins and olefins. When no catalysts are involved, a pyrolystic process is defined as thermal pyrolysis. The Py-GC/MS thermal decomposition of polypropylene (PP), polystyrene (PS), poly (vinyl chloride) (PVC), polyesters of terephthalic acid and other plastics has been reported in (17).

Mechanism of Thermal Pyrolysis:

It is commonly accepted that thermal cracking occurs through a free radical chain reaction mechanism (18). High temperatures lead to the formation of free radicals, which react with hydrocarbons, producing new hydrocarbons and new free radicals:

R—$CH_2$—$CH_2$—$CH_2$—$CH_3$+$CH_3$*→R—$CH_2$—$CH_2$—$CH_2$—$CH_2$*+$CH_4$

Free Radicals can Decompose Producing Olefins and New Radicals:

$CH_2$—$CH_2$—$CH_2$—CH*—$CH_2$—$CH_2$—→R—CH=$CH_2$+$CH_3$—$CH_2$*

Figure 3:
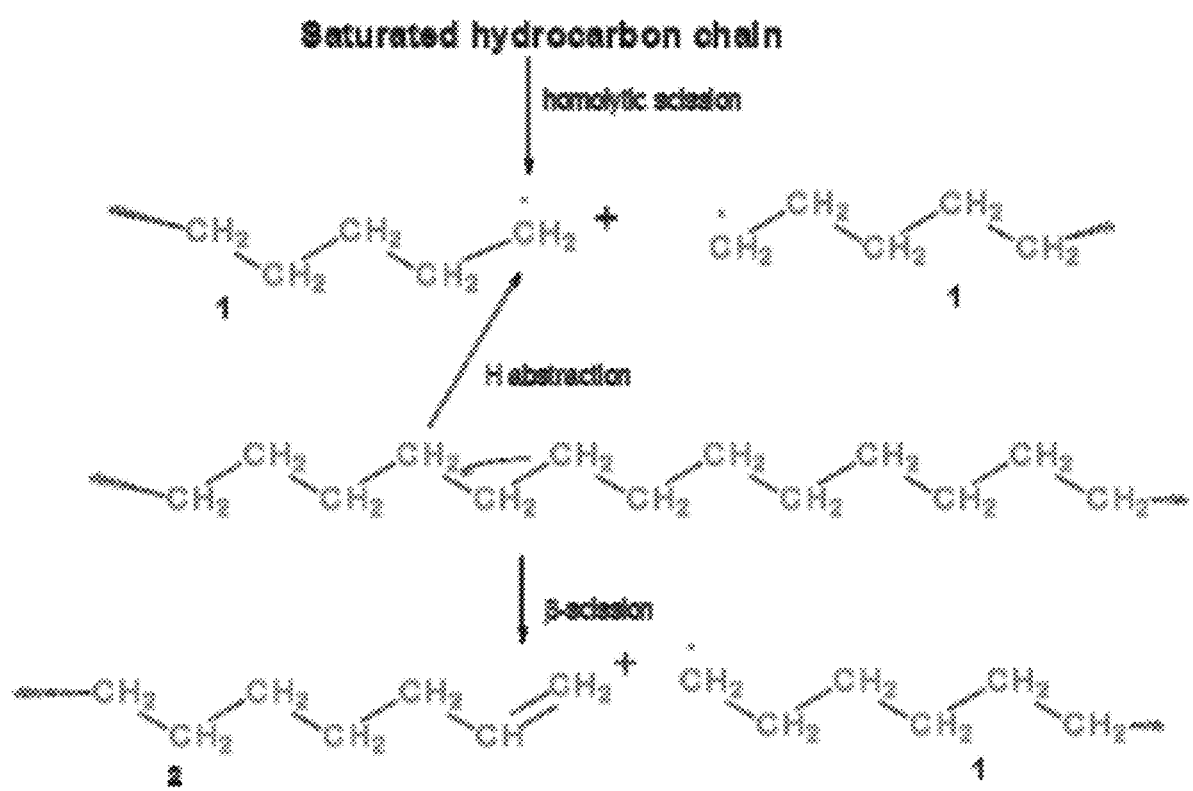
FIG. 3 illustrates a free radical decomposition of saturated hydrocarbon chain polymer (in this case PE) through random cleavage.
Figure 4:
FIG. 4 illustrates reactions that take place during fuel upgrading processes.
Figure 4:
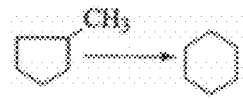
Figure 4:
Figure 4:
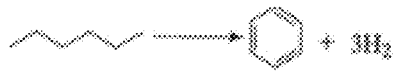
Figure 4:
Figure 4:
Figure 4:

Cracking of PE, PP, and PS takes place through: end-chain scission or depolymerization, producing monomers (PS); or random chain scission, randomly breaking down into fragments of various lengths (PE, PP, and PS; see FIG. 3 for a scheme of the free radical cracking of PE).

Weak chemical bonds may crack through a radical mechanism at temperatures as low as 300° C., although this type of degradation of organic compounds typically occurs at temperatures above 400° C. (19). A radical chain reaction proceeds through the repetition of a reaction in which a free radical attacks a stable molecule and produces a new reactive radical. The recombination or termination of free radicals through reaction with another radical or radical trap may stop the process.

Homolytic scission of a C—C bond in saturated hydrocarbon polymers leads to two macroradicals FIG. 3). Typically, free radicals will initiate a hydrogen abstraction, transferring the radical site to another molecule (this is shown in FIG. 3) or to a neighboring section of the same molecule. A vinyl-group terminated polymeric chain (2) and a new secondary macroradical (1) are produced through the β-scission of the polymer when the radical is located mid-chain. A terminal macroradical may be more likely to abstract hydrogens from carbon atoms of its own coiled chain, which are more accessible with a favorable conformation. When decomposition takes place through this route, the oligomeric compounds formed are of smaller molecular mass than the products of the random chain scission.

Because all the C—C bonds in PE are of the same strength, the backbone of PE is broken randomly and the resulting products are of the form of alkanes, alkenes and alkadienes of smaller size. The covalent bond between two carbon atoms is cleaved homolytically to form fragments carrying one electron each. Random depolymerization also involves formation of free radicals at some point on polymer backbone, producing small fragments of varying chain length (20).

Polypropylene has a similar structure to PE except that every second carbon along the backbone possesses a methyl group, making them tertiary. Scission of PP occurs on the carbon chain between secondary and tertiary atoms (20).

Polyvinyl chloride degrades around 250 to 300° C., producing HCl. Although the PVC degradation mechanism is extremely complex, it appears that the free radical path plays a major role (20). In the probable mechanism, a free radical, produced either by impurities or by reaching a desired temperature, abstracts hydrogen from a methylene group while simultaneously transferring the free radical site onto the chain. The chlorine atom that is at β-position with respect to the free radical chlorine atom is released as a free radical, and stabilizing the structure.

Because aromatic or partly aromatic polymers do not provide much opportunity for rearrangement allowing a continuing decomposition, the free radical reactions are not chain reactions (19). The free radicals produced by the cleavage of alkylene, ester, ether or amide linkages connecting the aromatic rings into macromolecules cannot be stabilized because there are not enough hydrogen atoms available. For this reason, only a fraction of the thermal fragments are volatilized, and those radicals that are not able to abstract hydrogen recombine with other radicals, forming a carbonaceous residue.

Fuel Upgrading Reactions:

Fuel oils produced from thermal pyrolysis of plastics cannot be used directly as gasoline or diesel because (1) unsaturated hydrocarbons (olefins) are not stable and can be polymerized and/or oxidized to reduce the fuel value; (2) they have low octane ratings, measured commonly by Research Octane Number (RON) which is defined as:

$$RON = -1.0729 Y_{NP2} + 0.7875 Y_{IP1} + 0.0978 Y_{IP2} + 0.3395 Y_{CP} + 0.4049 Y_{AR} + 69.0306 \quad (1)$$

where: $Y_i$ is the weight fraction of the ith component in the gasoline fraction, NP2 is the n-paraffins without $C_5$, IP1 is the total isoparaffins from $C_5$ to $C_7$, CP is the total cycloparaffins, IP2 is the total isoparaffins without $C_5$-$C_7$, and AR is the total aromatics.

Based on this definition, n-paraffins reduce RON and are not beneficial in terms of octane rating. isoparaffins, aromatics and cycloparaffins are desirable high quality gasoline compositions. In order to increase the fuel quality, fuel oils produced via the plastic pyrolytic process require further processing to eliminate unsaturated olefins and increase octane rating that can be defined as fuel upgrading or "refinery" processes. The chemistry in the fuel refinery process is complicated and involves several basic reactions, isomerization of paraffins and naphthenes, dehydrogenation, dehydrocyclization, hydrocracking, and dealylation, in which n-paraffins in pyrolytic fuels are converted to produce branched paraffins, cycloparaffins and aromatics. Solid acidic catalysts (zeolite) are commonly used in this process. Conventionally, high quality liquid fuel production from waste plastics requires two stages: (1) plastics thermal pyrolysis and (2) catalytic fuel upgrading. Chemically, fuel upgrading processes involve the following reactions (21) over dual functional catalysts that are metal catalysts loaded in the solid acidic support:

Similar to the thermal catalytic cracking of plastics, fuel upgrading reactions not only depend on the metal catalysts, but also on their location on the support with respect to the catalytic behaviors.

Chemistry of Liquid Fuel Production Via Catalytic Pyrolysis of Waste Plastics:

The oils obtained in pyrolysis of polyolefin containing plastics mixtures are frequently wax-like semisolid products. The use of catalysts can result in the production of more light and valuable products. The oils obtained in catalytic processes maintain a liquid state at room temperature (22). The advantages of catalytic pyrolysis compared to thermal pyrolysis have been reported by several authors: lowering of the reaction temperatures; faster cracking reactions, which lead to shorter residence times; and selectivity toward valuable products (23).

Types of Catalysts: Homogeneous Vs. Heterogeneous Catalysts:

Two types of catalysts have been studied in polymer pyrolysis: homogeneous catalysts, such as $AlCl_3$, $TiCl_4$, (24) and red mud (25); and heterogeneous catalysts, either conventional acid solids like silica alumina zeolites, and fluid catalytic cracking catalysts (26, 27), or more novel ones like aluminum pillared clays (28, 29), and nanocrystalline zeolites (30, 31).

Homogeneous catalysts are mixed with the polymer and therefore it is quite difficult to recover them (22). However, with homogeneous catalysts it is possible to use smaller amounts because they have high contact with the polymer melt. Homogeneous systems are usually based on Lewis acids, such as aluminum trichloride and metal tetrachloroaluminates. When using Lewis acid catalysts ($AlCl_3$) for polyethylene cracking, Ivanova et al. (32) obtained much higher amounts of short hydrocarbons such as butenes, compared with thermal cracking. The use of $AlCl_3$ or a combination of $TiCl_4$:$AlCl_3$ as catalysts in a batch reactor reduces the process temperature dramatically. The use of small amounts of $AlCl_3$ (0.1%) produces products at 400° C. similar to the ones obtained at 500° C. in a non-catalytic process. It is possible to pyrolyse polypropylene at 300° C. when the amount of catalyst is higher.

Heterogeneous catalysts are easier to separate and recover from the reaction medium. However, they may present a limited activity due to the difficult access of the bulky plastic molecules to the internal acid sites. Nanocrystalline zeolites like HZMS-5 may overcome this problem since their nanometer crystal size provides a high external surface area accessible to the high molecular weight polymer molecules (22).

A wide variety of special zeolites such as HZSM-5, HY, $NH_4Y$, NaY, MCM-41 and FCC-catalysts have proven particularly effective in pyrolysis (33, 34). It was reported that catalyst pore size and acidity are important factors. Zeolites favor hydrogen transfer reactions due to the presence of acid centers and help in the cracking of the polymer. The activity of the zeolite catalyst depends on the ability of the molecules to access and be adsorbed at the reactive sites, which is controlled by the pore size and the size of adsorbents and products (35). The geometry and high diffusion of reactants in the surface structure of zeolites makes them selective towards the formation of alkenes, cycloalkanes, and aromatics (35, 23). Aguado et al. (36) investigated a zeolite catalyst for polyethylene cracking. It was reported that over n-HZSM-5, 77 wt % of product was a gasoline fraction compared to only 56 wt % without the catalyst.

New Catalysts and Co-Catalysts:

Although the most common catalysts used in the cracking of hydrocarbons polymers are acidic catalysts, alumina and silica-alumina with mesopores, and zeolite with micropores, many other types of catalysts have been successfully used, including catalysts based on reforming, alkali metals, base catalysts, and noble metal based catalysts.

Catalysts such as metal oxides, metal complexes, and alkali metal carbonates or alkaline metal carbonates have been used to enhance recovery of monomers. Degradation of polyethylene on solid bases (ZnO, MgO, $TiO_2$) produces more oils than on solid acids, although completion of degradation is more time consuming on solid bases than on solid acids (37). The composition of oil on solid bases is reported to be rich in 1-olefins and is poor in aromatics and branched isomers. Solid alkalis also catalyze the degradation of polystyrene more efficiently than acidic catalysts, which may be attributed to differences in polymer cracking mechanisms (38). The oils obtained when solid acids were used contained mainly styrene monomer and dimer. On the solid alkalis, the fraction of monomer found in the product oils increased to about 75%.

Use of lead sulfide catalysts in pyrolysis converts polyethylene into liquid, gas, and wax with nearly 100% efficiency. Additionally, with lead sulfide the char formation is insignificant, which means the catalyst can be used several times without treatment. The pyrolysis products mainly consist of paraffinic and olefinic compounds that are suitable to be used as fuel oil for various energy purposes (37).

Metals such as nickel or iron ordered inside a layered silicate clay framework have been demonstrated to be effective cracking catalysts. Manos (28) decompose polyethylene using two natural clays and their pillared analogues, and although these clays were less active than US—Y zeolite, their liquid products were around 70% compared with less than 50% over US—Y zeolite. Additionally, the liquid products obtained from the clay catalysts were heavier. These results were attributed to the milder acidity of the clays, preventing overcracking, which occurs with the very strongly acid zeolites. The milder acidity of the clays also results in significantly fewer hydrogen transfer secondary reactions compared with US—Y zeolite, consequently producing alkenes predominantly with the clay catalysts. An additional advantage of these catalysts is that considerably less coke is formed.

Tu et al. catalytically cracked LDPE over base catalysts based on layered double hydroxides (LDH) (39). LDHs are layered compounds resembling the naturally occurring hydrotalcite, and because they contain positively charged layers and anions in the interlamellar space, are generally considered to correspond to the clays. The LDPE was catalytically cracked over three LDHs (MgAl, NiAl, and ZnAl) and the catalytic activities and product distributions obtained with these materials were compared with those of thermal cracking and cracking over acid solid HY-Zeolite catalyst. The LDPE was completely converted to liquid product, gaseous product, wax, and coke at 400° C. Catalytic cracking of LDPE over LDH catalyst increased cracking activity compared to thermal cracking, with NiAl and ZnAl LDHs having better potential catalytic properties for LDPE cracking than MgAl LDH. Solid HY acid catalyst exhibited a similar activity to NiAl and ZnAl LDH. However, because they were more basic in nature, LDHs produced heavier hydrocarbon liquid than the HY. The order was as follows: (lightest products) HY-Zeolite<NiAl<ZnAl<MgAl< thermal only (no catalyst) (heaviest products). Additionally, LDHs exhibited less coking than their HY counterpart, due to the lack of hydrogen transfer secondary reactions. HY exhibited enhanced isobutene production, which is indicative of high level of secondary reactions.

Considerable effort has been applied to investigation of bifunctional catalysts. Bifunctional catalysts have both a cracking function and another function (e.g. hydrogenation). The bifunctional catalysts used for polymer thermocatalytic degradation are usually composed of impregnated transition metals on silica-alumina or zeolite. The acidic support provides the cracking and isomerization function, while the other function is provided by the metals. The hydrogenation or aromatization activity of the catalysts depends on factors such as metal type, amount of metal used, the degree of metal dispersion, the location of metal on support, and metal-support interaction (40).

Many metals have been investigated as bifunctional catalysts, including noble metals and non-noble or transition metals (41, 42). Platinum and palladium have the highest catalytic activity. Rhodium is another important metal due to its ability to catalyze hydrogenation, allylic substitution, and C—H activation as well as other reactions (43). The noble metal content is usually 1% or less, while that of non-noble metals is larger, at 1 to 30% (40).

Along with metal quality, the support is also an important factor in cracking behavior. For example, Uemichi et al. used activated carbon, with different transition metals (Pt, Fe, Mo, Zn, Co, Ni, and Cu) as a bifunctional catalyst for PE degradation (57). The functions of this catalyst were cracking and dehydrogenation/hydrogenation. The metal increased the selectivity of aromatics with high octane number and decreased the formation of n-alkanes. The aromatic yield was the most effective in Pt, Fe, and Mo, and was also strongly dependent on the support, which was much more efficient on activated carbon than on $Al_2O_3$ and $SiO_2$—$Al_2O_3$. The activated carbon sites abstracted hydrogen atoms from the polymer and the hydrogen atoms migrated to the metal sites which catalyzed hydrogen atom desorption. The same authors investigated the use of Pt/C and Fe/C in the catalytic decomposition of polypropylene (44) and reported that both catalysts increased aromatics yield, although Pt was more active than Fe.

Catalyst Preparation Technologies

Many different types of catalysts have been used in pyrolysis, each often having a number of ways they can be prepared. This section outlines a number of standard preparation methods for various common catalysts.

There are many natural and synthetic zeolite structures, with wide ranges of Si/Al ratios. Zeolites such as Na-ZSM-11 zeolite (Si/Al=17) and Na-MCM-41 (Si/Al=20) can be prepared using sol gel techniques with tetraethylorthosilicate as the source of silicon and $NaAlO_2$ as the source of aluminum. Ammonium, zinc, and molybdenum forms of the catalysts can then be obtained through ion exchange with appropriate solutions (45, 46).

Ni—Mg—Al catalysts can be prepared using a pH technique. A precipitant ($NH_4OH$) is added to an aqueous solution containing ions of each metal and the same counter-ion until the final pH of 8.3 is obtained (47).

To prepare precious metal supported on carbon catalysts, solutions of the carbon support and precious metal precursor solutions are dispersed in an aqueous solution for long periods to ensure saturation adsorption (48, 49). The catalyst is reduced in a stream of hydrogen.

Before using, catalysts are typically crushed, pelleted, and sieved to give particle sizes ranging from 75 to 180 nm (50, 51, 52, 53). In other cases, catalysts such as the FCC catalyst, which is composed of zeolite and matrix such as alumina and silica-alumina, can be prepared by spray drier to make a strong fine powder type.

Catalysts: Conversion and Selectivity:

Various catalysts properties impact the output product in pyrolysis, including surface area, particle size distribution (PSD), and pore structure (20). The surface area is the measure of catalyst activity (as long as the same catalyst types are compared) and high surface area also results in increased adsorption of hydrocarbons. The particle size distribution indicates the catalyst fluidization properties, which generally improve as the fraction of 0 to 40 μm particles is increased. However, a higher fraction of 0 to 40 μm particles will also increase catalyst losses. The PSD is controlled by catalyst manufacturers through the spray drying cycle. Another key factor in catalytic performance is the pore size distribution, for which optimization depends on feedstock type and cracking conditions.

Several researchers demonstrated that pore size is important in catalyst selectivity. Manos (54) used different zeolites to investigate the catalytic degradation of high-density polyethylene and found that the product range was typically between $C_3$ and $C_{15}$ hydrocarbons. Zeolite structures produced distinctive patterns of product distribution. When extra large-pore ultrastable Y—, and β-zeolites were used, alkanes were the products with less alkenes and aromatics and only very small amounts of cycloalkanes and cycloalkenes. Use of medium-pore mordenite and ZSM-5 produced significantly more olefins because secondary bimolecular reactions were sterically hindered. Medium pore zeolites produced hydrocarbons that were lighter than those formed with large pore zeolites. Manos found the carbon number distribution for each catalyst occurred in the: (lighter products ZSM-5<mordenite<β<Y<US—Y (heavier products). A similar order was found regarding the bond saturation: (more alkenes) ZSM-5, mordenite<β<Y<US—Y (more alkanes).

Many examples show that acidity and high surface area plays an important role on catalyst selectivity. Acidic zeolite catalysts (HZSM-5, H-ultrastable Y-zeolite (HUSY)) convert polyolefins more effectively than less acidic, amorphous silica-alumina and mesoporous MCM-41. For example, end-chain scission reactions of the polyolefins are promoted by nanosized HZSM-5 (with high external surface area and strong acid sites), producing light hydrocarbons ($C_3$-$C_6$); while mesoporous HMCM-41 produces heavier products (17). Modification of ZSM-5 zeolite acidity improves liquid yields and doubles the isoparaffin index of the liquid fuels (indicating higher liquid quality). The high catalytic activity of modified ZSM-5 was explained by its unique acidic properties with a sharp increase of the number and strength of weak acid sites and a decrease of strong acid sites (33).

Pore size and acidity can have a large impact on coke production during hydrocarbon cracking. Because coke deposits can accumulate inside the channel system of large pores, zeolites with larger pores (H—Y) deactivate more rapidly than the restrictive HZSM-5 and the non-zeolite catalysts (silica-alumina, MCM-41). Coke deposits on the outer surface of zeolites with smaller pores. Catalysts with weaker acid sites of lower density demonstrate superior tolerance to coke deposition. For example, clays, which have low acidity, are resistant to deactivation by coking (21).

Figure 5:
FIG. 5 illustrates cracking of polyolefins through acid cracking.
Figure 5:
Figure 5:
Figure 6:
FIG. 6 illustrates hydrogen abstraction by activated carbon (AC) to initiate hydrogen abstraction.

Catalytic Cracking Mechanisms:

Catalytic cracking requires the presence of a catalyst. Use of different catalysts results in different cracking mechanisms. For example, with acid catalysts, carbonium ions are produced through addition of protons to olefins or abstraction of hydride ions from hydrocarbon molecules (see FIG. 5). The polymer chains are cracked by reaction with protons or other carbonium ions, followed by chain scission, producing $C_{30}$-$C_{50}$ hydrocarbons. As a result of further cracking reactions by β-scission of $C_{30}$-$C_{50}$ carbons, gas and low molecular weight ($C_{10}$-$C_{25}$) liquid hydrocarbons are produced (18).

The degradation mechanism on solid alkalis follows a similar route to that that occurs for thermal degradation, except that it is initiated by the formation of carboanions rather than radicals. The degradation rate constant decreases with the increase in electronegativity of the metal element of the catalyst (55).

With metal-loaded activated carbon catalysts, hydrocarbons are cracked through a radical mechanism, like in thermal cracking (56). However, use of cobalt loaded activated carbon (Co-AC) catalysts produced a very different product distribution compared to thermal cracking. For example, at 425° C., the liquid product was produced when Co-AC was used, but was not when no catalyst was used. The free radicals on the carbon surface of Co-AC initiate hydrocarbon cracking by hydrogen abstraction.

Figure 7:
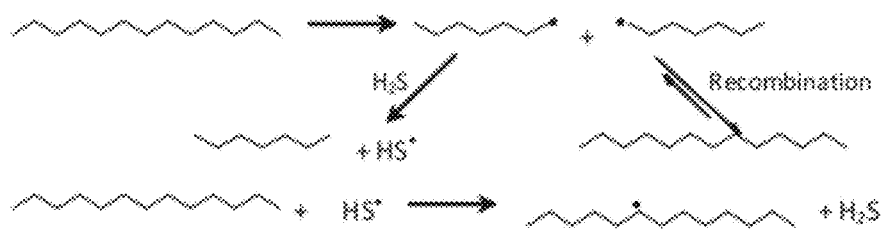
FIG. 7 illustrates the use of $H_2S$ in cracking of PE for thermal cracking and in the presence of Co-AC.
Figure 7:

The concentration of free radicals in radical generation can be controlled by $H_2S$ (56). The hydrogen of $H_2S$ is abstracted by the hydrocarbon radical to form a stable hydrocarbon and HS* in thermal cracking. The HS* subsequently abstracts a hydrogen from the hydrocarbon, preventing the demise of hydrocarbon radicals. In the presence of M-AC catalysts, $H_2S$ forms H* and HS*. Either a hydrogen is abstracted from the hydrocarbon by HS* or HS* is stabilized on the supported metal catalyst by hydrogenation. These explanations are shown schematically in FIG. 7. When no catalyst is present, hydrocarbon quenching (with a hydrocarbon radical) may be more pronounced than hydrogen quenching (with H*), which may account for decreased gas formation that is observed with the Co-AC catalyst.

Reactor Designs and Reaction Conditions:

Many different types of reactors have been used to produce liquid fuels from waste plastics. Each of these reactors has their own advantages and disadvantages. There are many sub-types in each of these reactors. Some of the basic types of reactor systems are—

1) Batch system—Due to the ease of operation of a batch/semi-batch system on a small scale, most of the work reported in literature use these systems. In a batch system, secondary reactions like oligomerization, cyclization and aromatization take place after the primary cracking reaction (57). A semi-batch reactor where an inert gas purges the volatile primary products does not promote these secondary reactions. Lee et al. (58) have studied the catalytic cracking of waste plastic over spent FCC catalyst in a semi-batch reactor. They observed that olefins were the main product of cracking of HDPE and LDPE. Due to the batch nature of these systems, these cannot be scaled up easily.

2) Fixed bed—These systems are well suited for gas-solid reaction systems where the solid phase is the catalyst. For use in plastic systems, the feed has to be thermally treated or cracked before feeding into a fixed bed of catalyst. Masuda et al. (59) have studied catalytic cracking of polyethylene on various zeolites like REY, Ni-REY and HZSM-5. Reactions carried out under steam at 400° C. with H-ZSM-5 showed rapid deactivation because of dealumination of the framework in the presence of steam. Ni-REY showed good conversion and selectivity towards gasoline.

3) Fluidized bed—There are various different processes which use the fluidized bed reactor, including the Akzo process and the Hamburg process. Different types of fluidized bed reactors include circulating fluidized bed and bubbling fluidized bed. Kaminsky (60) developed the Hamburg process where the reactor is fed into the fluidized bed of sand by two screw conveyors. The product obtained at 510° C. consisted of waxy compounds while higher temperatures led to product which consisted mainly of benzene, toluene, and xylene (BTX). The same group has also studied the use of FCC catalyst instead of sand in the process (61). This resulted in higher gas yields for polyethylene cracking reaction.

4) Screw/rotary kiln—These reactors are similar to the extruders used in polymer processing. Two variations of these are internally heated and externally heated. Various processes that use this kind of reactors are Veba pyrolysis process, Conrad recycling process, Serrano's screw kiln reactor, double rotary kiln process, Faulkner process for tires, and VTA process.

5) Microwave reactor—These reactors use microwave-assisted or induced pyrolysis of plastics. Most of the work carried out is in a semi-batch system or in a thermogravimetric set-up. In a semi-batch set-up, it was reported that microwave assisted pyrolysis of polyethylene resulted at 500° C. resulted in 19% yield of gas products and 81% yield of oil/wax (62).

There are many different types of plastics pyrolysis processes that make use of the above mentioned reactors to produce liquid fuels, including the Veba process, BP process, Fuji process, BASF process, Hamburg university process, Hunan university process, United carbon process, Likun process, USS process, and Kurata process.

Case Studies:

Commercially available processes have been reported and summarized (16, 17, 21, 63). Based on the aforementioned chemistry of the pyrolysis and upgrading of plastics, most these processes fundamentally consist of two steps: pyrolytic process (including thermal pyrolysis and thermal catalytic pyrolysis) and fuel upgrading process. Two commercial processes, China Sida process (64) and Thermofuel™ process (17), are selected as case studies to enhance an overall understanding of liquid fuel production using waste plastic materials.

Figure 8:
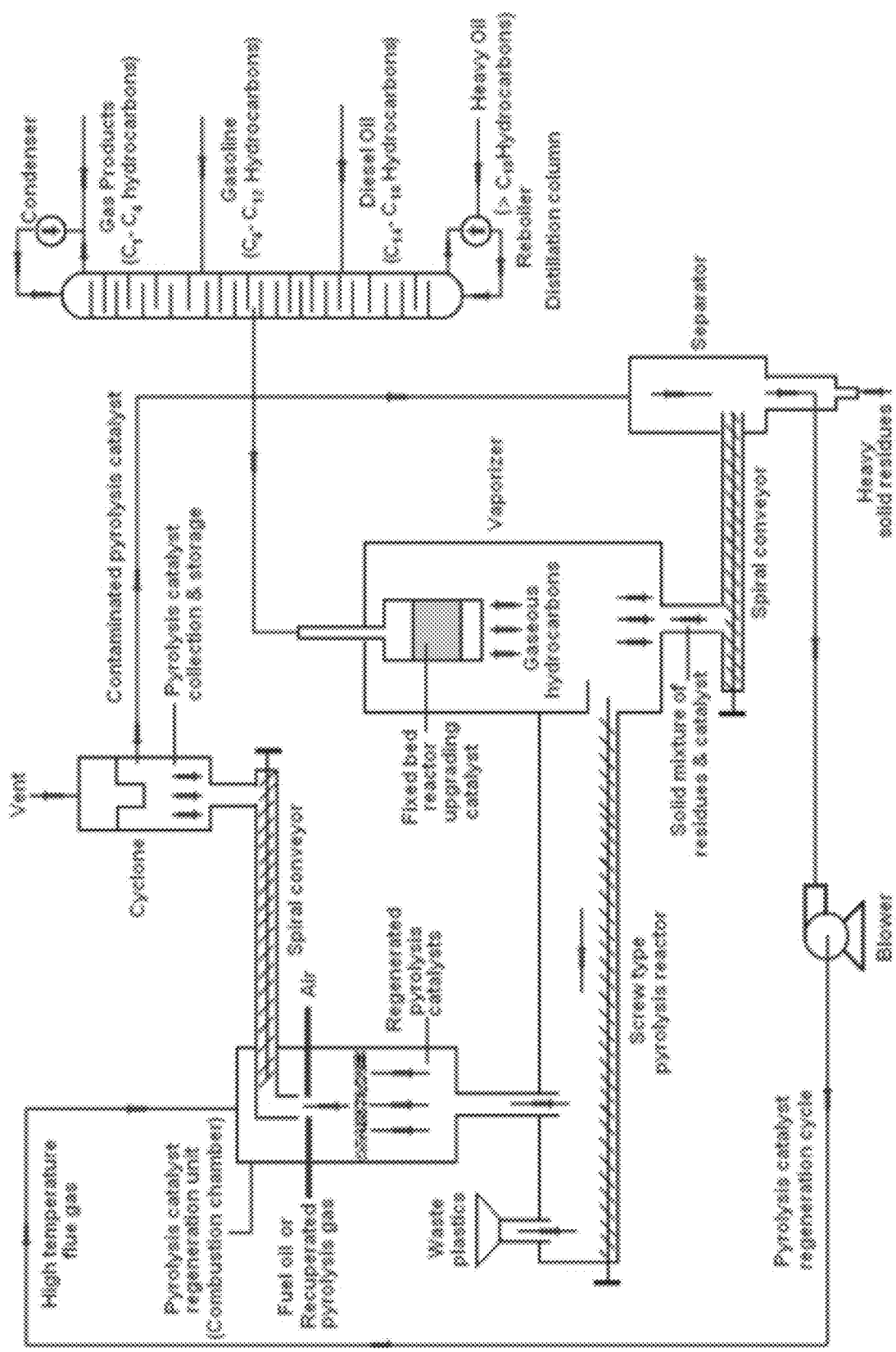
FIG. 8 illustrates a flow diagram of the China Sinda process.

China Sida process (64): The schematic flow diagram is depicted in FIG. 8. This process consists of four major sections: pyrolysis catalyst regeneration cycle; screw type pyrolysis reactor; fixed bed fuel upgrading reactor; and separation unit operation. As shown in FIG. 8, the light and granular form pyrolysis catalyst is fed and mixed with waste plastic feedstock into a screw type reactor where plastic materials are decomposed to produce light hydrocarbon components. After pyrolysis, pyrolysis catalyst particles are separated from heavy solid residues and collected in a cyclone. Because of the decomposition of high molecular weight organic components on the surface of catalyst particles, the contaminated catalyst is sent to a combustion chamber heated by the burning of oil (or recuperated pyrolysis gas) to clean up surface deposits. The regenerated catalyst is then fed into the pyrolysis reactor to close the cycle. A small amount of pyrolysis catalyst particles remaining in the high temperature flue gas are led to a separator via a blower and mixed with the contaminated catalyst for regeneration. The thermal catalytically cracked hydrocarbons after pyrolysis are fed into a fixed bed reactor where they are upgraded for the production of a mixture of high quality gasoline and diesel fuels. Upon passing through a distillation column the mixture is separated into gaseous products, gasoline, diesel and heavy oils.

The details regarding catalyst compositions, reaction conditions and product distributions are summarized as follows:
1. Pyrolysis catalyst: 1,600 kg water glass is mixed with 400 kg $Al_2O_3$ powder and 800 kg HZSM-5 zeolite type catalyst. The slurry is dried at 800° C. for 4 hours to obtain 8.5 Mohs' scale of hardness and then granulated to an average diameter of 0.4 mm. 2,000 kg prepared catalyst is mixed with 1400 kg waste plastic feedstock for production of gasoline and diesel fuels.
2. Waste plastic feedstock: 1,400 kg waste plastics containing 25 wt % of PP, 25 wt % of PS and 50 wt % of PE are used as feedstock.
3. Catalytic pyrolysis conditions: This process is carried out at temperatures of 600 to 700° C. with the outlet temperature controlled at 500 to 600° C.
4. Upgrading process: The fuel upgrading reaction is carried out in a fixed bed reactor at temperatures ranging from 300 to 450° C. and pressures of 0.05 to 0.1 MPa in the presence of an upgrading catalyst. The composition of this catalyst is: 8 wt % of CHO-1 (a commodity produced by China Qilu petrochemical Factory), 24 wt % of REY, 25 wt % of flokite with silicon:aluminum=12:1 and 43 wt % of ZSM-5 catalyst. All these components are thoroughly mixed and then calcined.
5. Regeneration operation: No. 0 diesel fuel or recuperated pyrolysis gas is used as a heat source to provide temperatures of 600 to 700° C. in the combustion chamber to regenerate 2000 kg of contaminated pyrolysis catalysts.
6. Product distributions: The products generated from the China Sinda process include 630 kg gasoline with RON=93.5 (paraffin 19.9 wt %, cyclanes 12 wt %, olefin 48 wt %, arenes 9.9 wt % and others 10.2 wt %), 420 kg diesel with cetane value=52 (paraffin 15 wt %, cyclanes 8 wt %, arenes 10 wt %, and others 12 wt %), 140 kg inorganic residues and 210 kg of flammable gas.

Figure 9:
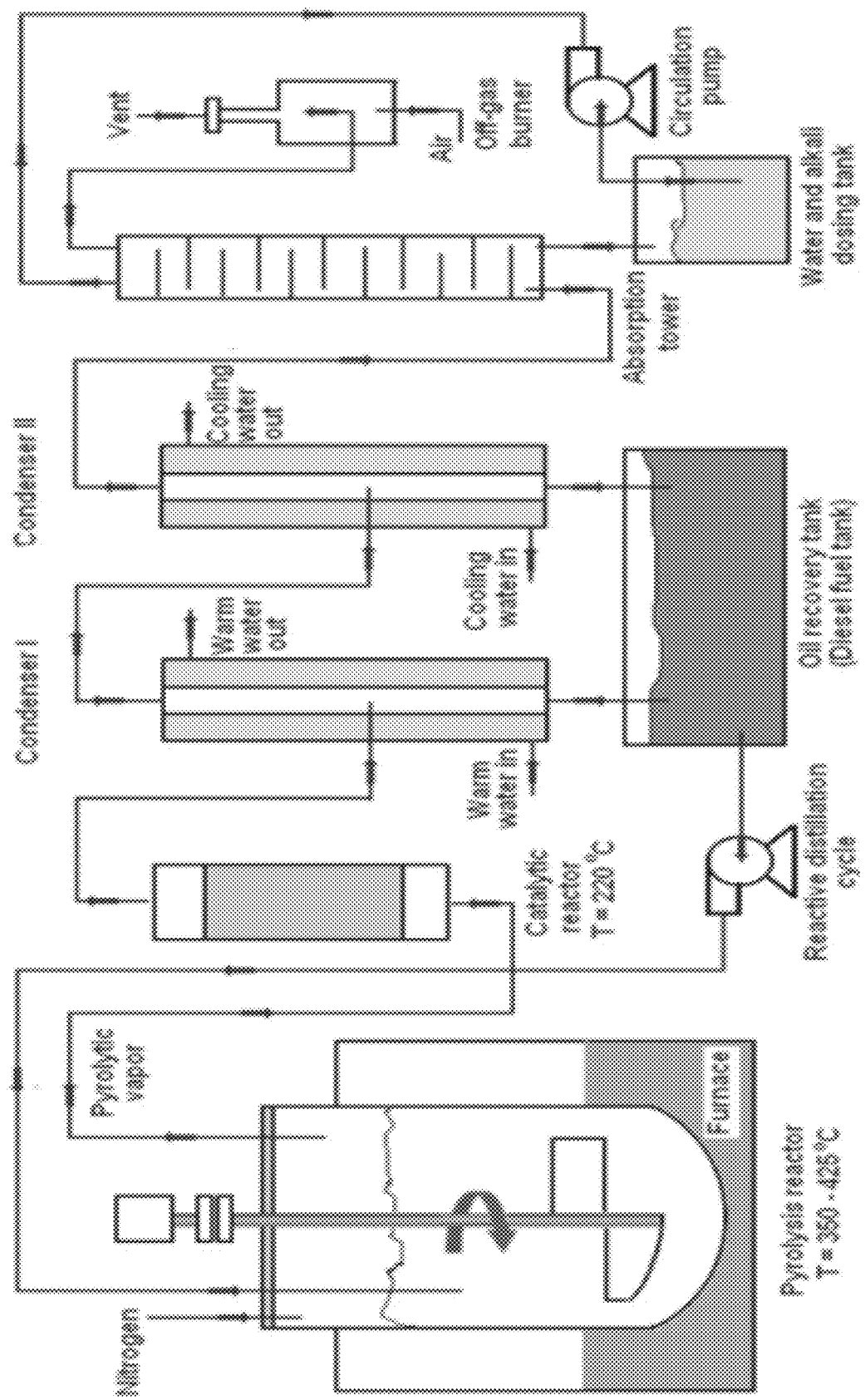
FIG. 9 illustrates a simplified flow diagram of the Thermofuel™ process.

Thermofuel™ process (17): In compare with the China Sinda process, this process also consists of two major stages: thermal pyrolysis of waste plastics and catalytic conversion (upgrading) of pyrolysis hydrocarbons as shown in FIG. 9. Waste plastic feedstock is first melted and then thermal chemically decomposed in a stainless steel chamber with a temperature ranging from 350 to 425° C. and under an inert gas (nitrogen) atmosphere. To maintain the uniform temperature distribution and prevent hot-spots, the reaction chamber is under a continuous stirring condition. Part of the fuel oil recovered from the waste plastics is used as a heat source to carry out this thermal pyrolysis reaction. To maintain the heat transfer rate, constant removal of carbonaceous char from the reactor wall generated during the plastic thermal decomposition is critical.

The hot pyrolytic gaseous products are fed into a catalytic reactor at 220° C. to convert straight-chain aliphatics into branched-chain haliphatics, cyclic aliphatics and aromatic hydrocarbons. Metal alloy based catalysts are coated onto metal plates, serving as upgrading catalysts. The reactor heat is provided by the high temperature exhaust gas from the pyrolysis reactor to increase the heat utilization efficiency. A specially designed configuration is employed in the upgrading reactor chamber to maximize the contact time and area. The gaseous products from the outlet of the upgrading reactor are then fed into two condensers in series. The coolant used in the first condenser is warm water and the second condenser uses cooling water to collect liquid diesel range liquid products. Off gases containing light hydrocarbons from the two condensers are sent to an absorption tower where the heavier hydrocarbons are collected and the rest are burnt in an off-gas burner.

One important feature of the Thermofuel™ process is the instruction of reactive distillation technology to the process. To obtain equivalent diesel products, this process not only uses two specially designed condensers to collect liquid hydrocarbon fuels, but it also employs a reactive distillation method to increase the quality of fuel produced. When the number of carbon chains in the oil recovery tank exceeds diesel fuel range, the collected fuel in the oil recovery tank is cycled back to the pyrolysis reactor until a desirable centane number is achieved.

Fundamentally, based on the chemistry of liquid fuel production discussed previously, high efficiency and high selectivity catalysts are essential to achieving cost effective and clean energy recovery from these materials for all the processes. In summary, waste plastic materials can be utilized commercially for the production of high quality gasoline and diesel fuels. The main steps for fuel production using this resource involve plastics pyrolysis (catalytic pyrolysis and thermal chemical pyrolysis), fuel catalytic upgrading and separation. Because of carbon decomposition, solid acid based catalysts used in pyrolytic step require a burning process to regenerate the catalyst. Metal or alloy based catalysts are employed as fuel upgrading catalysts to increase quality of the fuels generated from pyrolytic reaction. Because the processes of waste plastics pyrolysis and catalytic upgrading generate a wide range of product fuels, precise unit operations for separating variety ranges of fuel are essential. Integrating separation process into plastics pyrolysis (reactive separation) will normally generate higher quality fuels and reduce the cost of fuel production. However, simplicity of design and optimization are critical in terms of cost reduction and efficiency enhancement. When chlorine containing plastics (such PVC) are involved, HCl removal step is needed to avoid deactivation of a metal or alloy based catalysts. All in all, process optimization in design and control and heat management will enable a highly efficient chemical plant for the production of high quality fuel using waste plastic feedstock.

Model Studies:

Polyethylene is one of the most important and simplest plastics. The chemistry of liquid fuel production from polyethylene is a typical example for the processing of waste plastic materials. In this section we select low density polyethylene (LDPE) as a model waste polymeric material and focus on the chemistry of fuel production using this feed material. The fundamental understanding derived from this material will provide the basics for the processing of a variety of waste plastics.

Figure 10:
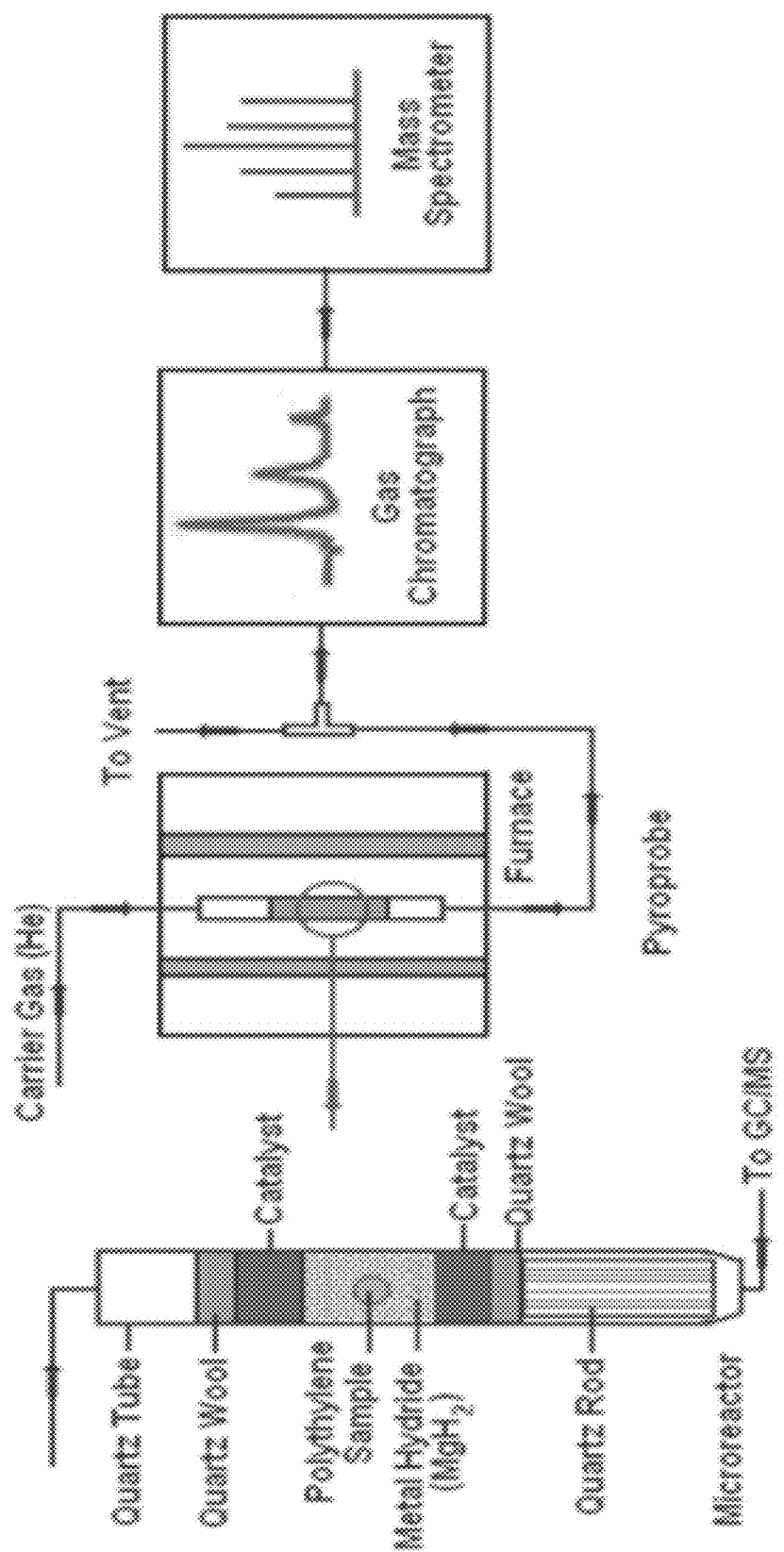
FIG. 10 illustrates an experimental setup for catalyst evaluation (Microreactor: $\phi 2 \times 30$ mm).

Experimental Methodology:

There are a wide range of hydrocarbon products formed during the thermal decomposition of waste plastics. Mass spectrometry (MS) is the most suitable option for analyzing the pyrolytic products separated by a gas chromatograph (GC). A micropyrolyser coupled to GC/MS (Py-GC/MS) can serve as a rapid analytical instrument for predicting plastic pyrolytic products that can provide important information for mechanism discussion. In addition to the analyses, we have developed a technique using a micropyrolyser as a catalytic reactor for catalyst evaluation and screening. The Py-GC/MS unit consists primarily of two subunits—the CDS analytical's Pyroprobe 5250 and the Agilent-JEOL GC/MS. The Pyroprobe 5250 subunit is used to perform the pyrolysis of the LDPE samples as well as to convert the pyrolysates to fuel over the catalyst bed. The GC/MS subunit is used for analyses of the resulting products. A flow diagram of the PyGC-MS system is shown in FIG. 10.

The Py-GC/MS consists of an autosampler that can hold up to 32 sample tubes (quartz). During the run, the sample tube automatically drops into the heated reaction chamber. The quartz reaction tube is open ended with a slight curvature at the bottom end so as to hold the solid quartz rod. This rod acts as a support for the reaction system. The polyethylene particle is embedded within the powdered catalyst particles. Above this is a layer of $H_2/CO_2$ source. During the run, this tube is dropped through a heating chamber where the sample is rapidly pyrolyzed and the hydrogen (or $CO_2$) source releases $H_2$ (or $CO_2$). Products generated are then sent to the GC-MS for analysis. The Pyroprobe 5250 also has an autosampler carousel whereby 32 samples can be run unattended, giving a means to screen the catalysts or see the effect of varying parameters like temperature and catalyst amount on the yields of different products. The GC/MS system consists of the Agilent 6890 GC (Agilent Technologies Inc., Santa Clara, USA) coupled with the JEOL GCmate-II MS (JEOL Ltd., Tokyo, Japan). Helium is used as a carrier gas at a flow rate of 2 mL/min. The column used is HP-5 ms (60 m×0.32 mm×0.25 μm) and the injection port temperature is kept at 300° C. The GC/MS interface temperature is at 250° C. and a split ratio of 10:1 is maintained.

In this section, the Py-GC/MS system is used as a tool for studying thermal cracking of LDPE as well as a microreactor for rapid screening and evaluation of thermal catalysts. The novelty of this approach is the use of magnesium hydride ($MgH_2$) as an in-situ hydrogen source to investigate the hydrocracking of LDPE samples. This approach can overcome the difficulties in using a gaseous hydrogen source in the Py-GC/MS system and extends the application of this method. An LDPE sample is mixed first with metal hydride, and then the sample and metal hydride layer is sandwiched by the hydrocracking catalyst to ensure that hydrogen released from $MgH_2$ can mix with the pyrolysates over the catalyst surface. The hydrocracking catalysts investigated involved metal based catalysts, (Mg and Ni) and supported catalysts (such as Ni/γ-$Al_2O_3$, Pd/γ-$Al_2O_3$ and Pt/γ-$Al_2O_3$).

Figure 11:
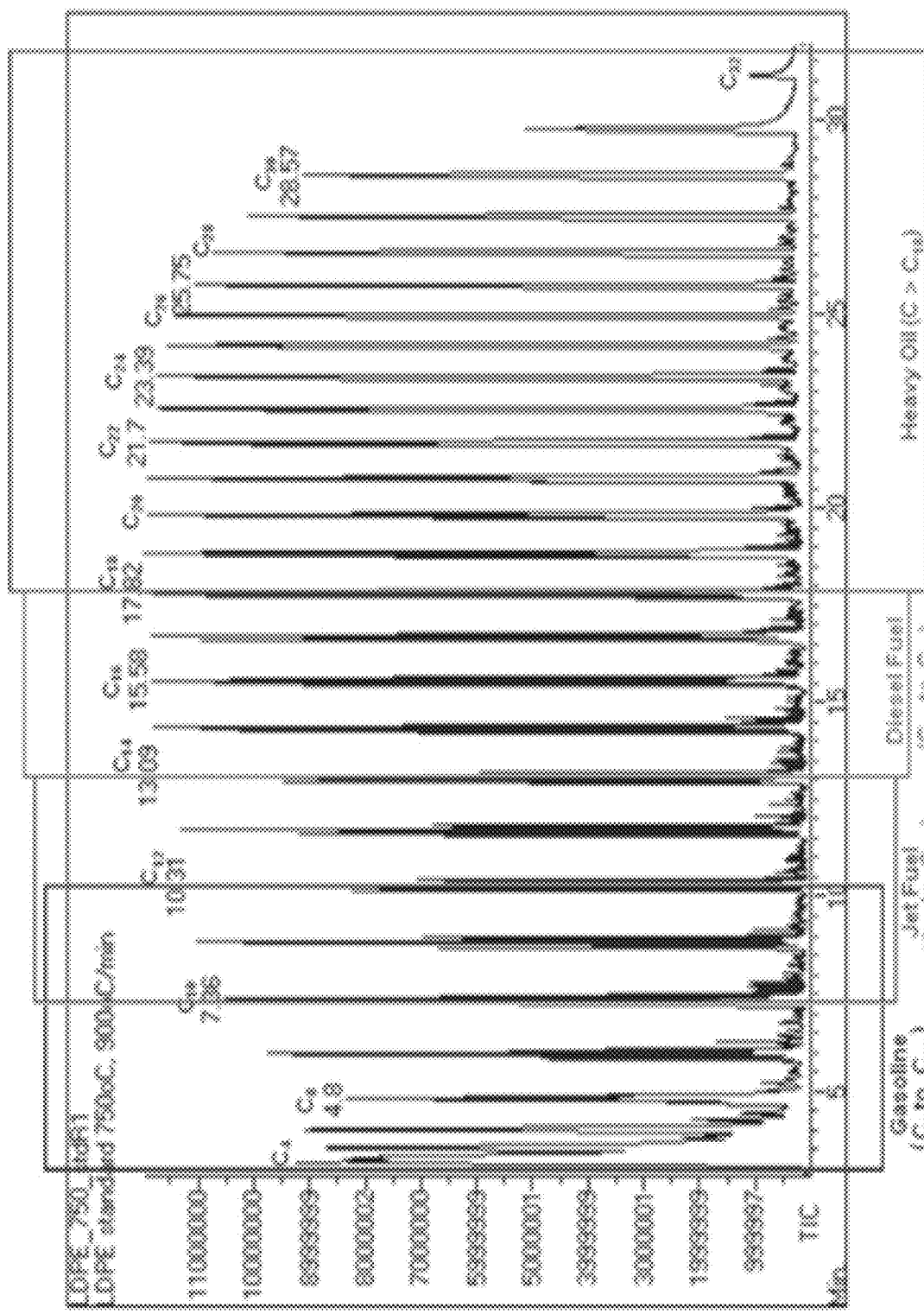
FIG. 11 illustrates low density polyethylene thermal pyrolysis products from thermal decomposition (750° C., 900° C./min).

In this Example, low density polyethylene (LDPE) is selected as a model plastic for the study of the chemistry of liquid fuel production. LDPE is a thermoplastic made from petroleum by the high pressure polymerization of ethylene. It is one of the major components of waste polymer materials. The study of LDPE can provide some guidelines for the processing of other polymer materials as reported by many researchers. The thermal pyrolysis and thermal catalytic pyrolysis of LDPE were carried out using a Py-GC/MS system to identify the products of LDPE decomposition. As shown in FIG. 11, LDPE thermal decomposition results in a wide range of liquid hydrocarbons (from $C_4$ to $C_{32}$). The GC/MS total ion chromatographic peak areas are not precisely proportional to the masses of the corresponding compounds. A rough estimate of the contribution of a range of products to the total pyrolysate can be made based on the relative peak areas of the program obtained by Py-GC/MS (19). In this work, the liquid fuel percentages are calculated based on the area percentages of corresponding pyrolysates and are listed in Table 3. The results of liquid fuel classifications indicate that the major hydrocarbons are components of gasoline (29.56%) and heavy oil and wax ranges (36.03%). Jet fuel and diesel are about 17.16% and 17.26%, respectively.

Figure 12:
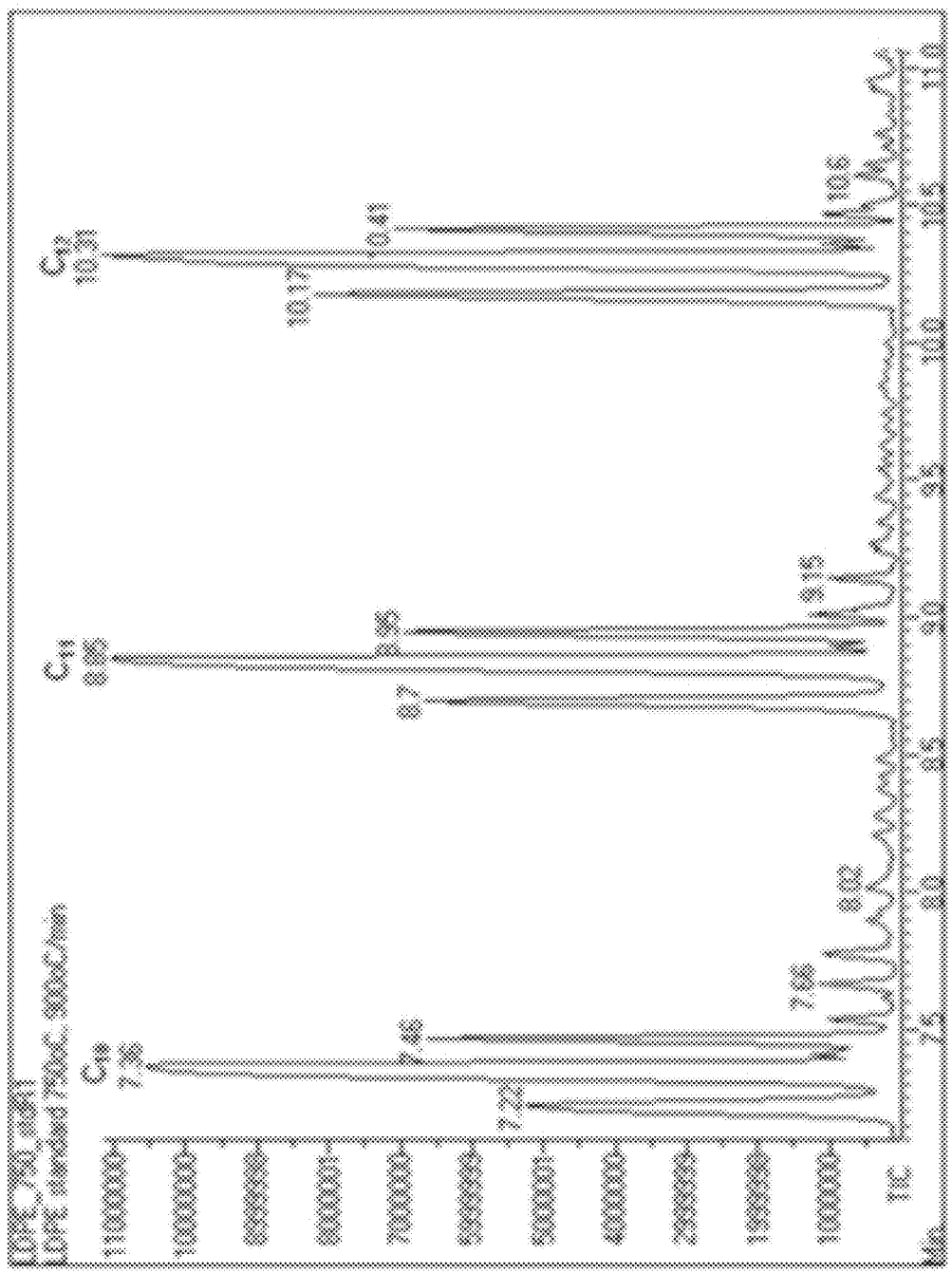
FIG. 12 illustrates GC spectra of $C_{10}$ to $C_{12}$ components from the thermal decomposition of low density polyethylene (T=750° C., t=15 s, heating rate=900° C./s).
Figure 13:
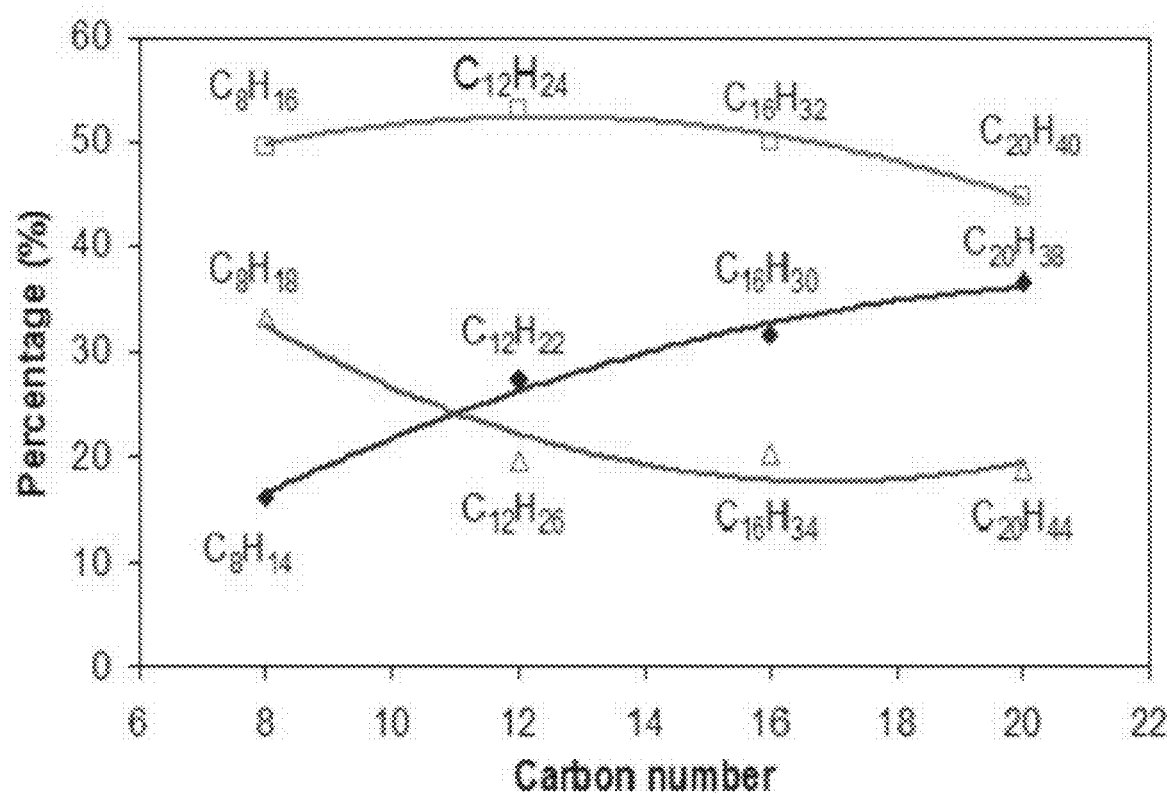
FIG. 13 illustrates percent of paraffins and olefins as a function of carbon number from the thermal decomposition of low density polyethylene (750° C., 900° C./min).

It should be pointed out that a large number of components are detected in the pyrolytic products, but the interesting components should be in the range of $C_4$ to $C_{18}$. The rest are in the heavy oil range and are not the focus of this paper. FIG. 12 shows the detailed GC spectra for $C_{10}$ to $C_{12}$. Each group of hydrocarbons is comprised of three major components. For example, with $C_{12}$; 1,11-dodecadiene, 1-dodecadene and decane are the three major components with the percentages listed in Table 4. The minor components are 2-dodecene and 3-dodecene. FIG. 13 depicts the percentage changes of major components as functions of carbon number, showing that alkane decreases with the increase of carbon number, the—dienes increase significantly with the increase of carbon number, and alkene remains nearly unchanged. However, careful examination of FIG. 11 reveals that when the carbon number increases to $C_{24}$, hydrocarbons constitute only alkanes and no alkene peaks are detected. Because of the limitations of the GC separation column, gaseous products such as $H_2$, and $C_1$ to $C_3$ are not shown in this experiment.

TABLE 3

Percentage of liquid fuels produced from thermal decomposition of low density polyethylene (750° C., 900° C./min)

| Fuel | Gasoline ($C_4$ to $C_{12}$) | Jet Fuel ($C_{10}$ to $C_{14}$) | Diesel Fuel ($C_{14}$ to $C_{18}$) | Heavy Oil & Wax (>$C_{18}$) |
|---|---|---|---|---|
| LDPE + 750° C. | 29.56 | 17.16 | 17.26 | 36.03 |
| LDPE + 850° C. | 34.55 | 16.87 | 17.85 | 30.73 |

TABLE 4

Distributions of pyrolysis products from the thermal decomposition of low density polyethylene (750° C., 900° C./min)

| | Retention time (min) | Component | Molecule formula | Percentage (%) |
|---|---|---|---|---|
| $C_8$ | 4.71 | 1,7-Octadiene | $C_8H_{14}$ | 16.03 |
| | 4.80 | 1-Octene | $C_8H_{16}$ | 49.58 |
| | 4.88 | Octane | $C_8H_{18}$ | 33.42 |
| $C_{12}$ | 10.17 | 1,11-Dodecadiene | $C_{12}H_{22}$ | 27.28 |
| | 10.31 | 1-Dodecene | $C_{12}H_{24}$ | 53.17 |
| | 10.41 | Dodecane | $C_{12}H_{26}$ | 19.56 |
| $C_{16}$ | 15.47 | 1,15-Hexadecadiene | $C_{16}H_{30}$ | 31.78 |
| | 15.50 | 1-Hexadecene | $C_{16}H_{32}$ | 49.92 |
| | 15.64 | Hexadecane | $C_{16}H_{34}$ | 20.30 |

TABLE 4-continued

Distributions of pyrolysis products from the thermal decomposition of low density polyethylene (750° C., 900° C./min)

| | Retention time (min) | Component | Molecule formula | Percentage (%) |
|---|---|---|---|---|
| $C_{20}$ | 19.77 | 1,19-Eicosadiene | $C_{20}H_{38}$ | 36.57 |
| | 19.84 | 1-Eicosene | $C_{20}H_{40}$ | 44.85 |
| | 19.89 | Eicosane | $C_{20}H_{42}$ | 18.58 |

Based on PY-GC/MS results, a mechanism for the thermal cracking of LDPE can be derived that consists of three possible processes: C—C bond breaking, C—H bond breaking, and hydrogenation. Bond cleaving can occur either on each carbon-carbon (C—C, 347 kJ/mol) bond or on carbon-hydrogen (CH$_3$—H, 423 kJ/mol, CH$_2$—H, 439 kJ/mol, CH—H, 448 kJ/mol and C—H, 347 kJ/mol. The average C—H bonding energy is 414 kJ/mol. The cleaving these bonds can resultin a variety of products. Due to the higher bonding energy of the C—H bond, the possibility of breaking this bond is less than that of the C—C bond. Taking $C_{12}$ as an example, the sequence of the thermal cracking can be written as follows:

C—C Bond Breaking (High Possibility):

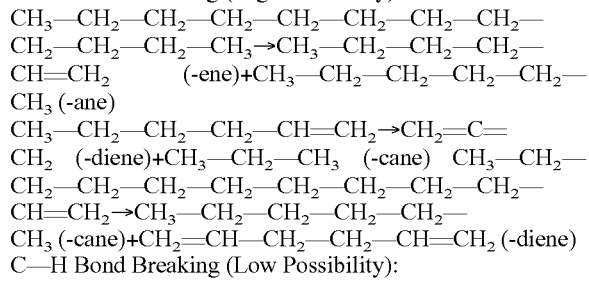

C—H Bond Breaking (Low Possibility):

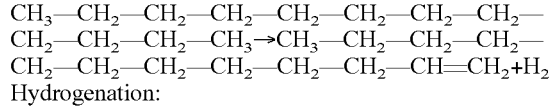

Hydrogenation:

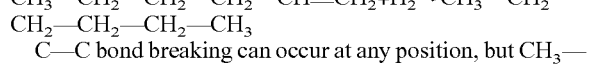

C—C bond breaking can occur at any position, but CH$_3$—CH$_2$-bond breaking shows higher possibilities than that of —CH$_2$—CH$_2$— breaking. The least possibility is the breaking of C—H bond. Hydrogen generated from this mechanism can react with alkenes to produce alkanes. As shown in FIG. 11, it appears that unsaturated longer chain hydrocarbons can be more easily hydrogenated than shorter chain ones because longer chain hydrocarbons are mostly saturated alkanes.

Figure 14:
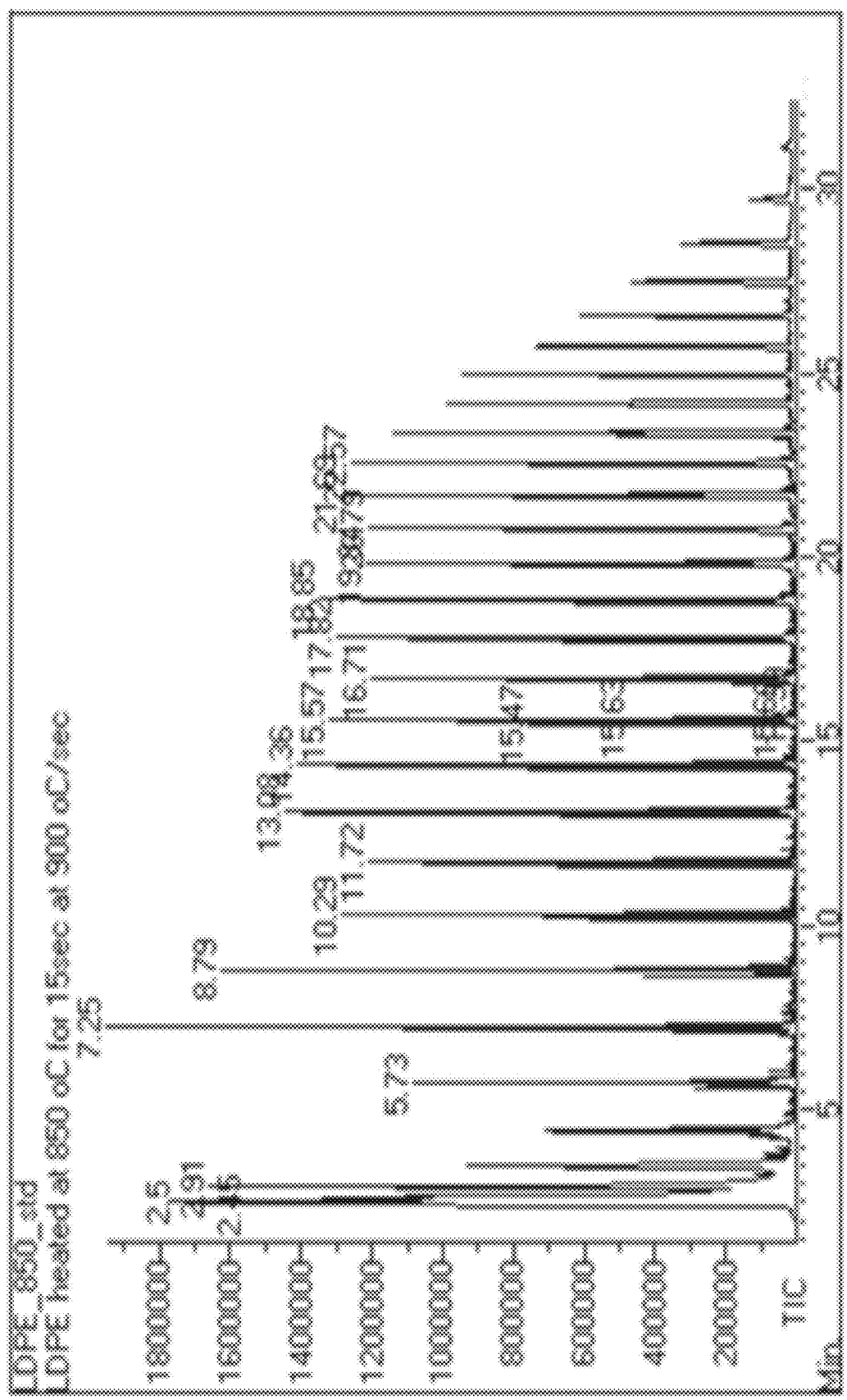
FIG. 14 is a graph that illustrates low density polyethylene thermal pyrolysis products (T=850° C., t=15 s, heating rate=900° C./s).

Liquid fuel pyrolysates are affected by factors such as reaction temperatures, pressures, heating times and heating rates. LDPE thermal decomposition at 850° C. was carried out using the Py-GC/MS system and the results (FIG. 14 and Table 5) indicate that a higher heating temperature (850° C.) generates more low-boiling point fuel (gasoline range) products, while jet fuel and diesel fuel percentages remain nearly unchanged. The major reduction comes from the heavy oil and wax range products, which decrease from 36.03% for 750° C. to 30.737% for pyrolysis at 850° C. It should be pointed out that the increase in the gasoline portion may indicate that gaseous products, including $C_1$ to $C_3$ and $H_2$, are also increased. In order to investigate product distributions for the same carbon numbers, Table 5 lists three major components for $C_{12}$ and $C_{16}$, respectively. Compared to LDPE pyrolysis at 750° C., both 1,11-Dodecadiene and 1,15-Hexadecadiene are slightly reduced. About 4% of decane and hexadecane are reduced between 750° C. and 850° C. These reductions result in the increase of 1-Dodecadene (6.83% increases) and 1-Hexadecene (3.24% increase).

TABLE 5

Percentage distributions of pyrolysis products under temperatures 750° C. and 850° C.

| | $C_{12}$ (%) | | | $C_{16}$ (%) | | |
|---|---|---|---|---|---|---|
| Sample | 1,11-Dodecadiene | 1-Dodecadene | Decane | 1,15-Hexadecadiene | 1-Hexadecene | Hexadecane |
| 750° C. | 27.28 | 53.17 | 19.56 | 31.78 | 49.92 | 20.30 |
| 850° C. | 24.31 | 60.03 | 15.66 | 30.68 | 53.16 | 16.15 |

In summary, although a higher pyrolytic temperature increases the production of lighter liquid fuels and reduces the heavy oil and wax components, it may also increase gaseous products that are not desirable in terms of liquid fuel production. On the other hand, a higher pyrolytic temperature increases the production of unsaturated olefins and reduces the percentages of alkanes, undesirable in terms of producing stable hydrocarbons as fuel components. In order to increase the liquid fuel components and to reduce heavy oil production and to decrease olefins components, catalytic pyrolysis of LDPE is needed to reduce the pyrolytic temperature. Based on these results as well as fuel chemistry, the devolvement of processes for liquid fuel production from LDPE as a feedstock should focus on catalytic pyrolysis for (I) reducing the production of heavy oil (or wax) components; (II) reducing the formation of unsaturated hydrocarbons via hydrogenation; (III) increasing the formation of aromatic and branched components to increase the RON of gasoline.

Thermal Catalytic Pyrolysis of Low Density Polyethylene:

Thermal pyrolysis in the presence of a catalyst can offer the following advantages over pure thermal pyrolysis (11): (1) Increases the plastics decomposition rate by decreasing reaction temperature and reducing reaction time, (2) Increases the selectivity of fuel components and LDPE decomposition conversion, and (3) Increases the gaseous product yields. Under similar temperatures and reaction times, a higher gaseous product yield is observed. The focus of this research is on the liquid fuel range components. The gaseous products are not detectable in a GC column. Therefore, no gaseous component information is provided.

Figure 15:
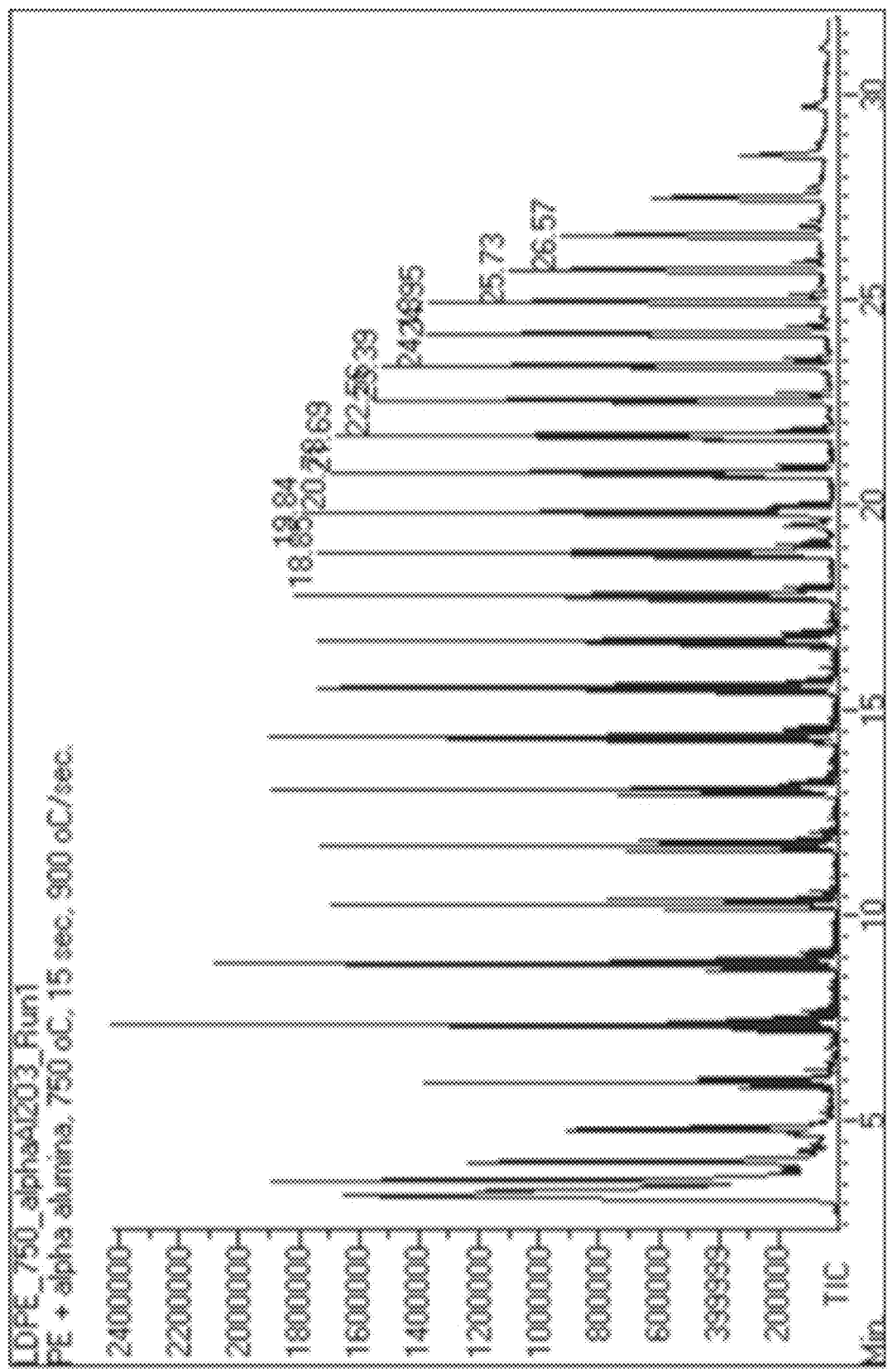
FIG. 15 is a graph that illustrates low density polyethylene thermal decomposition over $\alpha$-$Al_2O_3$ (T=850° C., t=15 s, heating rate=900° C./s).
Figure 16:
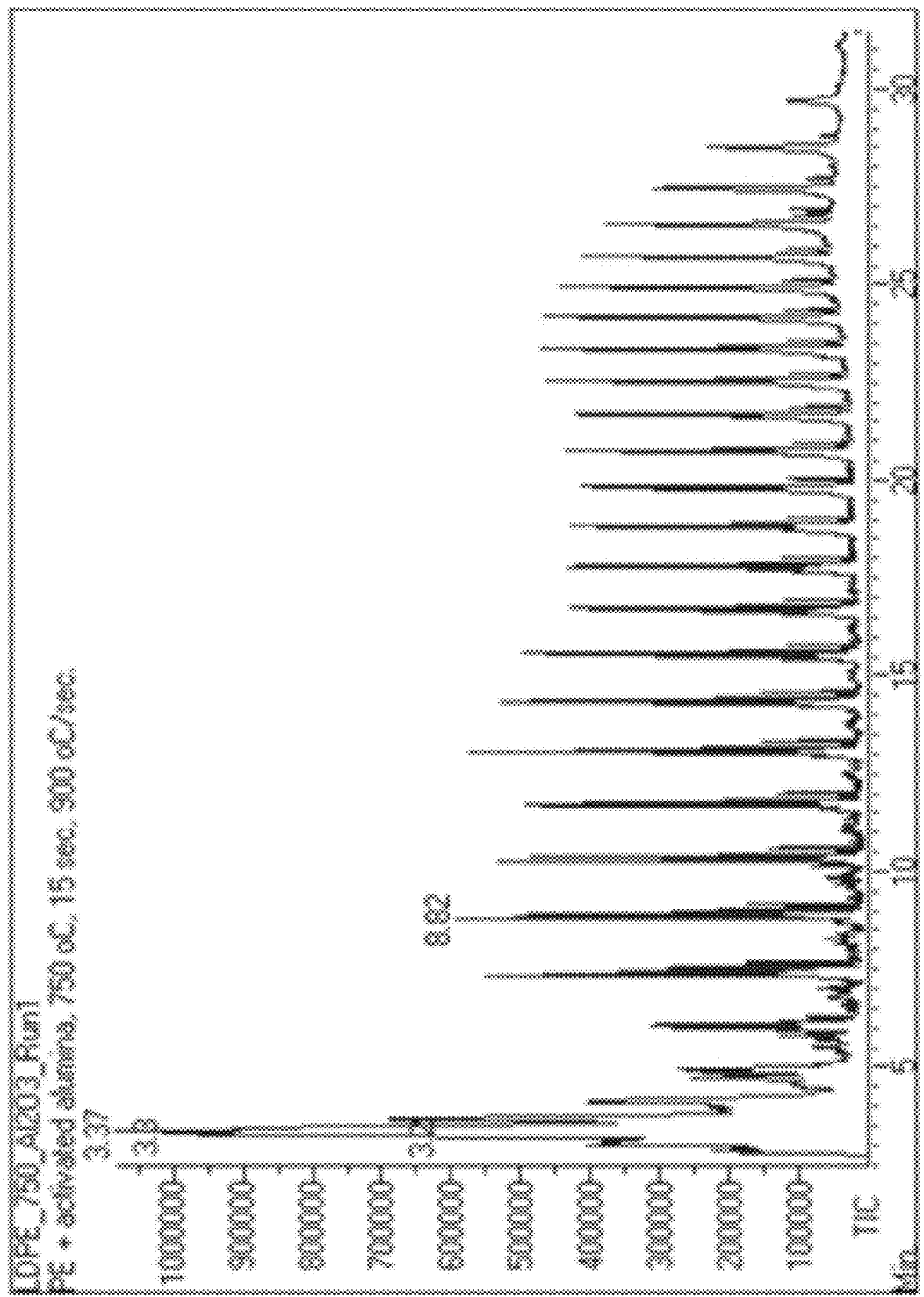
FIG. 16 is a graph that illustrates low density polyethylene thermal decomposition over $\gamma$-$Al_2O_3$ (T=850° C., t=15 s, heating rate=900° C./s).

Effect of Solid Acid Catalysts:

Solid acids such as silica, alumina and zeolites can promote thermal decomposition of polymeric materials. These materials also provide good supporting structures and surfaces for metal based catalysts (especially noble metals). The activity of metal based catalysts depends on the size and surface areas that can be influenced by the structure of support materials. Two types of alumina materials, $\alpha$-Al$_2$O$_3$ (Alfa-Aesar 99.997%) and $\gamma$-Al$_2$O$_3$ (Alltech 60-80 mesh), are used as examples for testing the effect of solid acidic supporting media. In comparison with thermal pyrolysis of LDPE (FIG. 11), the product distributions of LDPE thermal catalytic decomposition over two alumina supports are significantly different (FIG. 15 and FIG. 16. Results listed in Table 6 indicate that gasoline range fuel ($C_4$ to $C_{12}$) increases from 29.56% to 38.02% and 51.52% for $\alpha$-$Al_2O_3$ and $\gamma$-$Al_2O_3$, respectively. The portion of heavy oil and wax decreases from 36.03% to about 26.50% for both alumina supports. However, the percentages for jet fuel and diesel range fuels have changed only marginally for $\alpha$-$Al_2O_3$, but change significantly for $\gamma$-$Al_2O_3$ from about 17% to 11%. The changes for $C_{12}$ and $C_{16}$ components are listed in Table 7. Both percentages for 1,11-Dodecadiene and 1,15-Hexadecadiene decrease, suggesting that -diene in pyrolytic products are reduced in the presence of solid acidic catalysts. In addition to the reduction of -dienes, both portions of decane and hexadecane increase significantly, especially for $\gamma$-$Al_2O_3$. Interestingly, 1-Dodecadene percentage increases 9.52% for $\alpha$-$Al_2O_3$, but remains almost unchanged for $\gamma$-$Al_2O_3$ (53.17% compared to 53.90%). The percentage changes for 1-Hexadecene are opposite to that of 1-Dodecadene. As shown in Table 7, $\gamma$-$Al_2O_3$ catalyst reduces both -diene and -ene components. This may be due to the fact that $\gamma$-$Al_2O_3$ has a much higher surface area than that of $\alpha$-$Al_2O_3$ and is therefore more active than $\alpha$-$Al_2O_3$.

In addition to the results shown in Table 6 and Table 7, an aromatic compound, toluene ($C_7H_8$ at retention time (R.T.)=4.71 min), a branched hydrocarbon, Hexane, 3-ethyl- ($C_8H_{18}$, R. T.=4.93 min) and methylcycloheptene ($C_8H_{14}$, at R. T.=5.22 min) are found for $\gamma$-$Al_2O_3$ catalyst. These components have higher RONs and are very desirable for the production of high quality gasoline. However, these hydrocarbons are not shown in the case of the $\alpha$-$Al_2O_3$ catalyst. For longer carbon chain components no such compounds are detected. It is expected that better results in terms of the reduction of unsaturated components and generation of higher octane number components could be possible for zeolite based catalysts. However, there are still significant amounts of undesirable unsaturated olefins detected, indicating that solid acid catalysts alone are unable to convert unsaturated hydrocarbons to desirable liquid fuels. Therefore, supported metal catalysts are needed for the catalytic conversion of LDPE to higher quality of liquid fuels.

TABLE 6

Percentage of liquid fuels for $\alpha$-$Al_2O_3$ and $\gamma$-$Al_2O_3$ based catalysts (T = 750° C.)

| Catalyst | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| LDPE + 750° C. | 29.56 | 17.16 | 17.26 | 36.03 |
| LDPE + $\alpha$-$Al_2O_3$ | 38.03 | 16.64 | 19.02 | 26.31 |
| LDPE + $\gamma$-$Al_2O_3$ | 51.52 | 11.06 | 10.47 | 26.95 |

TABLE 7

Percentage of LDPE pyrolysis products over $\alpha$-$Al_2O_3$ and $\gamma$-$Al_2O_3$ (T = 750° C.)

| | $C_{12}$ (%) | | | $C_{16}$ (%) | | |
|---|---|---|---|---|---|---|
| Catalyst | 1,11-Dodecadiene | 1-Dodecadene | Decane | 1,15-Hexadecadiene | 1-Hexadecene | Hexadecane |
| LDPE | 27.28 | 53.17 | 19.56 | 31.78 | 49.92 | 20.30 |
| $\alpha$-$Al_2O_3$ | 18.64 | 62.69 | 18.67 | 23.65 | 53.98 | 22.37 |
| $\gamma$-$Al_2O_3$ | 7.48 | 53.90 | 38.62 | 22.01 | 36.91 | 41.08 |

Figure 17:
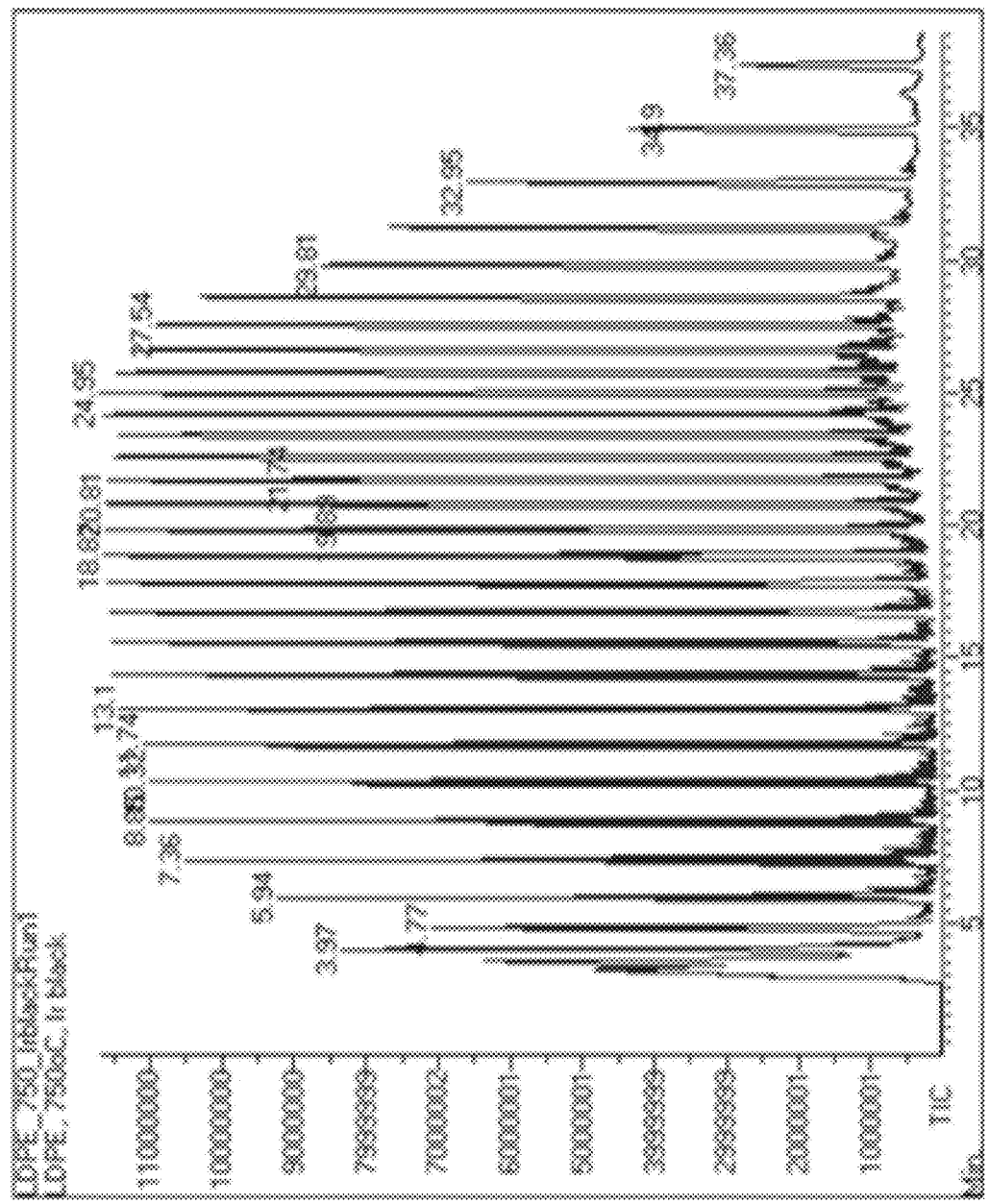
FIG. 17 is a graph that illustrates low density polyethylene thermal decomposition over Ir black (T=750° C., t=15 s, heating rate=900° C./s).
Figure 18:
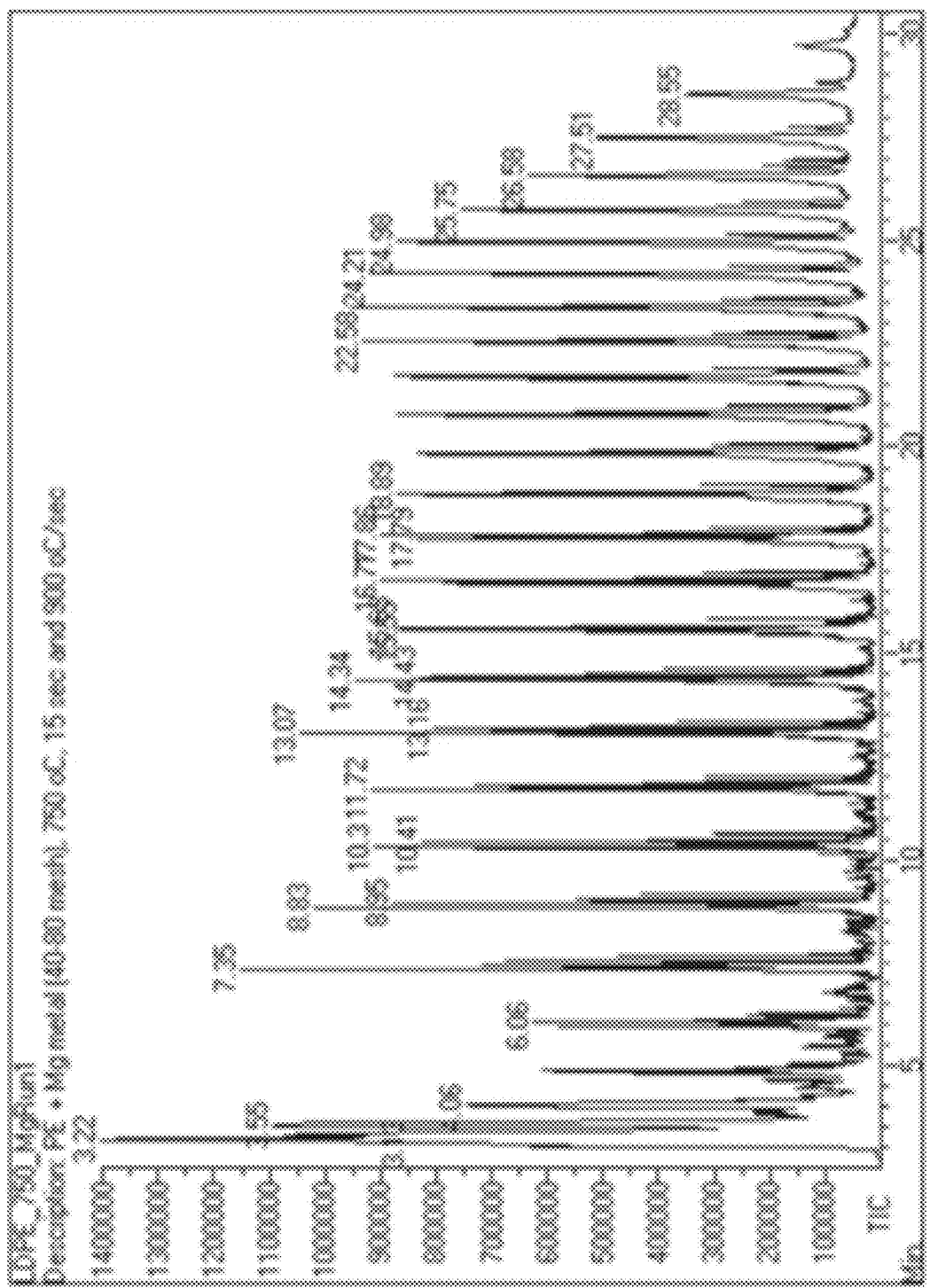
FIG. 18 is a graph that illustrates low density polyethylene thermal decomposition over Mg metal power (40 to 82 mesh) (T=750° C., t=15 s, heating rate=900° C./s).

Effect of Metal Based Catalysts:

A variety of metal based catalysts can be used for the LDPE pyrolysis including alkali earth metals, transition and noble metals. In this research, two metal catalysts (Ir black and Mg powder (Fisher Scientific 40-80 mesh)) were selected to evaluate activities of the catalysts using the Py-/GC/MS method. FIG. 17 and FIG. 18 show the GC spectra of LDPE decomposition over Ir and Mg metal catalysts. As indicated in Table 8, LDPE decomposition over Ir black catalyst results in about 10% reduction for gasoline, 5% for jet fuel and 3% for diesel production. As a cost, the heavy oil production increases 18%. Apparently Ir is not a desirable catalyst in terms of liquid fuel production. Compared to LDPE thermal pyrolysis, the percentage changes for $C_{12}$ and $C_{16}$ components (Table 9) do not change significantly, implying that the Ir metal catalyst is not effective in unsaturated olefin conversion. Based on Table 8 and Table 9, we can conclude that Ir metal catalyst is not effective for either liquid fuel production or the conversion of unsaturated olefins, and therefore is not a suitable catalyst for LDPE pyrolysis applications. The Mg powder catalyst, on the other hand, shows a very different activity. Firstly, the gasoline ($C_4$ to $C_{12}$) fuel percentage increases significantly (from 29.56% to 40.50%) while jet fuel, diesel fuels and heavy oil portions decreased 6.10%, 2.67% and 2.18%, respectively (Table 8). These results indicate that the Mg metal catalyst is beneficial for the production of gasoline range liquid fuel. For three components of $C_{12}$ (Table 9), only 6.14% of 1,11-Dodecadiene (21.14% decrease) is detected and decane consists of 37.86% (18.30% increase). The percentages of $C_{16}$ components also show similar trends. Both 1,15-Hexadecadiene and 1-Hexadecene decrease to 23.15% (8.63% reduction) and 38.42% (11.50% reduction), respectively. The percentage of hexadecane increases to 38.42% (18.12% increases). These results suggest that Mg metal catalyst not only increases the production of the light hydrocarbon portion, but it also increases the saturated alkane production by reducing unsaturated alkenes. In addition to being beneficial for light hydrocarbon production, GC/MS results show that Mg catalyst also produces a small amount of branched hydrocarbons, such as 3-ethylhexane ($C_8H_{18}$), and 2,4-dimethylhexane.

TABLE 8

Percentage of liquid fuels for Ir black and Mg power based catalysts (T = 750° C.)

| Samples | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| LDPE + 750° C. | 29.56 | 17.16 | 17.26 | 36.03 |
| LDPE + Ir black | 19.45 | 12.13 | 14.13 | 54.29 |
| LDPE + Mg powder | 40.50 | 11.06 | 14.59 | 33.85 |

TABLE 9

Percentage of LDPE pyrolysis products over Ir black and Mg catalysts (T = 750° C.)

| Sample | $C_{12}$ (%) 1,11-Dodecadiene | 1-Dodecadene | Decane | $C_{16}$ (%) 1,15-Hexadecadiene | 1-Hexadecene | Hexadecane |
|---|---|---|---|---|---|---|
| LDPE | 27.28 | 53.17 | 19.56 | 31.78 | 49.92 | 20.30 |
| Ir black | 27.89 | 51.85 | 20.26 | 35.35 | 44.11 | 20.54 |
| Mg powder | 6.14 | 56.00 | 37.86 | 23.15 | 38.42 | 38.42 |

Figure 19:
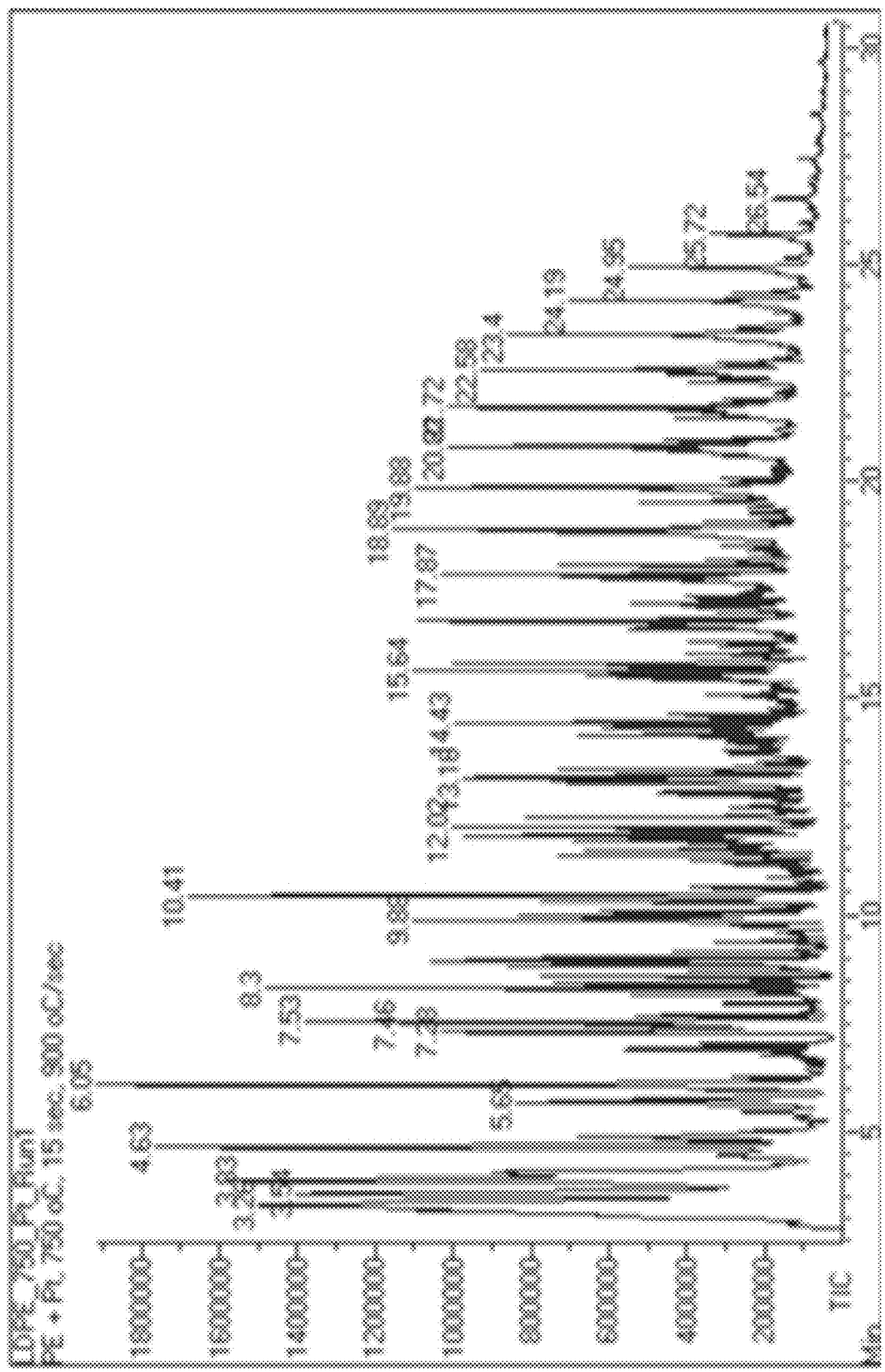
FIG. 19 is a graph that illustrates low density polyethylene thermal decomposition over 1.0 wt % Pt/$\gamma$-$Al_2O_3$ catalyst (T=750° C., t=15 s, heating rate=900° C./s).

Effect of Supported Noble Metal Based Catalysts:

Noble metal based catalysts, Pt especially, are active for aromatization and hydrogenation of hydrocarbons. The GC spectrum of LDPE pyrolysis over a 1.0 wt % Pt loaded on $\gamma$-$Al_2O_3$ (Aldrich) is shown in FIG. 19. Liquid fuel percentages are listed in Table 10. Significantly, gasoline and jet fuel percentages derived from LDPE pyrolysis over Pt/$\gamma$-$Al_2O_3$ increase up to 19.67% and 9.03%, respectively accompanied by decreases in heavier components (diesel and heavy oil) to 10.00% and 8.71%. More importantly, both 1,11-dodecadiene and 1,15-hexadecadiene reduce to 0.0%. At the same time, 1-Dodecadene and 1-Hexadecene also significantly decrease 43.49% and 10.37%, respectively. These are accompanied by substantial increases in decane percentage (from 19.56% to 80.32%) and hexadecane (from 20.30% to 60.45%). Apparently, the reduction in unsaturated hydrocarbons and the increase in saturated components are beneficial in terms of producing high quality liquid fuels. In addition to higher quality liquid fuel production, Pt/$\gamma$-$Al_2O_3$ catalyst is effective for the production of aromatic compounds such as Benzene, 1-methyl-4[1-methylpropyl-], ($C_{11}H_{16}$). On the other hand, Pt/$\gamma$-$Al_2O_3$ catalyst also generates multi-ring based species, including naphthalene and fluorene that are not desirable for liquid fuels and need to be separated. The detailed $C_{12}$ and $C_{16}$ components are shown in Table 10 and Table 11. The overall products of LDPE decomposition over Pt/$\gamma$-$Al_2O_3$ (FIG. 19) are complicated, involving a large number of pyrolytic species, which leads to complexity of fuel components. More experiments are needed to optimize Pt/$\gamma$-$Al_2O_3$ catalysts in terms of reaction conditions (temperature, pressure, and reaction time etc.), Pt loading and particle size, and the structures and acidity of supporting materials to reduce the production of heavy aromatics.

Figure 20:
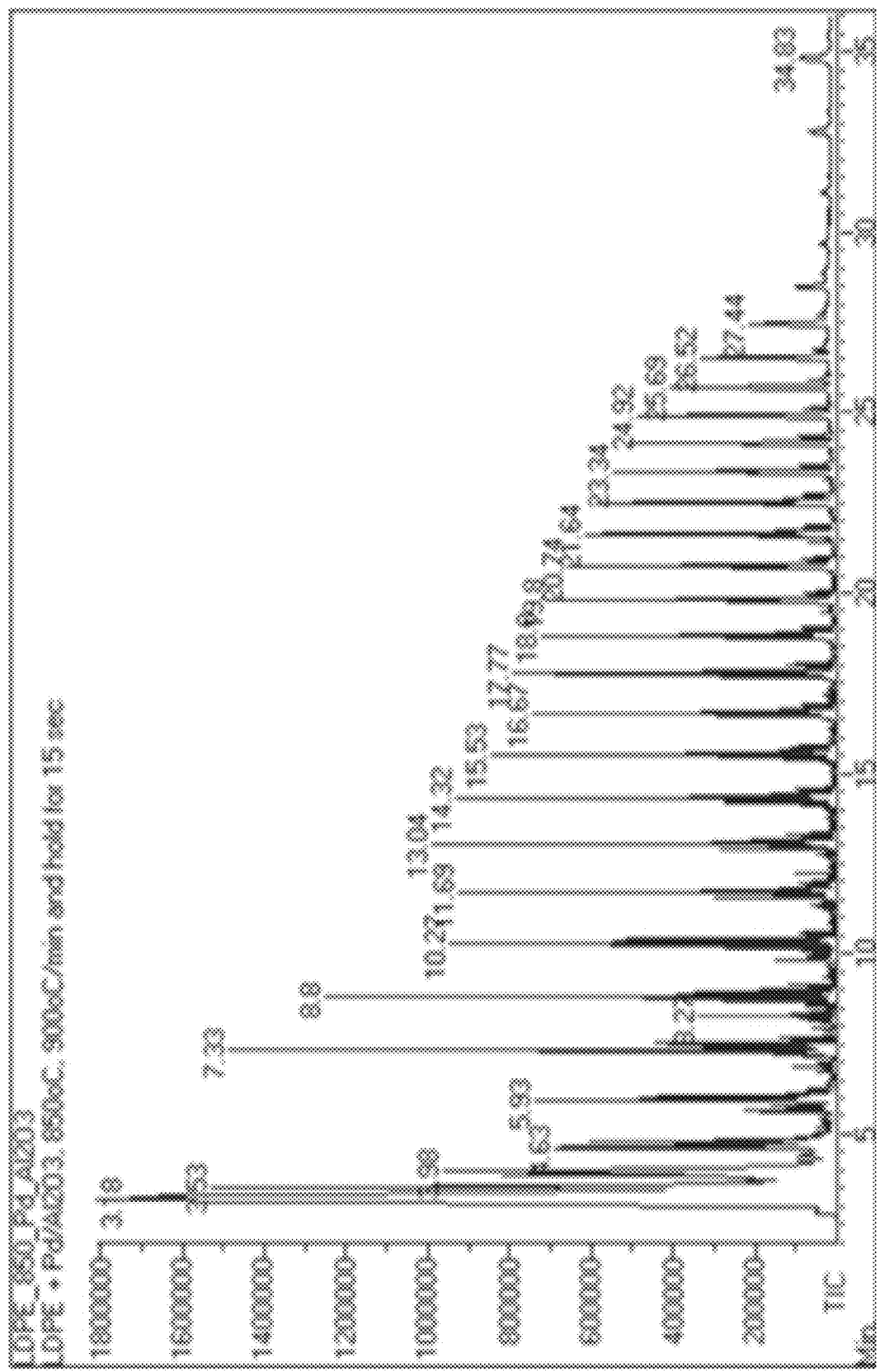
FIG. 20 is a graph that illustrates low density polyethylene thermal decomposition over 0.5 wt % Pd/$\gamma$-$Al_2O_3$ catalyst (T=850° C., t=15 s, heating rate=900° C./s).
Figure 21:
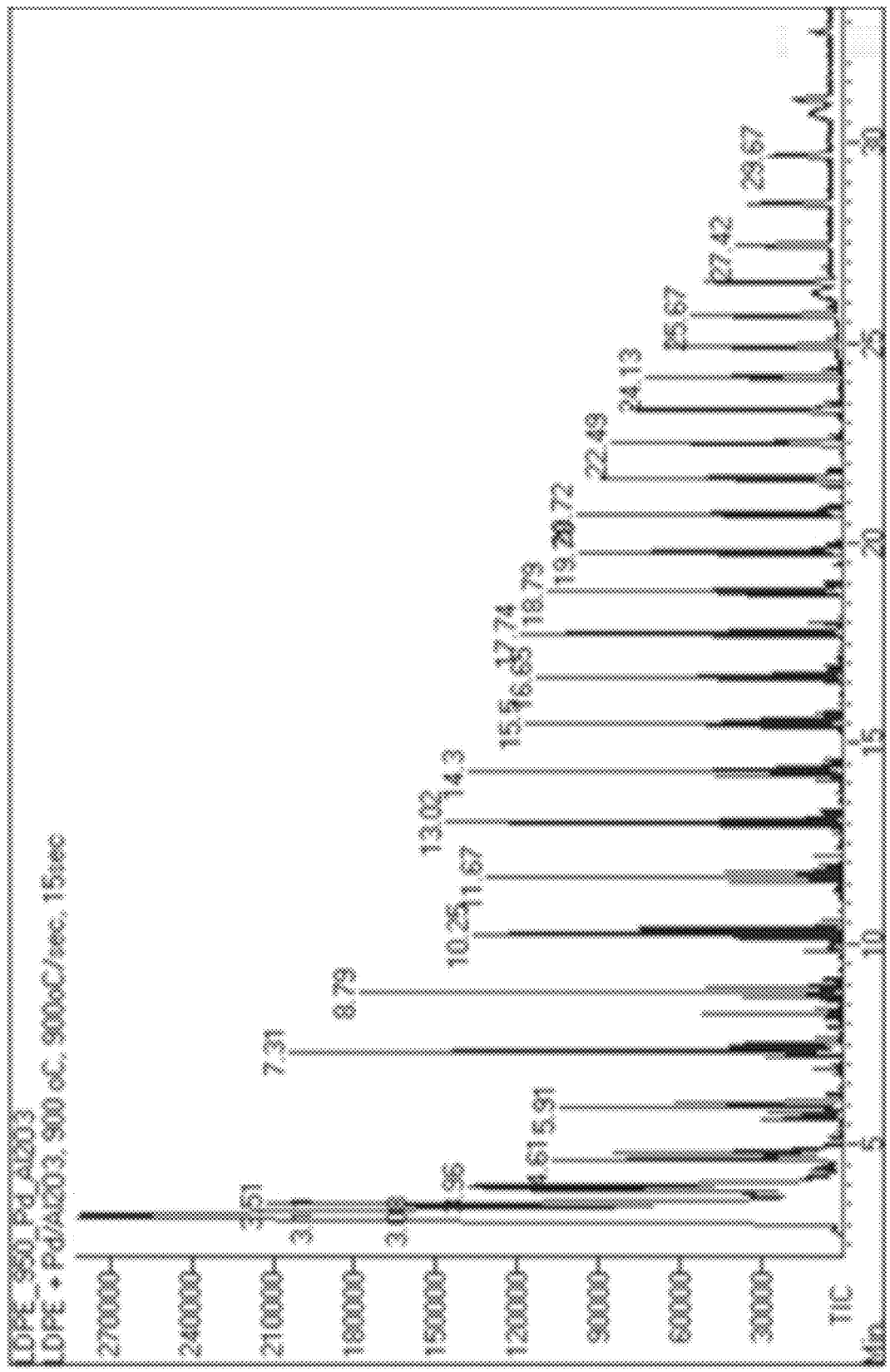
FIG. 21 is a graph that illustrates low density polyethylene thermal decomposition over 0.5 wt % Pd/$\gamma$-$Al_2O_3$ catalyst (T=900° C., t=15 s, heating rate=900° C./s).

LDPE pyrolysis over 0.5 wt % Pd/$\gamma$-$Al_2O_3$ (FIG. 20 and FIG. 21)) results in a significant increase in gasoline range liquid fuel (34.55% to 52.45%) with the decrease of both diesel fuel (from 17.85% to 10.33%) and heavy oil components (30.73% to 23.11%). When pyrolytic temperature is increased to 950° C., the increase in lighter fuel and decrease in heavier components are more significant (Table 10). The percentages of 1,11-Dodecadiene and 1,15-Hexadecadiene decrease 12.47% (from 24.55% to 11.845) and 9.53% (from 30.68% to 21.15%), respectively (Table 11). Similar to Pt/$\gamma$-$Al_2O_3$ catalyst, 1-Dodecadene increases 9.04% while 1-Hexadecene remains unchanged. Compared to the increase of alkene contents, decane increases about 21.51% but hexadecane increases only about 9.26%. Pd/$\gamma$-$Al_2O_3$ catalyst also produces a small amount of naphthalene ($C_{10}H_8$) and benzene, nonyl-, ($C_{15}H_{24}$), but no fluorene is detected (Table 10, Table 11, FIG. 20, and FIG. 21).

In summary, noble metals (Pt, Pd, Ir, Ru and Rh) loaded on active supporting materials ($\gamma$-$Al_2O_3$, $SiO_2$, and zeolites) are effective catalysts in terms of the reduction of olefins and the increase of paraffins as well as the increase of lighter fuel components. Supported Pt catalyst generates more complex products and heavy aromatics that are detrimental to fuel quality. Compared to Pt/$\gamma$-$Al_2O_3$, using supported Pd catalyst appears more beneficial, producing fewer undesirable components. Reaction temperature, heating rate, catalyst loading percentages and preparation techniques play important roles in the above results. LDPE pyrolysis at an elevated temperature can lead to significant results in comparison with the lower temperature pyrolysis. Results shown in FIG. 21, Table 10 and Table 11, indicate that an LDPE sample decomposed at higher temperature (T=900° C.) can increase the yield of gasoline fuel and reduce the heavy oil components. At the same time, fewer undesirable products are generated. Therefore, more research is needed to optimize the pyrolytic conditions, supporting materials, metal particle size and morphologies. Noble metal binary systems (such as Pt—Pd, Pt—Ru, Pt—Au) and ternary alloys (Pt—Pd—Ru for example) may be more effective in LDPE thermal catalytic decomposition to yield more liquid fuels and reduce undesirable byproducts. The Py-/GC/MS technique provides a major rapid means to evaluate metal and alloy based catalysts in terms of liquid fuel yields and product distributions.

TABLE 10

Percentage of liquid fuels for 1.0 wt % Pt/$\gamma$-$Al_2O_3$ and Pd/$\gamma$-$Al_2O_3$ based catalysts

| Samples | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| LDPE, 750° C. | 29.56 | 17.16 | 17.26 | 36.03 |
| LDPE + 1.0 Wt % Pt/$\gamma$-$Al_2O_3$, 750° C. | 49.23 | 26.19 | 7.26 | 17.32 |
| LDPE, 850° C. | 34.55 | 16.87 | 17.85 | 30.73 |
| LDPE + 0.5 wt % Pd/$\gamma$-$Al_2O_3$, 850° C. | 52.45 | 14.12 | 10.33 | 23.11 |
| LDPE + 0.5 wt % Pd/$\gamma$-$Al_2O_3$, 950° C. | 59.04 | 12.85 | 10.72 | 17.39 |

TABLE 11

LDPE pyrolysis products over 1.0 wt % Pt/$\gamma$-$Al_2O_3$ and 0.5 wt % Pd/$\gamma$-$Al_2O_3$ catalysts

| Sample | $C_{12}$ (%) 1,11-Dodecadiene | 1-Dodecene | Decane | $C_{16}$ (%) 1,15-Hexadecadiene | 1-Hexadecene | Hexadecane |
|---|---|---|---|---|---|---|
| 750° C. | 27.28 | 53.17 | 19.56 | 31.78 | 49.92 | 20.30 |
| 1.0 Wt % Pt/$Al_2O_3$, 750° C. | 0.0 | 19.68 | 80.32 | 0.0 | 39.55 | 60.45 |
| 850° C. | 24.31 | 60.03 | 15.66 | 30.68 | 53.16 | 16.15 |
| 0.5 wt % Pd/$Al_2O_3$, 850° C. | 11.84 | 50.99 | 37.17 | 21.15 | 53.44 | 25.41 |
| 0.5 wt % Pd/$Al_2O_3$, 950° C. | 13.33 | 46.66 | 40.02 | 23.01 | 53.50 | 23.49 |

Effect of Supported Ni, Fe and Co Metal Based Catalysts:

Supported Ni, Fe and Co based catalysts are less expensive industrial catalysts and have been applied in areas such as hydrogen production, liquid fuel synthesis from syngas, and synthesis of ammonia. In some cases, Ni catalysts show properties similar to Pt catalysts. In this work, we used a 70 wt % Ni/SiO$_2$ catalyst (AcRos) as an example to investigate its activity for liquid fuel production using Py-GC/MS technology.

Figure 22:
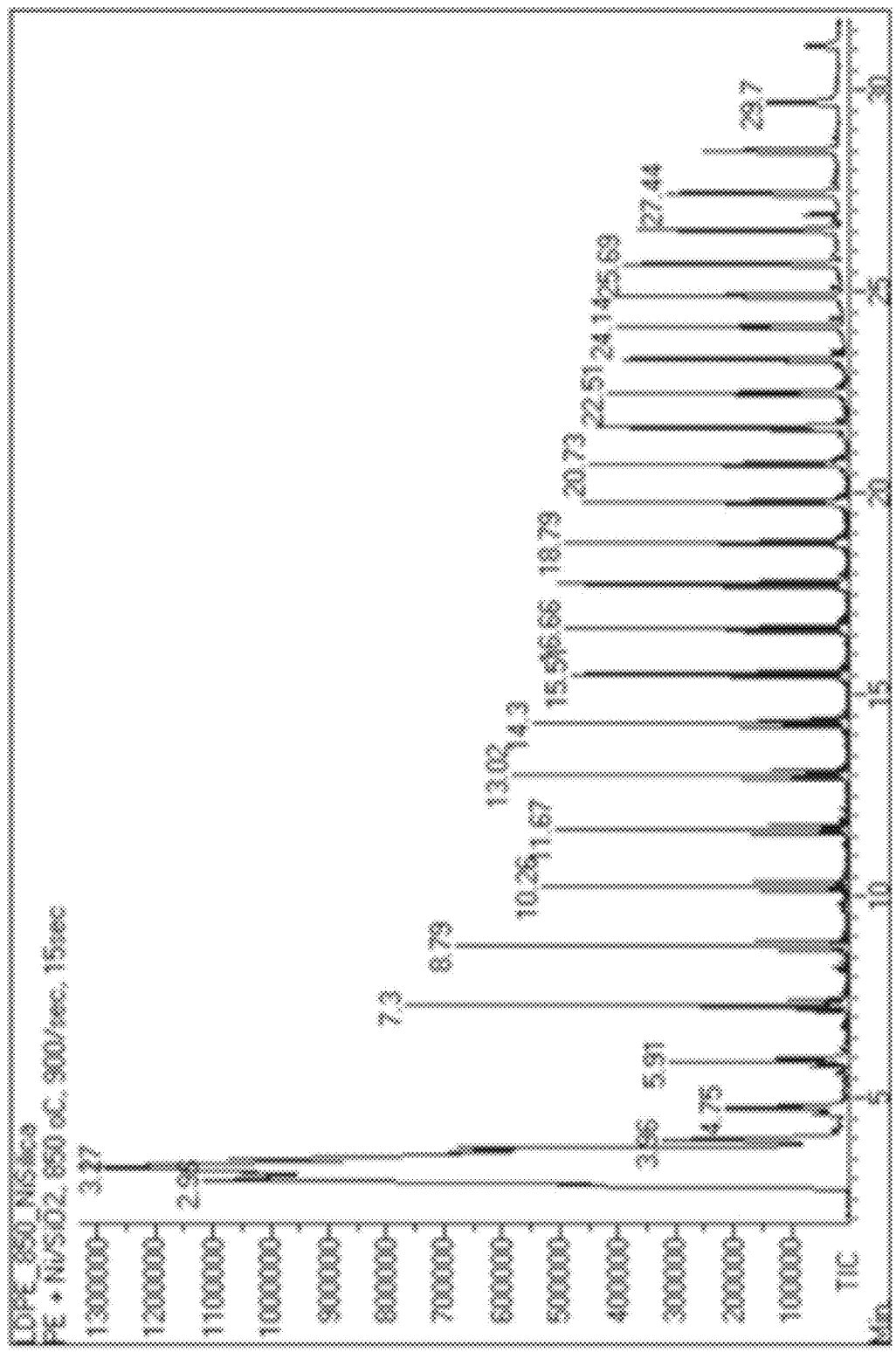
FIG. 22 is a graph that illustrates low density polyethylene thermal decomposition over Ni/SiO$_2$ catalyst (T=850° C., t=15 s, heating rate=900° C./s).

FIG. 22 shows the GC spectra for LDPE decomposition over 70 wt % Ni/SiO$_2$ catalyst.

Table 11 shows that LDPE pyrolysis over Ni/SiO$_2$ catalyst promotes the formation of gasoline range products (29.56% of increase). The consequence of this increase is the reduction of heavy oil (10.28%), diesel fuel (10.43%), and jet fuel (8.85%). Compared with Pd noble metal catalyst at the same pyrolysis temperature (850° C.), Ni/SiO$_2$ catalyst shows a higher yield in gasoline production and heavy oil reduction. However, in terms of reduction of unsaturated hydrocarbons and promotion of the production of alkanes (Table 13, Pd/γ-Al$_2$O$_3$ catalyst performs better than Ni/SiO$_2$ catalyst. As shown in Table 13, Ni/SiO$_2$ catalyst slightly decreases the production of 1,11-Dodecadiene and 1,15-Hexadecadiene, but has no effect on the reduction of 1-Dodecadene and 1-Hexadecene. Toluene (C$_7$H$_8$, R.T.=4.6 min) is also found for Ni/SiO$_2$ catalyst. Since no data are available for SiO$_2$ supporting the formation of toluene, this cannot be attributed to the aromatization effect of Ni metal catalyst. However, based on the detailed product identification the concentrations of aromatic compounds are at a very low level in comparison with peak areas of three major components, -dienes, -enes, and -anes.

TABLE 12

Percentage of liquid fuels for 1.0 wt % Pt/γ-Al$_2$O$_3$, Pd/γ-Al$_2$O$_3$, and Ni/SiO$_2$ based catalysts (T = 850° C.)

| Samples | Gasoline (C$_4$ to C$_{12}$) (%) | Jet Fuel (C$_{10}$ to C$_{14}$) (%) | Diesel Fuel (C$_{14}$ to C$_{18}$) (%) | Heavy Oil & Wax (>C$_{18}$) (%) |
|---|---|---|---|---|
| LDPE + 850° C. | 34.55 | 16.87 | 17.85 | 30.73 |
| LDPE + 0.5 wt % Pd/γ-Al$_2$O$_3$ | 52.45 | 14.12 | 10.33 | 23.11 |
| LDPE + Ni/SiO$_2$ | 64.11 | 8.02 | 7.42 | 20.45 |

TABLE 13

Percentage of LDPE pyrolysis C$_{12}$ and C$_{16}$ products over 1.0 wt % Pt/γ-Al$_2$O$_3$ and 0.5 wt % Pd/γ-Al$_2$O$_3$ catalysts (T = 850° C.)

| Sample | C$_{12}$ (%) | | | C$_{16}$ (%) | | |
|---|---|---|---|---|---|---|
| | 1,11-Dodecadiene | 1-Dodecadene | Decane | 1,15-Hexadecadiene | 1-Hexadecene | Hexadecane |
| LDPE | 24.31 | 60.03 | 15.66 | 30.68 | 53.16 | 16.15 |
| 0.5 wt % Pd/Al$_2$O$_3$ | 11.84 | 50.99 | 37.17 | 21.15 | 53.44 | 25.41 |
| Ni/SiO$_2$ | 18.78 | 60.48 | 20.74 | 24.61 | 55.89 | 19.50 |

In summary, degradation of waste plastics via thermal catalytic pyrolysis is a promising process. Yields and quality of fuel products rely on both catalysts and acidic supports. Reactor configurations and reaction conditions, temperature, pressure, heating rate and reaction time also play important roles. The research should focus on the development of higher activity and selective catalysts and understanding of the reaction mechanisms and pathways. A microreactor based Py-GC/MS system provides an innovative and rapid method for catalyst evolution and product identification.

Thermal Catalytic Hydrocracking of Low Density Polyethylene:

Unsaturated hydrocarbons produced from LDPE thermal cracking are reactive and not desirable in liquid fuels. In order to reduce these components, hydrogenation is needed to convert olefins to paraffins. During the thermal decomposition of LDPE, insufficient hydrogen molecules are generated from breaking C—H bonds to achieve olefin reduction. An external hydrogen feed stock is needed for this purpose. When catalytic thermal pyrolysis (cracking) of plastics occurs under a hydrogen-rich atmosphere, the cracking process is defined as hydrocracking. Basically, hydrocracking involves two primary processes: polymeric material is first catalytically converted into more valuable low boiling components such as olefins and paraffins, and then unsaturated olefins are reduced with hydrogen to produce paraffins. It is noted that hydrogen molecules have to be adsorbed onto a catalyst surface before they can react with unsaturated hydrocarbons. In higher temperature and low pressure pyrolysis, the capability of hydrogen adsorption by metal catalysts is limited. This is especially true in a high temperature flash pyrolytic process using a Py-GC/MS technology. It is difficult to introduce gaseous hydrogen into Py-GC/MS system to perform hydrocracking of plastic samples.

In this research, we introduced a novel concept of hydrocracking using a metal hydride as both a hydrogen source and a catalyst. Metal hydrides are hydrogen storage materials that release hydrogen at low pressure and elevated temperature, and which store hydrogen at high pressure and low temperature. In metal hydrides, hydrogen is in the form of atoms attached to metal atoms that are more favorable than gaseous hydrogen molecules for catalytic reduction of unsaturated hydrocarbons. In addition to serving as hydrogen sources, these materials can function as hydrogen buffer materials when processes produce hydrogen (such as aromatization process).

Figure 23:
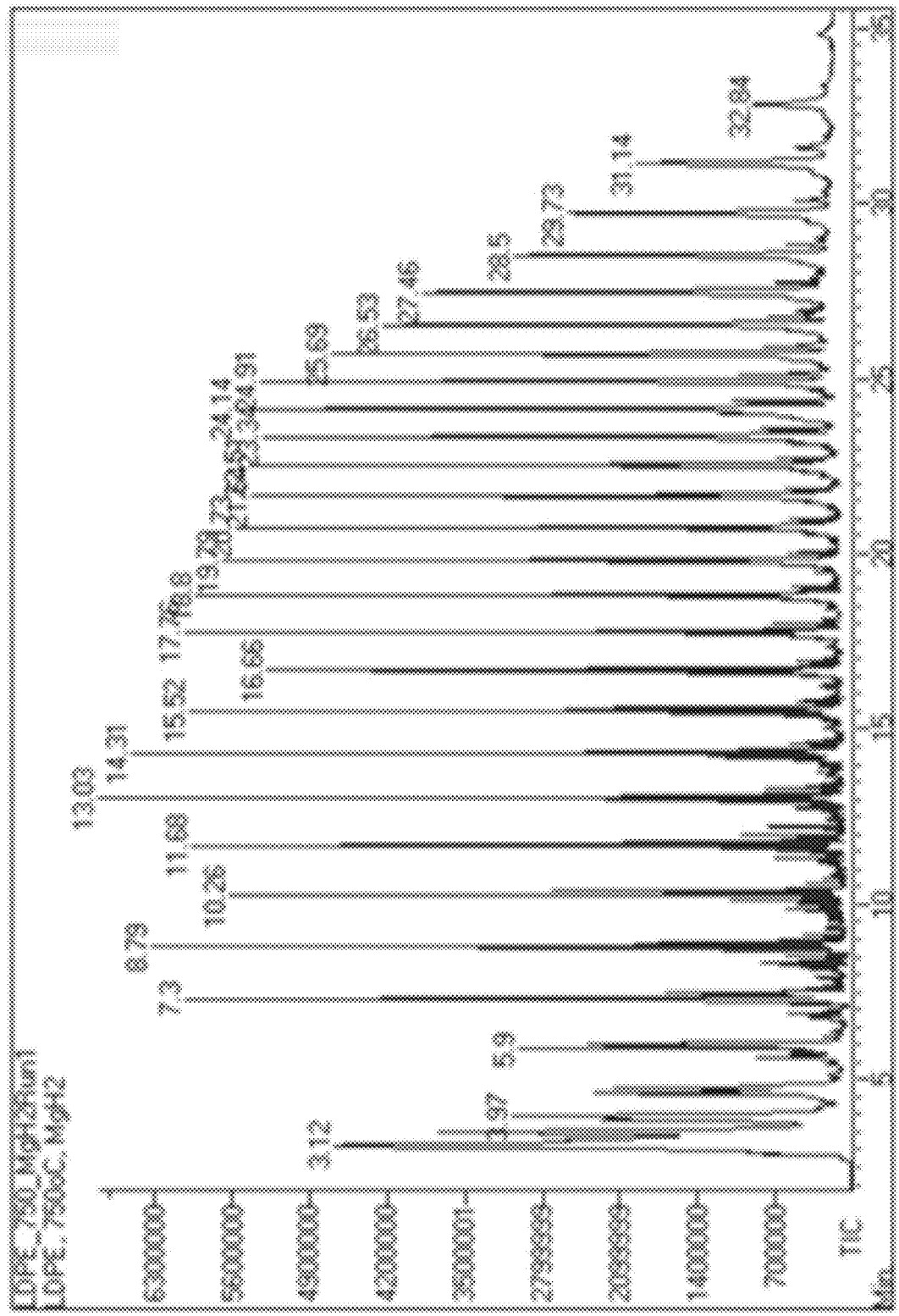
FIG. 23 is a graph that illustrates low density polyethylene thermal decomposition over MgH$_2$ catalyst (T=750° C., t=15 s, heating rate=900° C./s).

FIG. 23 illustrates the GC spectrum of LDPE pyrolysis over an MgH$_2$ (Alfa Aesar, 98%) catalyst. In comparison with the LDPE thermal decomposition, the fuel percentage changes for the MgH$_2$ catalyst (Table 14) are similar to those with the Mg catalyst. Gasoline range fuel increases 5.76%, while other fuel ranges decrease 2.46%, 1.37% and 2.03% for jet fuel, diesel fuel and heavy oil, respectively.

Table 15 shows the percentage changes of -dienes, -enes and -anes. For C$_{12}$ components, 1,11-Dodecadiene reduces from 29.56% to 9.70% while decane increases from 19.56% to 33.46%. These changes are not as significant as those for the Mg catalyst. For C$_{16}$ components, 1,15-Hexadecadiene decreases from 31.78% to 17.07%, which is more significant than with the Mg catalyst. However, 1-Hexadecene percentage increases more than that of the Mg catalyst. The different behaviors of C$_{12}$ and C$_{16}$ products may be partially due to particle sizes and morphology differences.

Figure 24:
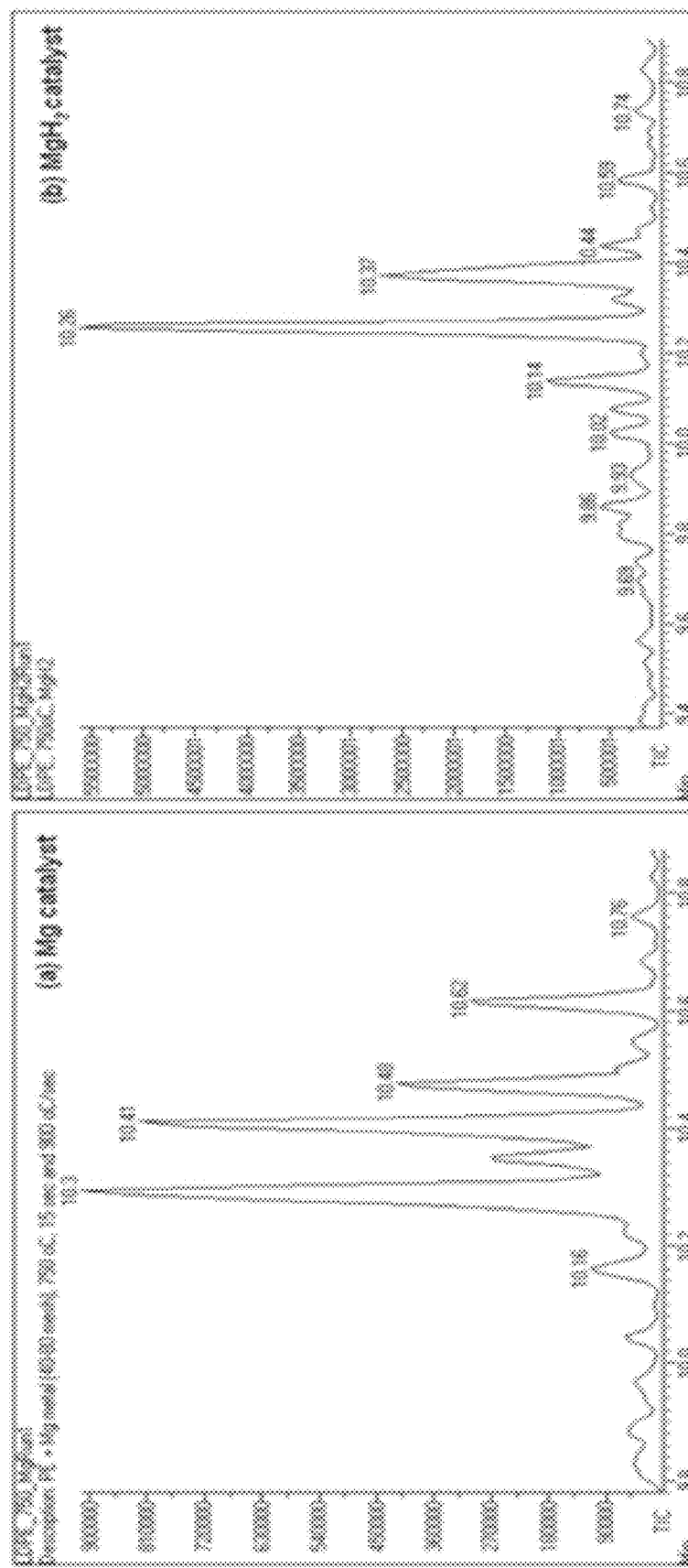
FIG. 24 are graphs that illustrate C$_{12}$ component spectra for (a) Mg metal catalyst and (b) MgH$_2$ metal hydride catalyst.
Figure 25:
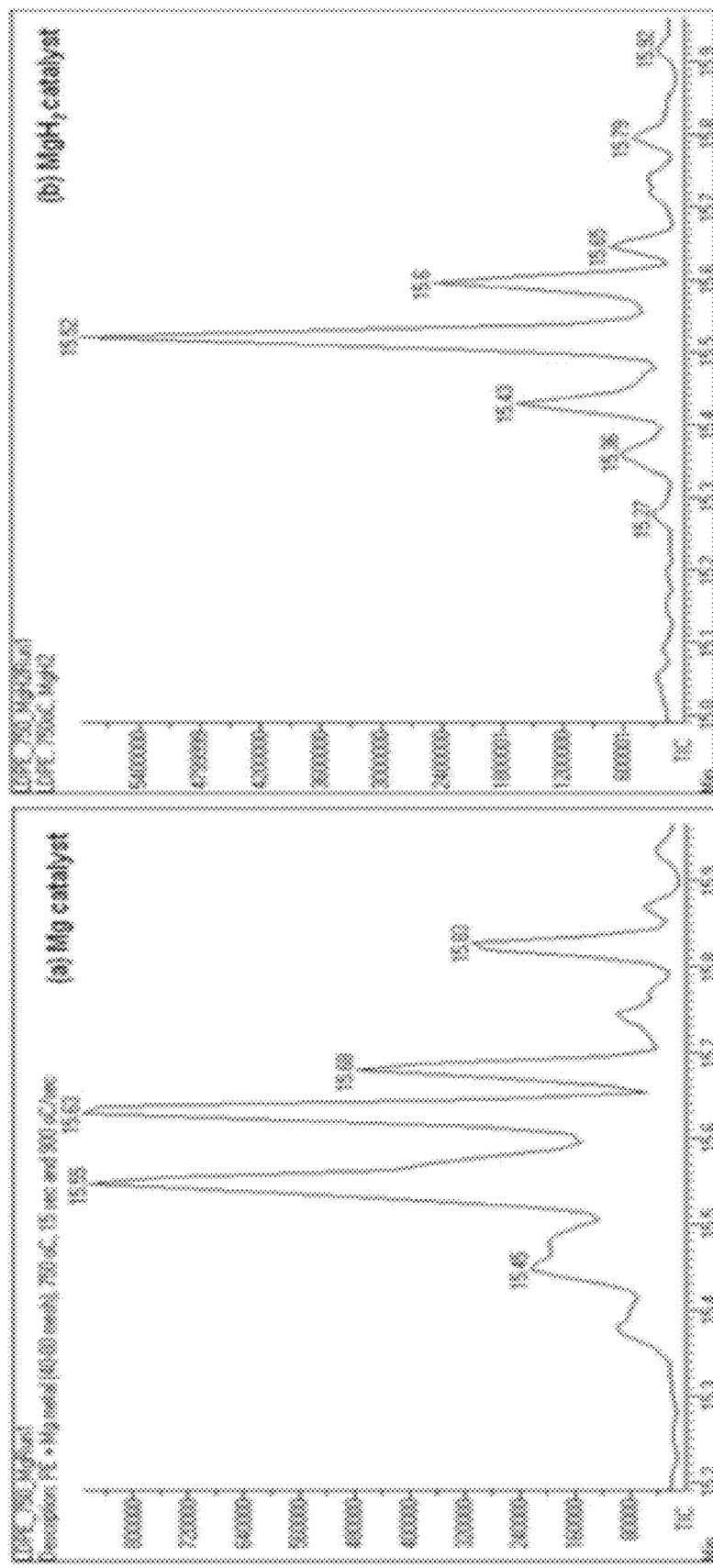
FIG. 25 are graphs that illustrate C$_{16}$ component spectra for (a) Mg metal catalyst and (b) MgH$_2$ metal hydride catalyst.

The significant distinction between these two catalysts (Mg metal and MgH$_2$) is in two phases: (1) the reduction of alkene components and (2) the formation of aromatic compounds. Comparing the C$_{12}$ and C$_{16}$ spectra for Mg and MgH$_2$ catalysts (FIG. 24, FIG. 25, Table 15, FIG. 25), it is found that 2-Dodecene, [E]-(C$_{12}$H$_{24}$) and 3-Dodecene, [E]-(C$_{12}$H$_{24}$) and 3-Hexadecene, (C$_{16}$H$_{32}$) are detected for Mg catalyst, but only trace amounts of these components are shown for MgH$_2$ catalyst. Additionally, the peak (R.T.=10.34 min between 1,11-Dodecadiene and 1-Dodecadene peaks) is significantly reduced for MgH$_2$ catalyst. The unique feature of MgH$_2$ catalyst in comparison with Mg catalyst is the formation of aromatic compounds. Several benzene based aromatic compounds, such as benzene, pentyl-, ($C_{11}H_{16}$), benzene, [3-methyl-2-butenyl]-, benzene, [1,2-dimethylpropyl]-, benzene, 4-hexenyl-($C_{12}H_{16}$) and benzene, [1,2-dimethylpropyl]- are found for $MgH_2$ catalyst, but are not detected for Mg catalyst. These results indicate that hydrogen in $MgH_2$ promotes the formation of aromatic components, which are desirable for gasoline fuel. It should be pointed out that the aromatization process always accompanies hydrogen generation as shown in the above reactions. The above two aromatization processes require 1.5 to 2.5 MPa and temperatures 430° C. to 510° C. over a platinum based catalyst. Compared to $MgH_2$ catalyst, these results may indicate that $MgH_2$ can function similarly to a Pt catalyst at room pressure (0.101 MPa). Therefore exploration of metal hydride based catalysts can be potentially a promising direction for catalyst development in liquid fuel production. To our knowledge this approach has not been reported in this field. More basic research and understanding of the chemical fundamentals behind these phenomena will be needed and more metal hydrides, including sodium borohydride, lithium aluminum hydride, and other metal hydrides, may be potentially effective catalysts for high quality liquid fuel production via plastics hydrocracking processes.

TABLE 14

Percentage of liquid fuels for $MgH_2$ based catalyst (T = 750° C.)

| Samples | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| LDPE + 750° C. | 29.56 | 17.16 | 17.26 | 36.03 |
| Mg catalyst | 40.50 | 11.06 | 14.59 | 33.85 |
| LDPE + $MgH_2$ | 35.32 | 14.70 | 15.99 | 34.00 |

TABLE 15

Percentage of LDPE pyrolysis products over Mg and $MgH_2$ catalysts (T = 750° C.)

| | $C_{12}$ (%) | | | $C_{16}$ (%) | | |
|---|---|---|---|---|---|---|
| Sample | 1,11-Dodecadiene | 1-Dodecadene | Decane | 1,15-Hexadecadiene | 1-Hexadecene | Hexadecane |
| LDPE | 27.28 | 53.17 | 19.56 | 31.78 | 49.92 | 20.30 |
| Mg catalyst | 6.14 | 56.00 | 37.86 | 23.15 | 38.42 | 38.42 |
| LDPE + $MgH_2$ | 9.70 | 56.84 | 33.46 | 17.07 | 57.82 | 25.11 |

Development of Dual Functional Catalysts for One-Step Liquid Fuel Production from Low Density Polyethylene:

The concept of one-step (direct) liquid fuel production is to realize waste plastics pyrolysis and refinery in one reactor using a dual functional catalyst. A one-step process has some advantages over the conventional two-step processes in terms of higher energy efficiency and simplicity, low capital and operational costs. Obviously, the success of this approach depends on the dual functional catalysts that perform plastics decomposition and fuel upgrading reactions. Fundamentally, the synthesis of a dual functional catalyst is loading metal (or alloy) catalysts with a solid acidic support, taking advantage of activities of both metal and supports. In this sense, the supported catalysts (Pd/γ-$Al_2O_3$, Pt/γ-$Al_2O_3$ and Ni/$SiO_2$) are dual functional catalysts. However, although these catalysts are more effective than pure metal catalysts and supporting media alone in fuel production, the quality of liquid fuel produced via these catalysts is still low in RONs because of higher n-paraffins and α-olefins concentrations and low concentration of isoparaffins and aromatics. On the other hand, these results may suggest a dual functional catalyst alone is unable to convert LDPE into high quality liquid fuels. More favorable conditions are needed in order for the catalysts to perform more effectively in this complicated process. In this section, we investigate the effects of dual functional catalysts in the LDPE hydrocracking and upgrading process, using a metal hydride as an internal hydrogen source as well as a metal catalyst.

Figure 26:
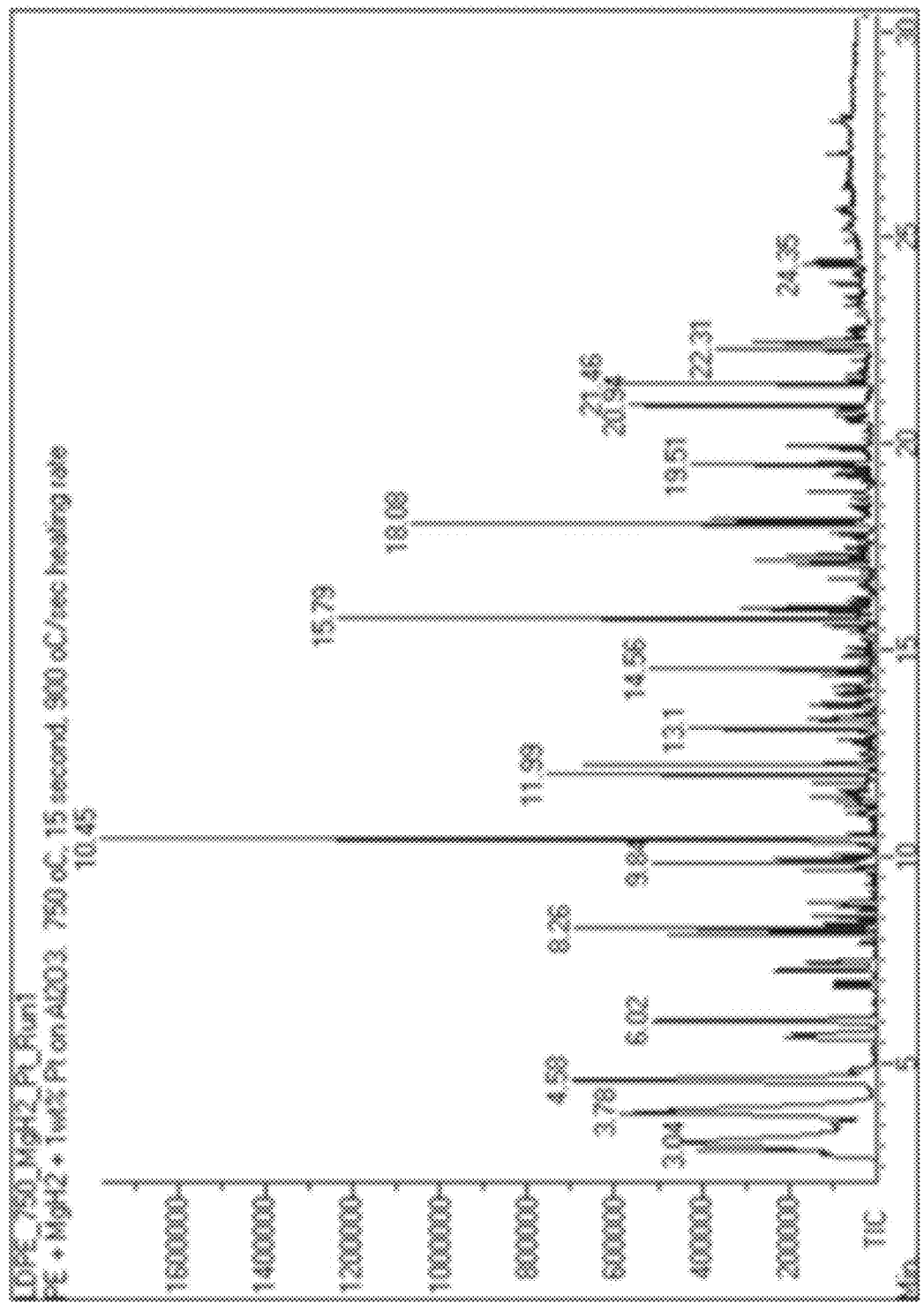
FIG. 26 is a graph that illustrates low density polyethylene thermal decomposition over MgH$_2$+1.0 wt % Pt/γ-Al$_2$O$_3$ catalysts (T=750° C., t=15 s, heating rate=900° C./s).
Figure 27:
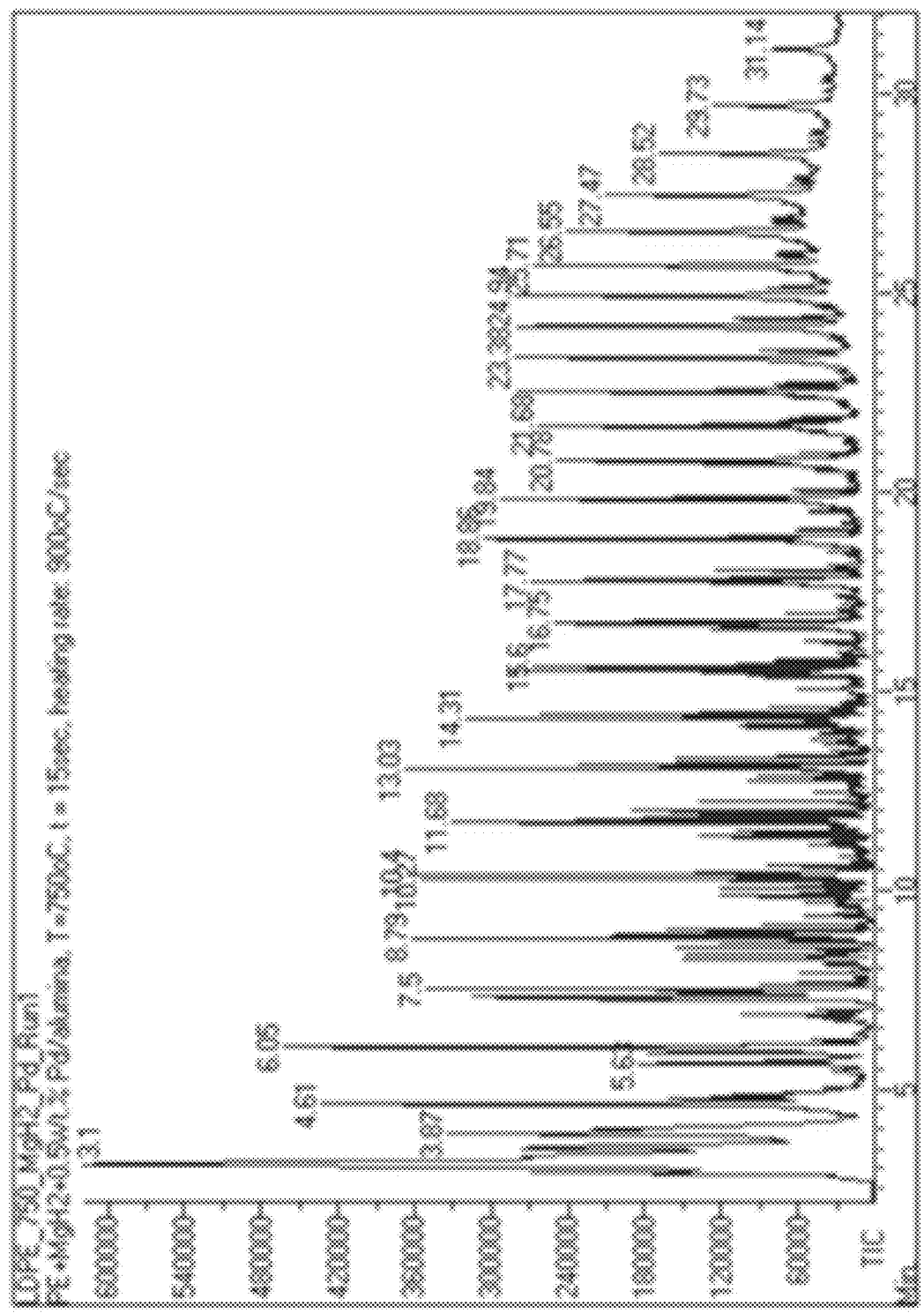
FIG. 27 is a graph that illustrates low density polyethylene thermal decomposition over MgH$_2$+0.5 wt % Pd/γ-Al$_2$O$_3$ catalysts (T=750° C., t=15 s, heating rate=900° C./s).

Two noble metal supported catalysts are selected for this purpose because noble metals are effective in aromatization reactions. Preliminary results from Pt/γ-$Al_2O_3$ and Pd/γ-$Al_2O_3$ based dual function systems are shown in FIG. 26 and FIG. 27. The GC spectrum of $MgH_2$+1.0 wt % Pt/γ-$Al_2O_3$ catalyst system differs significantly from that of either $MgH_2$ (FIG. 23) or 1.0 wt % Pt/γ-$Al_2O_3$ (FIG. 19) in three aspects: (1) the number of product components is significantly reduced; (2) more aromatics are detected; and (3) although the fuel percentages do now show significant changes in comparison with Pt/γ-$Al_2O_3$, almost no alkenes or alkanes are detectable (Table 16). This result suggests that the aromatization effects of Pt/γ-$Al_2O_3$ catalyst are enhanced in the presence of $MgH_2$. However, higher concentrations of heavy aromatic components, such as naphthalene and fluorene, (FIG. 27 and Table 16) are unfavorable in terms of liquid fuel quality. The $MgH_2$+0.5 wt % Pd/γ-$Al_2O_3$ system (FIG. 27) does not show significant changes in liquid fuel distribution in comparison with 0.5 wt % Pd/γ-$Al_2O_3$ (Table 16). However, both 1,11-Dodecadiene and 1-Dodecadene are reduced by about 10% and therefore—decane increases by about 20% in comparison with that of 0.5 wt % Pd/γ-$Al_2O_3$. For $C_{16}$, 1,15-Hexadecadiene remains nearly constant, but 1-Hexadecene decreases 15.58% with the hexadecane increase of 12.83% (Table 17).

Figure 28:
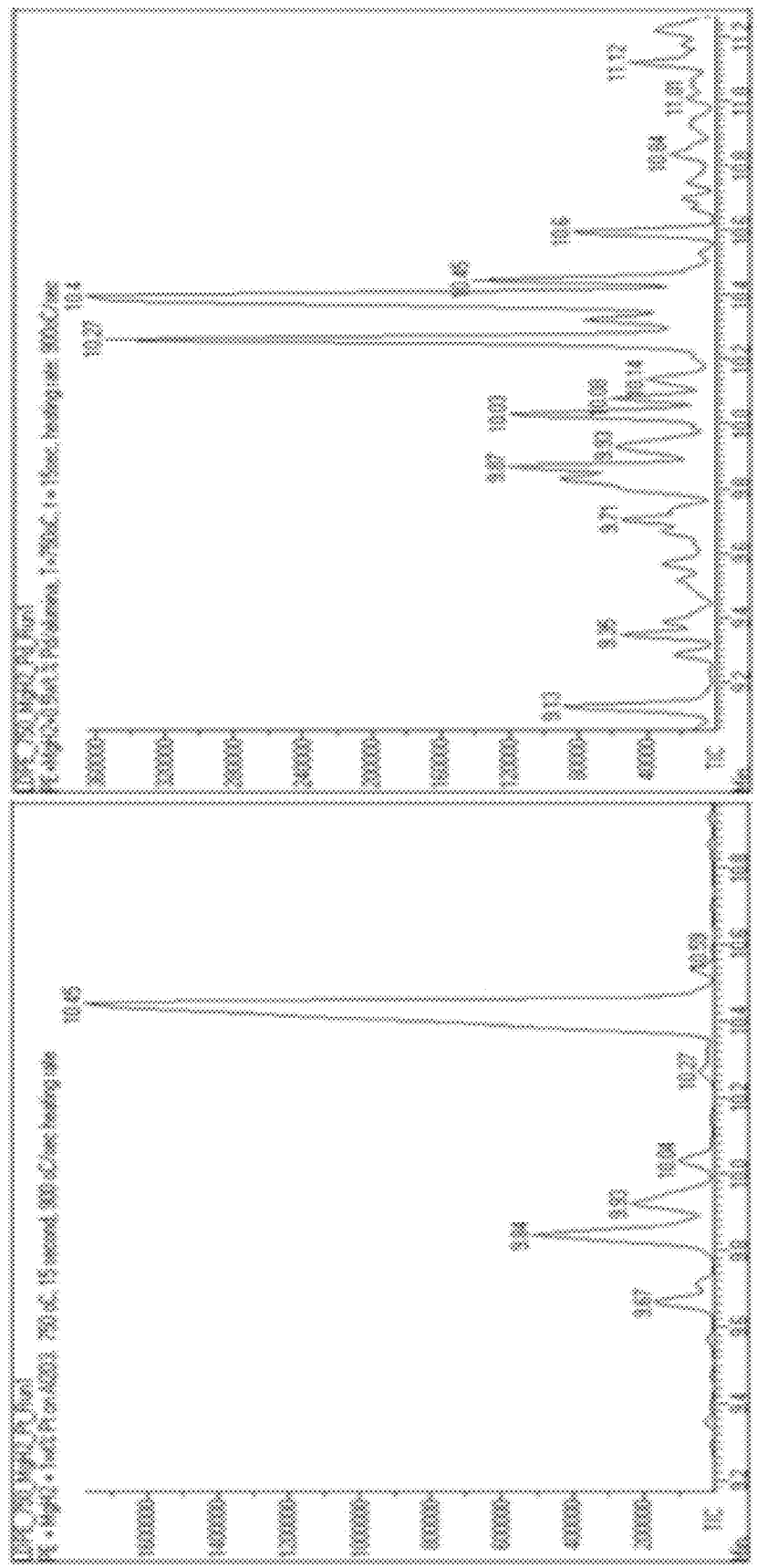
FIG. 28 are graphs that illustrate C$_{12}$ LDPE decomposition species for MgH$_2$+1.0 wt % Pt/γ-Al$_2$O$_3$ and MgH$_2$+0.5 wt % Pd/γ-Al$_2$O$_3$ catalysts.
Figure 29:
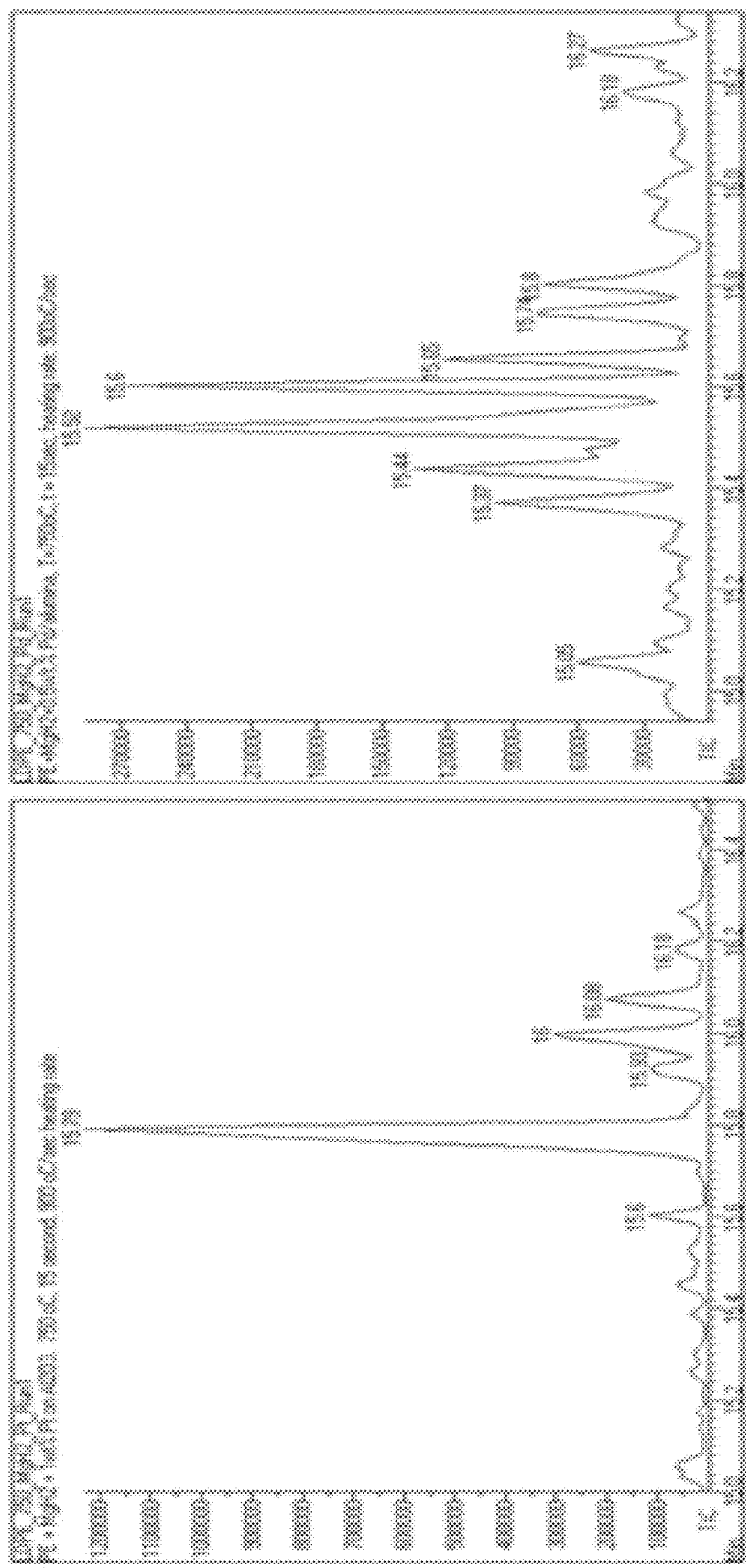
FIG. 29 are graphs that illustrate C$_{16}$ LDPE decomposition species for MgH$_2$+1.0 wt % Pt/γ-Al$_2$O$_3$ and MgH$_2$+0.5 wt % Pd/γ-Al$_2$O$_3$ catalysts.

The GC spectra for the $C_{12}$ and $C_{16}$ species over these two catalyst systems are shown in FIG. 28 and FIG. 29. Notably the $MgH_2$+1.0 wt % Pt/γ-$Al_2O_3$ dual catalyst converts almost all alkenes and alkanes into aromatic compound based hydrocarbons. However, because of the production of heavy aromatic components this combination of catalysts or the reaction conditions (temperature and heating rate) are not desirable in terms of quality of liquid fuels. The $MgH_2$+0.5 wt % Pd/γ-$Al_2O_3$ catalyst, on the other hand, significantly reduces the percentages of 1,11-Dodecadiene and 1-Dodecadene, while at same time producing a number of single benzene-based aromatic components that are anticipated for the production of higher quality gasoline fuel. These preliminary observations suggest that a single step liquid fuel production based on hydrocracking+fuel processing appears to be feasible. However, more efforts are needed in both catalyst evaluation and reaction optimization.

TABLE 16

Percentage of liquid fuels for $MgH_2$ + 1.0 wt % Pt/γ-$Al_2O_3$ and $MgH_2$ + Pd/γ-$Al_2O_3$ based catalysts (T = 750° C.)

| Samples | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| LDPE | 29.56 | 17.16 | 17.26 | 36.03 |
| 1.0 Wt % Pt/γ$Al_2O_3$, 750° C. | 49.23 | 26.19 | 7.26 | 17.32 |

TABLE 16-continued

Percentage of liquid fuels for $MgH_2$ + 1.0 wt % $Pt/\gamma-Al_2O_3$ and $MgH_2$ + $Pd/\gamma-Al_2O_3$ based catalysts (T = 750° C.)

| Samples | Gasoline ($C_4$ to $C_{12}$) (%) | Jet Fuel ($C_{10}$ to $C_{14}$) (%) | Diesel Fuel ($C_{14}$ to $C_{18}$) (%) | Heavy Oil & Wax (>$C_{18}$) (%) |
|---|---|---|---|---|
| $MgH_2$ + 1.0 wt % $Pt/\gamma-Al_2O_3$ | 45.68 | 23.97 | 16.16 | 14.19 |
| $MgH_2$ + 0.5 wt % $Pd/\gamma-Al_2O_3$ | 49.35 | 14.40 | 16.08 | 20.17 |

TABLE 17

Percentage of LDPE pyrolysis $C_{12}$ and $C_{16}$ products over $MgH_2$ + 1.0 wt % $Pt/\gamma-Al_2O_3$ and $MgH_2$ + 0.5 wt % $Pd/\gamma-Al_2O_3$ catalysts (T = 750° C.)

| Sample | $C_{12}$ (%) | | | $C_{16}$ (%) | | |
|---|---|---|---|---|---|---|
| | 1,11-Dode-cadiene | 1-Dode-cadene | Decane | 1,15-Hexa-decadiene | 1-Hexa-decene | Hexa-decane |
| LDPE | 27.28 | 53.17 | 19.56 | 31.78 | 49.92 | 20.30 |
| $MgH_2$ + 1.0 wt % $Pt/\gamma-Al_2O_3$ | 0 | 0 | 0 | 0 | 0 | trace |
| $MgH_2$ + 0.5 wt % $Pd/\gamma-Al_2O_3$ | 3.59 | 37.92 | 58.49 | 25.75 | 37.93 | 36.32 |

Figure 30:
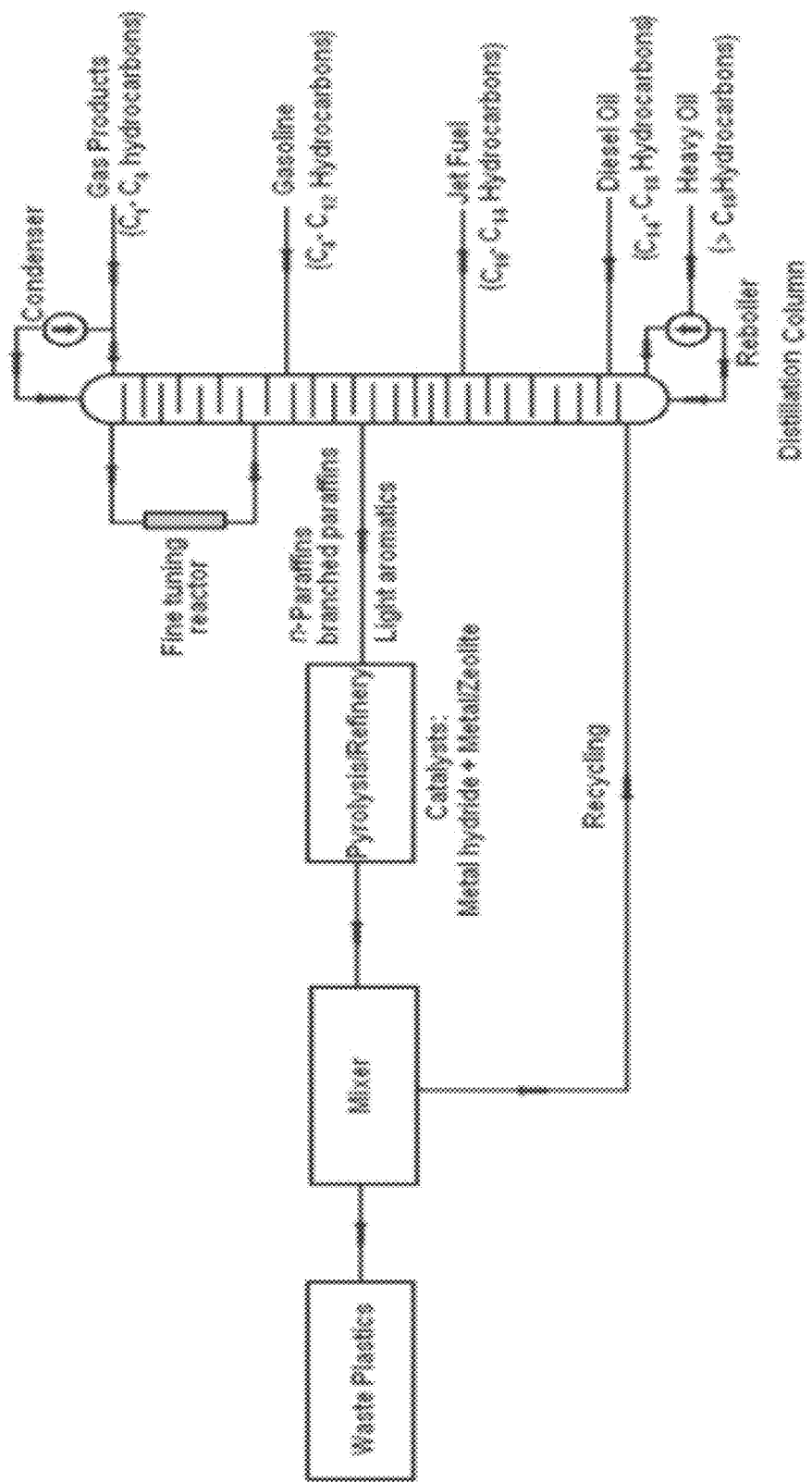
FIG. 30 illustrates a conceptual flow diagram for one step liquid fuel production from waste plastics.

It should be pointed out that due to the complexity of chemistry of the liquid fuel production process, it is unrealistic to expect that a single catalyst can resolve all the principal issues related to liquid fuel production from waste plastics feedstock. Efforts are needed in both catalyst development and process optimization. As has been shown, integrating metal hydrides as an internal hydrogen source with an effective dual functional catalyst can lead to higher quality liquid fuels. From a process optimization viewpoint, if a reactive distillation column can be integrated into the process for the recycling of pre-pyrolysis heavy oil components, the efficiency and the quality of fuels will be greatly enhanced. Based on this idea, we have proposed a reactive distillation column based process (FIG. 30). In this approach, heavy oil is further processed for the production of lighter hydrocarbons. This processing requires less energy than that with plastics and is beneficial for heat recovery as well. Similar to the results derived from Py-GC/MS analyses, the reduction of heavy oil is directly leading to higher overall system efficiency and fuel quality. In addition to the efficiency increase, plastics feedstock can be partially dissolved in high temperature oil, thus improving flexibility of solid feedstock transportation. As may be apparent, the success of the one step process relies on multifunctional catalysts. A small secondary reactor (optional) can be added to the reactive distillation column to further improve fuel quality if some olefins remain or an undesirable concentration of n-paraffins is detected from the exit of the main reactor. This will be unnecessary if highly selective catalysts are used in the main reactor.

CONCLUSIONS

Production of liquid fuels from waste plastics could simultaneously reduce the quantity of waste plastics and provide an alternative fuel source. Even though most waste plastic materials are hydrocarbon polymers with chemical compositions similar to those of liquid fuels, converting polymeric materials to liquid fuels involves complex chemical processes. Chemically, the basic route of producing liquid fuels from plastics feedstock is to decompose the high molecular weight polymers into shorter chain hydrocarbons with the chemical structure of liquid fuels. Methods of plastic decomposition include thermal pyrolysis, catalytic cracking, and hydrocracking of plastics to produce short chain components. In this work we explained the importance of pyrolysis of plastics to create fuel, described the chemistry of plastics and fuels, illustrated the mechanisms of thermal pyrolysis, and described catalyst pyrolysis.

Based on the findings of the literature review of plastics pyrolysis in Sections 0 to 0, we performed a model study of the pyrolysis of polyethylene, looking at the effects of temperature, catalyst, support and bifunctional catalysis. Based on these results, we made several observations and recommendations:

The Py-/GC/MS technique provides a rapid means to evaluate metal and alloy based catalysts in terms of liquid fuel yields and product distributions.

Solid acid catalysts alone cannot convert unsaturated hydrocarbons to desirable liquid fuels. Therefore, supported metal catalysts are necessary to catalytically convert LDPE to higher quality liquid fuels.

Mg metal catalyst increases the production of light hydrocarbons, increases saturated alkane production by reducing unsaturated alkenes, and produces a small amount of branched hydrocarbons.

Noble metals (Pt, Pd, Ir, Ru and Rh) loaded on active supporting materials ($\gamma-Al_2O_3$, $SiO_2$, and zeolites) are effective catalysts in the reduction of olefins and the increase of paraffins and lighter fuel components.

Supported Pt catalyst generates more complex products and heavy aromatics that are detrimental to fuel quality.

Supported Pd catalyst produces fewer undesirable components.

Reaction temperature, heating rate, catalyst loading percentages and preparation techniques play important roles in the above results. An LDPE sample decomposed at higher temperature increases the yield of gasoline and reduces the heavy oil components.

Research is needed to optimize the pyrolytic conditions, supporting materials, metal particle size and morphologies. Noble metal binary systems (such as Pt—Pd, Pt—Ru, Pt—Au) and ternary alloys (Pt—Pd—Ru for example) may be more effective in LDPE thermal catalytic decomposition to yield more liquid fuels and reduce undesirable byproducts.

Degradation of waste plastics via thermal catalytic pyrolysis is a promising process. Yields and quality of fuel products rely on both catalysts and acidic supports. Reactor configurations and reaction conditions, temperature, pressure, heating rate and reaction time also play important roles.

Research should focus on the development of higher activity and selective catalysts and understanding of the reaction mechanisms and pathways.

Exploration of metal hydride based catalysts can be potentially a promising direction for catalyst development in liquid fuel production.

More basic research and understanding of the chemical fundamentals behind these phenomena is necessary and more metal hydrides, including sodium borohydride, lithium aluminum hydride, and other metal hydrides, may be potentially effective catalysts for high quality liquid fuel production via plastics hydrocracking processes.

These preliminary observations suggest that a single step liquid fuel production based on hydrocracking+fuel processing appears to be feasible. However, more efforts are needed in both catalyst evaluation and reaction optimization.

REFERENCES, EACH OF WHICH IS INCORPORATED HEREIN BY REFERENCE

1 Cho M H, Jung S H, Kim J S. Pyrolysis of mixed plastic wastes for the recovery of benzene, toluene, and xylene (BTX) aromatics in a fluidized bed and chlorine removal by applying various additives. Energy Fuels 2010; 24(2): 1389-95.
2 Al-Salem S M, Lettieri P, Baeyens J. The valorization of plastic solid waste (PSW) by primary to quaternary routes: From re-use to energy and chemicals. Prog Energy Comb Science 2010; 36:103-29.
3 Staley B F, Barlaz M A. Composition of Municipal Solid Waste in the United States and Implications for Carbon Sequestration and Methane Yield. J Env Eng 2009; 135: 901-909.
4 Park J J, Park K, Kim J S, Maken S, Song H, Shin H, Park J W, Chou M J. Characterization of styrene recovery from the pyrolysis of waste expandable polystyrene. Energy Fuels 2003; 17(6):1576-82.
5 Goldstein N, Steuteville R, Farrell M. MSW composting in the United States, Biocycle 1996; 37:46-53.
6 Lee S, Yoo S K, Lee J, Park J W. Hydrogen-rich fuel gas production from refuse plastic fuel pyrolysis and steam gasification. J Maters Cycles Waste Manag 2009; 11:191-6.
7 Paradela F, Pinto F, Gulyurtlu I, Cabrita I, Lapa N. Study of the co-pyrolysis of biomass and plastic wastes. Clean Tech Environ Policy 2009; 11:115-22.
8 Al-Salem S M, Lettieri P, Baeyens J. Recycling and recovery routes of plastic solid waste (PSW): A review. Waste Manag 2009; 29:2625-43.
9 Achilias D S, Roupakias C, Megalokonomosa P, Lappas A A, Antonakou E V. Chemical recycling of plastic wastes made from polyethylene (LDPE and HDPE) and polypropylene (PP). J Hazardous Materials 2007; 149:536-42.
10 Balakrishnan R K, Guria C. Thermal degradation of polystyrene in the presence of hydrogen by catalyst in solution. Polym Degrad Stab 2007; 92:1583-91.
11 Panda A K, Sing R K, Mishra D K. Thermolysis of waste plastics to liquid fuel: A suitable method for plastic waste management and manufacture of value added products—A world prospective. Renew Sustain Energy Rev 201; 14:233-48.
12 Piringer O G, Baner A L. Plastic packaging: interactions with food and pharmaceuticals. 2nd ed. Wiley-VCH; 2008.
13 ACC Resin Statistics Summary http://www.americanchemistry.com/s acc/sec policyissues.asp?CID=996&DID=687 2, retrieved February 2011.
14 Murphy M J, Taylor J D, McCormick R L. Compendium of experimental cetane number data. NREL sub-contractor report. NREL/SR-540-36805. 2004. Song C, Mochida I, Hsu C S. Chemistry of diesel fuels. New York: CRC Press; 2000.
16 Aguado J, Serrano D P, Dscola J M. Catalytic upgrading of plastic wastes. In: Scheirs J, Kaminsky W, editors. Feedstock Recycling and pyrolysis of waste plastics: Converting waste plastics into diesel and other fuels, Chichester: Wiley; 2006, p. 73-110.
17 Scheirs J. Overview of commercial pyrolysis processes for waste plastics. In: Scheirs J, Kaminsky W, editors. Feedstock Recycling and pyrolysis of waste plastics: Converting waste plastics into diesel and other fuels, Chichester: Wiley; 2006, p. 383-433.
18 Walendziewski, J. Thermal and catalytic conversion of polyolefins. In: Scheirs J, Kaminsky W, editors. Feedstock Recycling and pyrolysis of waste plastics: Converting waste plastics into diesel and other fuels, Chichester: Wiley; 2006, p. 111-29.
19 Blazso M. Composition of liquid fuels derived from the pyrolysis of plastics. In: Scheirs J, Kaminsky W, editors. Feedstock Recycling and Pyrolysis of Waste Plastics, Chichester:Wiley; 2006, p. 315-41.
20 Zadgaonkar A. Process and Equipment for conversions of Waste Plastics into Fuels in Feedstock Recycling and Pyrolysis of Waste Plastics. In: Scheirs J, Kaminsky W, editors. Feedstock Recycling and Pyrolysis of Waste Plastics, Chichester:Wiley; 2006, p. 709-28.
21 Yuan X. Converting waste plastics into liquid fuel by pyrolysis: developments in China. In: Scheirs J, Kaminsky W, editors. Feedstock Recycling and Pyrolysis of Waste Plastics, Chichester:Wiley; 2006, p. 728-755.
22 de Marco I, Caballero B M, Lopez A, Laresgoiti M F, Torres A, Chomon M J. Pyrolysis of the rejects of a waste packaging separation and classification plant. J Anal Appl Pyrolysis 2009; 85:384-91.
23 Buekens A G, Huang H. Catalytic plastics cracking for recovery of gasoline-range hydrocarbons from municipal plastic wastes. Resourc Conserv Recycl 1998; 23:163-81.
24 Kaminsky W, Nunez I J. Catalytical and thermal pyrolysis of polyolefins. J Anal Appl Pyrolysis 2007; 79:368-374.
25 Yanik J, Uddin M A, Ikeushi K, Sakata Y. The catalytic effect of Red Mud on the degradation of poly (vinyl chloride) containing polymer mixture into fuel oil. Polym Degrad Stab 2001; 73:335-46.
26 Ali S, Garforth A A, Harris D H, Rawience D H, Uemichi Y. Polymer waste recycling over "used" catalysts. Catal Today 2002; 75:247-55.
27 Vasile C, Onu P, Barbou V, Sabliovschi M, Moroi G. Catalytic decomposition of polyolefins. II. Considerations about the composition and the structure of reaction products and the reaction mechanism on silica-alumina cracking catalyst. Acta. Polym. 1985; 36:543-50.
28 Manos G, Yusof I Y, Papayannakkos N, Gangas N H. Catalytic cracking of polyethylene over clay catalysts. Comparison with an ultrastable Y zeolite. Ind Eng Chem Res 2001; 40:2220-5.
29 Manos G, Yusof I Y, Papayannakkos N, Gangas N H, Tertiary recycling of polyethylene to hydrocarbon fuel by catalytic cracking over aluminum pillared clays. Energy Fuels 2002; 16:485-9.
30 Serrano D P, Aguado J, Escola J M, Rodriguez J M. Nanocrystalline ZSM-5: a highly active catalyst for polyolefin feedstock recycling. Stud Surf Sci Catal 2002; 142: 77-84.
31 Sharratt P N, Lin Y H, Garforth A A, Dwyer J. Investigation of the catalytic pyrolysis of high-density polyethylene over a HZSM-5 catalyst in a laboratory fluidized-bed reactor. Ind Eng Chem Res 1997; 36: 5118-24.
32 Ivanova S R, Gumerova E F, Berlin A A, Minskev K S, Zaikov G E. Catalytic degradation of polyolefins—a promising method for the regeneration of monomers. Russ Chem Rev 1991; 60:225-34.

33 Zhou Q, Wang Y Z, Tang C, Zhang Y H, Modifications of ZSM-5 zeolites and their applications in catalytic degradation of LDPE. Polym Degrad Stab 2003; 80:23-30.
34 Vasile C, Pakdel H, Milhai B, Onu P, Darie H, Ciocâlteu S. Thermal and catalytic decomposition of mixed plastics. J Anal Appl Pyrolysis 2001; 57:287-303. Pinto F, Costa P, Gulyurtlu I, Cabrita I. Pyrolysis of plastic wastes: 2. Effect of catalyst on product yield. J Anal Appl Pyrolysis 1999; 51:57-71.
36 Aguado J, Serrano D P, San Miguel G, Castro M C, Madrid S J. Feedstock recycling of polyethylene in a two-step thermo-catalytic reaction system. J Anal Appl Pyrolysis 2007; 79:415-23.
37 Shah J, Jan M R, Hussain Z. Catalytic pyrolysis of low-density polyethylene with lead sulfide into fuel oil Polym Deg Stab 2005; 87:329-33.
38 Ukei H, Hirose T, Horikawa S, Takai Y, Taka M, Azuma N, Ueno A. Catalytic degradation of polystyrene into styrene and a design of recyclable polystyrene with dispersed catalysts. Catal Today 2000; 62:67-75.
39 Tu P, Malherbe F, Pratt K, Kosoir E, Catalytic conversion of low-density polyethylene into liquid hydrocarbons, Presented at the 13th International congress on Catalysis (13ICC) Paris, 11-16 Jul. 2004.
40 Miskolczi N. Kinetic Model of the chemical and catalytic recycling of waste polyethylene into fuels In: Scheirs J, Kaminsky W, editors. Feedstock Recycling and Pyrolysis of Waste Plastics, Chichester:Wiley; 2006, p. 225-49.
41 Ding W B, Tuntawiroon W, Liang J, Anderson L L. Depolymerization of waste plastics with coal over metal-loaded silica-alumina catalysts. Fuel Process Technol 1996; 49:49-63.
42 Ali A G, Ali L I, Aboul-Fotouha S M, Aboul-Gheit A K. Hydrogenation of aromatics on modified platinum-alumina catalysts. Appl Catal A 1998; 170:285-96.
43 Evans P A. Modern Rhodium-Catalysed Organic Reactions. Weinheim:Wiley-VCH; 2005.
44 Uemichi Y, Makino Y, Kanazuka T. Degradation of polypropylene to aromatic hydrocarbons over Pt- and Fe-containing activated carbon catalysts. J Anal Appl Pyrolysis 1989; 16:229-38.
45 Pierella L B, Renzini S, Anunziata A. Catalytic degradation of high density polyethylene over microporous and mesoporous materials. Microporous and Mesoporous Materials 2004; 81(1-3):155-9.
46 Renzini M S, Sedran U, Pierella L B. H-ZSM-11 and Zn-ZSM-11 zeolites and their applications in the catalytic transformation of LDPE. J Anal. Appl. Pyrolysis 2009; 86(1):215-20.
47 Wu C, Williams P T, Pyrolysis—gasification of plastics, mixed plastics and real-world plastic waste with and without Ni—Mg—Al catalyst. Fuel 2010; 89(10):3022-32.
48 Ding Y, Jin B, Gu G, Xia X H, One-step pyrolysis method for the synthesis of highly efficient 3D hollow carbon nanostructure supported metallic catalysts. J Mater Chem 2009; 19:9141-6.
49 Scott D S, Czernik S R, Piskorz J, Radlein DStAG, Fast pyrolysis of plastic wastes. Energy Fuels 1990; 4(4):407-11.
50 Lin H T, Huang M S, Luo J W, Lin J H, Lee C M, Ou K L. Hydrocarbon fuels produced by catalytic pyrolysis of hospital plastic wastes in a fluidizing cracking process. Fuel Process Technol 2010; 91(11):1355-63.
51 Lin Y H, Yang M H. Tertiary recycling of commingled polymer waste over commercial FCC equilibrium catalysts for producing hydrocarbons. Polym Degrad Stab 2009; 94(1):25-33.
52 Lin Y H, Yang M H. Chemical catalysed recycling of polypropylene over a spent FCC catalyst and various commercial cracking catalysts using TGA. Thermochim Acta 2008; 470(1-2):52-9.
53 Lin Y H, Yang M H. Catalytic reactions of post-consumer polymer waste over fluidised cracking catalysts for producing hydrocarbons. J Mol Catal A: Chem 2005; 231(1-2): 113-22.
54 Manos G, Garforth A, Dwyer J. Catalytic degradation of high-density polyethylene over different zeolitic structures. Ind Eng Chem Res 2000; 39:1198-202.
55 Tiwary P, Guria C, Effect of metal oxide catalysts on degradation of waste polystyrene in hydrogen at elevated temperature and pressure in benzene solution. J Polym Environ 2010; 18:298-307.
56 Yanik J, Karayildirim T. Liquefaction of Municipal Waste Plastics over Acidic and Nonacidic Catalysts. In: Scheirs J, Kaminsky W, editors. Feedstock Recycling and Pyrolysis of Waste Plastics, Chichester:Wiley; 2006, p. 209-21.
57 Uemichi Y, Makino Y, Kanazuka T. Degradation of polyethylene to aromatic hydrocarbons over metal-supported activated carbon catalysts. J Anal Appl Pyrolysis 1989; 14:331-44.
58 Lee K H, Noh N S, Shin D H, Seo Y. Comparison of plastic types for catalytic degradation of waste plastics into liquid product with spent FCC catalyst. Polym Degrad Sta 2002; 78:539-44.
59 Masuda T, Kuwuhara H, Hashimoto K, Production of high quality gasoline from waste polyethylene derived heavy oil over Ni-REY catalyst in steam atmosphere. Chem. Eng. Sci. 1999; 54:2773-9.
60 Kaminsky W. Recycling of polymeric materials by Pyrolysis. Macromol Symp 1991; 48/49:381-93.
61 Mertinkat J, Kirsten A, Predel M, Kaminsky W. Cracking catalysts used as fluidized bed material in the Hamburg pyrolysis process. J Anal Appl Pyrolysis 1999; 49:87-95.
62 Ludlow-Palafox C, Chase H A. Recycling of polyethene and polypropene in a novel bench-scale rotating cone reactor by high-temperature pyrolysis. Ind. Eng. Chem. Res 1998; 37:2293-300.
63 Okuwaki A, Yoshioka T, Asai M, Tachibana M, Wakai K, Tada K. The liquefaction of plastic containers and packaging in Japan In: Scheirs J, Kaminsky W, editors. Feedstock Recycling and Pyrolysis of Waste Plastics, Chichester:Wiley; 2006, p. 666-708.
64 Li, X., A process for producing gasoline and diesel from waste plastics and/or heavy oil, WO 01/05908 A1; 2001.

In regard to the discussion herein including the Examples above and the claims, it should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the units of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A method of producing high quality liquid fuels, comprising:
mixing a solid plastic waste with a metal hydride and a supported metal catalyst;
gasifying the mixture; and
producing the high quality liquid fuels.

2. The method of claim 1, wherein the metal hydride is selected from the group consisting of: magnesium hydride ($MgH_2$), calcium hydride ($CaH_2$), palladium hydride, beryllium hydride ($BeH_2$), aluminum hydride ($AlH_3$), indium hydride ($InH_3$), lithium aluminum hydride ($LiAlH_4$), sodium aluminum hydride ($NaAlH_4$), sodium borohydride ($NaBH_4$), and a combination thereof.

3. The method of claim 1, wherein the supported metal catalyst includes a support selected from the group consisting of: $Al_2O_3$, $SiO_2$, zeolite, zirconia, MgO, $TiO_2$, activated carbon, clays, and a combination thereof.

4. The method of claim 1, wherein the supported metal catalyst includes a metal disposed on the support, wherein the metal is selected from the group consisting of: Pt, Pd, Ir, Ru, Rh, Ni, Co, Fe, Mn, Mg, Ca, Mo, Ti, Zn, Al, metal alloy of Pt—Pd, metal alloy of Pt—Ru, metal alloy of Pt—Pd—Ru, metal alloy of Pt—Co, metal alloy of Co—Ni, metal alloy of Co—Fe, metal alloy of Ni—Fe, metal alloy of Co—Ni—Fe, and a combination thereof.

5. The method of claim 1, wherein gasifying includes a temperature of about 300 to 800° C. and a pressure of about 1 atm to 20 atm.

6. The method of claim 1, further comprising pyrolizing and forming the high quality liquid fuel in a single step.

7. A method of producing a high quality liquid fuel, comprising:
melting a solid plastic waste;
adding a metal hydride and a supported metal catalyst; and
producing the high quality liquid fuel.

8. The method of claim 7, wherein the metal hydride is selected from the group consisting of: magnesium hydride ($MgH_2$), calcium hydride ($CaH_2$), palladium hydride, berllium hydride ($BeH_2$), aluminum hydride ($AlH_3$), indium hydride ($InH_3$), lithium aluminum hydride ($LiAlH_4$), sodium aluminum hydride ($NaAlH_4$), sodium borohydride ($NaBH_4$), and a combination thereof.

9. The method of claim 7, wherein the supported metal catalyst includes a support selected from the group consisting of: $Al_2O_3$, $SiO_2$, zeolite, zirconia, MgO, $TiO_2$, activated carbon, clays, and a combination thereof.

10. The method of claim 7, wherein the supported metal catalyst includes a metal disposed on the support, wherein the metal is selected from the group consisting of: Pt, Pd, Ir, Ru, Rh, Ni, Co, Fe, Mn, Mg, Ca, Mo, Ti, Zn, Al, metal alloy of Pt—Pd, metal alloy of Pt—Ru, metal alloy of Pt—Pd—Ru, metal alloy of Pt—Co, metal alloy of Co—Ni, metal alloy of Co—Fe, metal alloy of Ni—Fe, metal alloy of Co—Ni—Fe, and a combination thereof.

11. The method of claim 7, wherein melting includes a temperature of about 300 to 800° C. and a pressure of about 1 atm to 20 atm.

12. The method of claim 7, further comprising pyrolizing and forming the high quality liquid fuel in a single step.

13. A high quality fuel prepared by a process comprising:
mixing a solid plastic waste with a metal hydride and a supported metal catalyst;
gasifying the mixture; and
producing the high quality liquid fuel.

14. The high quality fuel of claim 13, wherein the metal hydride is selected from the group consisting of: magnesium hydride ($MgH_2$), calcium hydride ($CaH_2$), palladium hydride, berllium hydride ($BeH_2$), aluminum hydride ($AlH_3$), indium hydride ($InH_3$), lithium aluminum hydride ($LiAlH_4$), sodium aluminum hydride ($NaAlH_4$), sodium borohydride ($NaBH_4$), and a combination thereof.

15. The high quality fuel of claim 13, wherein the supported metal catalyst includes a support selected from the group consisting of: $Al_2O_3$, $SiO_2$, zeolite, zirconia, MgO, $TiO_2$, activated carbon, clays, and a combination thereof.

16. The high quality fuel of claim 13, wherein the supported metal catalyst includes a metal disposed on the support, wherein the metal is selected from the group consisting of: Pt, Pd, Ir, Ru, Rh, Ni, Co, Fe, Mn, Mg, Ca, Mo, Ti, Zn, Al, metal alloy of Pt—Pd, metal alloy of Pt—Ru, metal alloy of Pt—Pd—Ru, metal alloy of Pt—Co, metal alloy of Co—Ni, metal alloy of Co—Fe, metal alloy of Ni—Fe, metal alloy of Co—Ni—Fe, and a combination thereof.

17. A high quality fuel prepared by a process comprising:
melting a solid plastic waste
adding a metal hydride and a supported metal catalyst; and
producing the high quality liquid fuel.

18. The high quality fuel of claim 17, wherein the metal hydride is selected from the group consisting of: magnesium hydride ($MgH_2$), calcium hydride ($CaH_2$), palladium hydride, berllium hydride ($BeH_2$), aluminum hydride ($AlH_3$), indium hydride ($InH_3$), lithium aluminum hydride ($LiAlH_4$), sodium aluminum hydride ($NaAlH_4$), sodium borohydride ($NaBH_4$), and a combination thereof.

19. The high quality fuel of claim 17, wherein the supported metal catalyst includes a support selected from the group consisting of: $Al_2O_3$, $SiO_2$, zeolite, zirconia, MgO, $TiO_2$, activated carbon, clays, and a combination thereof.

20. The high quality fuel of claim 17, wherein the supported metal catalyst includes a metal disposed on the support, wherein the metal is selected from the group consisting of: Pt, Pd, Ir, Ru, Rh, Ni, Co, Fe, Mn, Mg, Ca, Mo, Ti, Zn, Al, metal alloy of Pt—Pd, metal alloy of Pt—Ru, metal alloy of Pt—Pd—Ru, metal alloy of Pt—Co, metal alloy of Co—Ni, metal alloy of Co—Fe, metal alloy of Ni—Fe, metal alloy of Co—Ni—Fe, and a combination thereof.

* * * * *